United States Patent
Coleman et al.

(10) Patent No.: US 6,895,452 B1
(45) Date of Patent: May 17, 2005

(54) TIGHTLY COUPLED AND SCALABLE MEMORY AND EXECUTION UNIT ARCHITECTURE

(75) Inventors: Ron Coleman, Beaverton, OR (US); Brent LeBack, Portland, OR (US); Stuart Hawkinson, Portland, OR (US); Richard Rubinstein, Santa Cruz, CA (US)

(73) Assignee: Marger Johnson & McCollom, P.C., Portland, OR (US)

( * ) Notice: Subject to any disclaimer, the term of this patent is extended or adjusted under 35 U.S.C. 154(b) by 0 days.

(21) Appl. No.: 09/174,057

(22) Filed: Oct. 16, 1998

Related U.S. Application Data

(63) Continuation-in-part of application No. 08/869,277, filed on Jun. 4, 1997, now abandoned
(60) Provisional application No. 60/062,431, filed on Oct. 16, 1997.

(51) Int. Cl.[7] .............................................. G06F 15/76
(52) U.S. Cl. .............................. 710/22; 710/65; 712/10; 712/220
(58) Field of Search ....................... 710/22, 65; 712/10, 712/23, 200, 220

(56) References Cited

U.S. PATENT DOCUMENTS

| | | | |
|---|---|---|---|
| 4,086,629 A | 4/1978 | Desyllas | 364/200 |
| 4,862,407 A | 8/1989 | Fette | 364/900 |

(Continued)

FOREIGN PATENT DOCUMENTS

| | | | |
|---|---|---|---|
| DE | 4432217 A1 | 3/1995 | G11C/7/00 |

(Continued)

OTHER PUBLICATIONS

Article by Karl Guttang et al, A Single–Chip Multiprocessor for Multimedia: The MVP, 11/92.
Conference materials by Yoshihiro Fujita et al, A Dataflow Image Processing System TIP–4, 9/89.
Article by Gordon Lang et al, An Optimum Parallel Architecture for High–Speed Real–Time Digital Signal Processing, 2/88.
Paper by M.C. Ertem, A Reconfigurable Co–Processor for Microprocessor Systems, 6/87.
Article by A.C. Davies et al, Interfacing a Hardware Multiplier to a General Purpose Microprocessor, 10/77.

*Primary Examiner*—Thomas Lee
*Assistant Examiner*—Harold Kim
(74) *Attorney, Agent, or Firm*—Marger Johnson & McCollom, P.C.

(57) ABSTRACT

An architecture is shown where an execution unit is tightly coupled to a shared, reconfigurable memory system. Sequence control signals drive a DMA controller and address generator to control the transfer of data from the shared memory to a bus interface unit (BIU). The sequence control signals also drive a data controller and address generator which controls transfer of data from the shared memory to an execution unit interface (EUI). The EUI is connected to the execution unit operates under control of the data controller and address generator to transfer vector data to and from the shared memory. The shared memory is configured to swap memory space in between the BIU and the execution unit so as to support continuous execution and I/O. A local fast memory is coupled to the execution unit. A local address generator controls the transfer of scalar data between the local fast memory and the execution unit. The execution unit, local fast memory and local address generator form a fast memory path that is not dependent upon the slower data path between the execution unit and shared memory. The fast memory path provides for fast execution of scalar operations in the execution unit and rapid state storage and retrieval for operations in the execution unit.

13 Claims, 42 Drawing Sheets

U.S. PATENT DOCUMENTS

| | | | |
|---|---|---|---|
| 5,230,042 A | 7/1993 | Masaki | 395/162 |
| 5,396,634 A | 3/1995 | Zaidi | 395/800 |
| 5,448,715 A | 9/1995 | Lelm | 395/550 |
| 5,659,543 A | 8/1997 | Ater | 370/258 |
| 5,841,444 A * | 11/1998 | Mun et al. | 345/506 |
| 5,842,031 A * | 11/1998 | Barker et al. | 395/800 |
| 5,966,528 A * | 10/1999 | Wilkinson et al. | 395/563 |

FOREIGN PATENT DOCUMENTS

| | | | | |
|---|---|---|---|---|
| DE | 19735981 A1 | 3/1998 | | G06F/9/38 |
| DE | 19713178 A1 | 10/1998 | | G06F/12/08 |
| EP | 0139254 A2 | 5/1985 | | G06F/13/28 |
| EP | 0498107 A2 | 8/1992 | | G11C/5/14 |
| EP | 0590807 A2 | 4/1994 | | G06F/15/44 |
| EP | 0741356 A1 | 11/1996 | | G06F/12/08 |
| GB | 2155671 A | 9/1985 | | G06F/13/00 |
| JP | 09034783 | 2/1997 | | G06F/12/08 |
| WO | WO 9412929 | 6/1994 | | G06F/9/26 |
| WO | WO 9734231 | 9/1997 | | G06F/12/12 |

* cited by examiner

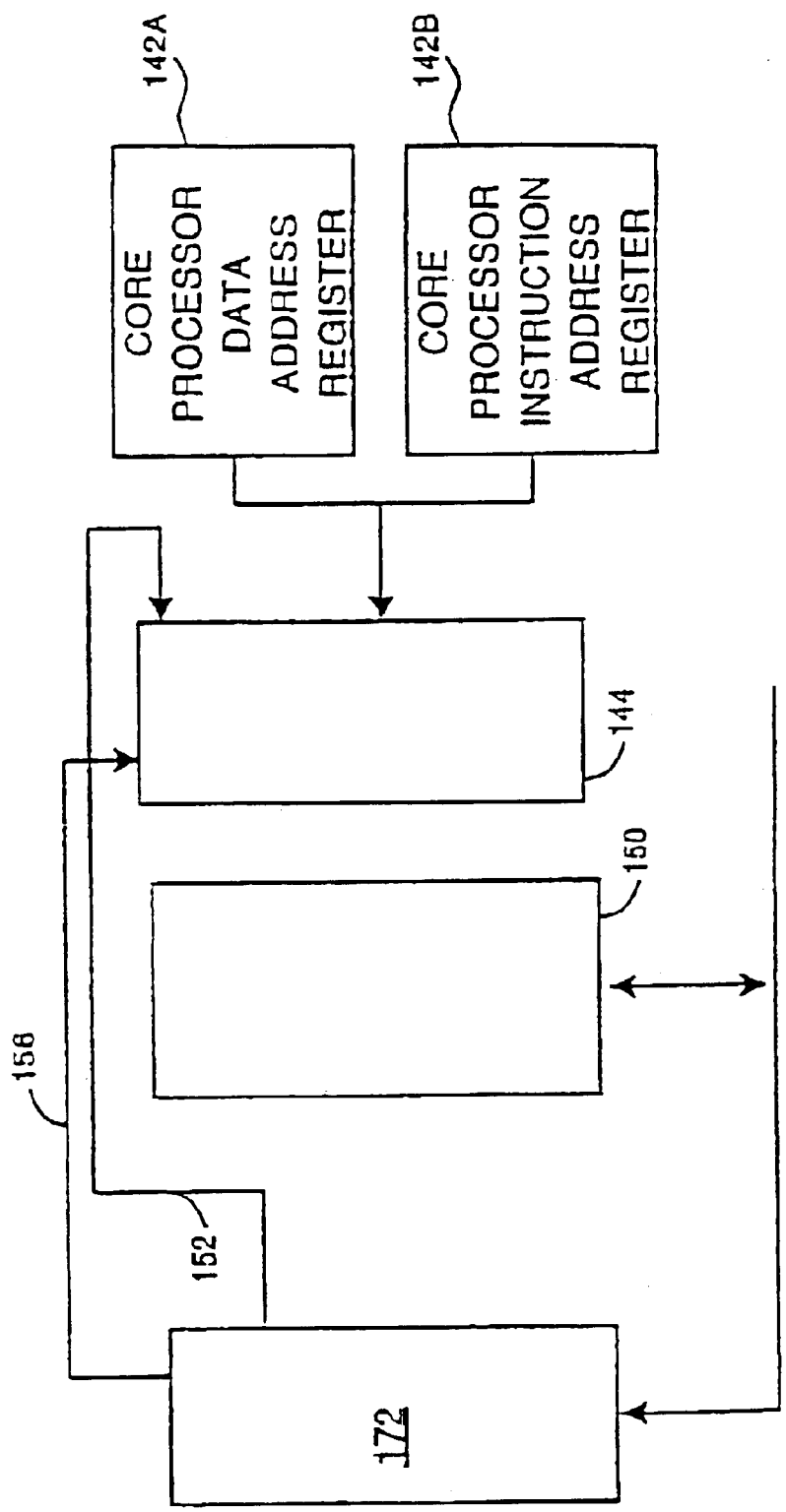

TIGHTLY COUPLED AND SCALABLE MEMORY AND EXECUTION UNIT ARCHITECTURE

This application is a continuation-in-part of application Ser. No. 08/869,277, filed Jun. 4, 1997, is now abandoned, and is incorporated herein by reference. This application also claims the priority date of provisional application Ser. No. 60/062,431, filed Oct. 16, 1997.

FIELD OF THE INVENTION

The present invention is generally in the field of digital computer architectures and, more specifically, is directed to an architecture where an execution unit is tightly coupled to a shared reconfigurable memory.

BACKGROUND OF THE INVENTION

General purpose microprocessor cores are known for implementation into integrated circuits for a wide variety of applications. Specialized computation engines which are specifically adapted to perform complex computational algorithms, such as Digital Signal Processing (DSP), are also known. DSP cores are specialized computation engines for carrying out digital signal processing tasks which are specially configured to efficiently process DSP algorithms. An example of a known DSP chip is the DSP 56002 processor, commercially available from Motorola. In order to achieve improved performance in DSP-related processing, the conventional approach is to combine a general purpose processor core together with a DSP core. The general purpose processor carries out Input/Output (I/O) tasks, logic functions, address generation, etc. This is a workable but costly solution. Additionally, evolving new applications require increasing amounts of memory and the use of multiple conventional digital signal processors. Additionally, power dissipation becomes a limiting factor in hardware of this type. The challenge, therefore, is to provide for improvements in processing performance while containing or reducing costs.

In view of the foregoing, one object of the present invention is to provide an improved computer architecture that utilizes available memory more efficiently in DSP and other specialized processor systems. Another object is to reduce the power consumption and size of computational processing systems.

A further object of the present invention is to provide for shared and reconfigurable memory in order to reduce I/O processor requirements in processor and co-processor architectures. A further object is to extend a shared, reconfigurable memory architecture to multiple memory blocks and execution units.

Another object of the present invention is to provide for microcode programming of a memory system controller in order to provide for dynamic reconfiguration of reconfigurable memory. A further object of the invention is to provide improvements in memory addressing methods, architectures and circuits for continuous execution together with simultaneous, continuous Direct Memory Access (DMA) operations.

A still further object of the invention is to provide improvements in execution units for computational operations, for example execution unit architectures that feature deep-pipeline structures and local registers, and that support parallel operations. Modified execution units can be used to improve efficiency of operation in conjunction with reconfigurable memory.

Yet another object of the present invention is a "virtual two port" memory structure based on a conventional, single-port memory cell. Yet another object is to provide for implementation in both Static Random Access Memory (SRAM) and Dynamic Random Access Memory (DRAM) configurations of the virtual two-port memory.

SUMMARY OF THE INVENTION

In view of the foregoing background, the present invention is directed to improved hardware architectures for improved access to a memory array and, more specifically, is directed to "memory-centric" methods and apparatus for improved performance in the interface between a memory array and high speed computational engines, such as digital signal processing or "DSP" systems. As mentioned above, improvements in computational performance have been achieved by providing special arithmetic units or "execution units" that are optimized to carry out the arithmetic operations that are commonly required by complex algorithms—mainly multiplication and addition—at very high speed. One example of such an execution unit is the "DAU" (data execution unit) provided in the WE DSP32C chip from AT&T, for DSP applications. The AT&T execution unit, and others like it, provide relatively fast, floating point arithmetic operations to support computation-intensive applications such as speech, graphics and image processing.

While many improvements have been made in floating-point execution units, pipelined architectures, decreased cycle times, etc., known computational systems generally utilize standard memory systems. For example, DRAM integrated circuits are used for reading input data and, on the output side, for storing output data. Operand and result data is moved into and out of the DRAM memory systems using known techniques such as multiple-ported memory, DMA hardware, buffers, and the like. While such systems benefit from improvements in memory speed and density, data transfer at the memory interface remains a relative bottleneck. I have reconsidered these known techniques and discovered that significant gains in performance and flexibility can be achieved by focusing on the memory, in addition to the execution unit, and by providing improvements in methods and circuits for moving data efficiently among data sources (such as a host processor bus or I/O channel), memory subsystems, and execution units. Since the focus is on the memory, I coined the term "memory-centric" computing.

One aspect of the present invention is a Memory-Centric Controller (MCC) which includes a microcode store, microcode sequencer and memory configuration control circuit whereby the MCC is able to dynamically reconfigure a reconfigurable memory array responsive to microcode programs stored within the microcode store. The microcode sequencer controls execution of the microcode program to generate microcode control words which drive the memory configuration control circuit. The memory configuration control circuit, in turn, generates a memory configuration control signal which is output to the memory array in order to dynamically modify the configuration of the memory array under microcode control.

Importantly, the memory array is readily "reconfigurable" so that it can be adapted to the requirements of particular applications. Reconfiguration can include dividing the memory array into several blocks which are independently accessible through data I/O ports connected to the memory array. The memory blocks can also be reconfigured both in depth, i.e. number or words or rows, as well as in width (word size). This flexibility simplifies, and speeds, memory I/O for various applications, and provides great flexibility for creating specialized computational systems, which can be implemented as stand-along systems for embedded applications, or as separate "co-processors" or "on-board" devices with a general purpose or other core processor. For example, the memory word size can be easily configured to match that of an I/O channel or execution unit currently in use. The invention can be implemented in both von Neumann as well as Harvard architectures.

The invention further anticipates the use of an execution unit in concert with the reconfigurable memory array where the execution unit is controlled by the MCC and reconfigured in several ways, including selectable depth (number of pipeline stages) and width (i.e. multiple word sizes concurrently). Preferably the pipelined execution unit(s) includes internal register files with feedback. In this aspect of the invention, the MCC includes an execution address generator and an opcode generator which operate under microcode control. The execution address generator generates an execution address signal that is output to the memory array in order to obtain operands for the execution unit from data in the memory array and store the result data produced from the execution unit back in the memory array. The opcode generator outputs opcodes which control both the configuration and function of the execution unit. Thus, both the memory array and execution unit are dynamically reconfigurable under microcode control in order to optimize the data path from the memory array, through the execution unit, and back to the memory array for the particular algorithm implemented in the microcode program.

The microcode program can be included in non-volatile memory attached to the MCC, initialized by the MCC from non-volatile memory, downloaded to the MCC by the host core processor, and/or updated under software control. This combination of reconfigurable memory, together with reconfigurable execution units, the associated techniques for efficiently moving data between them, and the flexibility of microcode programming provides an architecture that is highly flexible.

Microcoded software can be used to take advantage of this architecture so as to achieve new levels of performance in memory and computation systems. The microcode and architecture can be optimized for a variety of embedded applications because the same underlying hardware is reconfigurable under microcode control for a particular application. When the MCC is paired with a core processor or host system, however, microcode programs can be downloaded as needed to perform each function desired by the host processor or system with the architecture being reconfigurable for each function so as to achieve high levels of performance.

In one embodiment of the present invention, an execution architecture is composed of a memory array having first and second blocks, first and second I/O ports, first and second address ports, and a configuration control port. A first value of a configuration control signal received at the configuration control port configures the first block to be coupled to the first I/O port and the first address port and the second block to be coupled to the second I/O port and the second address port. A second value of the configuration control signal configures the first block to be coupled to the second I/O port and the second address port and the second block to be coupled to the first I/O port and the first address port. The architecture includes a data controller and address generator (DCAG) having an address output port and a control input port, the address output port of the DCAG being coupled to the first address port of the memory array and the DCAG being configured to generate address values at the DCAG address output port responsive to a vector data control signal received at the DCAG control input port. A DMA controller and address generator (DMACAG) has an address output port and a control input port, where the address output port of the DMACAG is coupled to the second address port of the memory array and the DMACAG is configured to generate address values at the DMACAG address output port responsive to a DMA control signal received at the DMACAG control input port. A first execution unit has first and second I/O ports, the first I/O port of the first execution unit being coupled to the first I/O port of the memory array. A first local memory array has a first I/O port and a first address port, the first I/O port of the first local memory being coupled to the second I/O port of the first execution unit. And a first local address generator (LAG) has an address output port and a control input port, the address output port of the first LAG being coupled to the first address port of the first local memory array and the first LAG being configured to generate address values at the first LAG address output port responsive to a first execution control signal received at the first LAG control input port.

This architecture above provides a fast memory path through the execution unit, local memory and local address register than is not dependent upon the typically slower data path to the memory array. This allows fast scalar operations to be performed in the local memory by the execution unit while vector operations flow through the memory array. The architecture also provides for fast saving and restoring of process states in the execution unit during context switches. It also permits the execution unit to be used to rapidly generate and store coefficients in local memory for certain operations, such as DSP operations.

Another aspect of the architecture of the present invention includes a memory centric controller (MCC) configured to generate the configuration control signal, the vector data control signal, the DMA control signal and the first execution control signal. The MCC is configured to switch the first and second blocks of the memory array and drive the DCAG and DMACAG independently of one another to simultaneously transfer data through the first and second I/O ports of the memory array and the MCC is configured to independently drive the first LAG to transfer data between the first local memory and the first execution unit.

This architecture permits a DMA bus transfer operation to take place simultaneously to a vector processing operation. The blocks of the memory array are then swapped under MCC control to allow the data input during the DMA operation to be vector processed while the vector processed data is streamed out of memory and replace with new input data. The configuration control signal, the vector data control signal, the DMA control signal and the first execution control signal can also be microcode values generated by the MCC.

Another embodiment of the architecture includes an execution unit interface unit interposed the execution unit and the memory array and having a first I/O port coupled to the first I/O port of the execution unit and a second I/O port coupled to the first I/O port of the memory array, a control input port configured to receive an execution unit interface control signal, and a first wide buffer. A first predetermined number of words of the first wide buffer is proportional to a ratio of an execution speed of the execution unit to an access speed of the memory array and the execution unit interface unit transfers individual words of data between the execution unit and the first wide buffer and transfers the first predetermined number of words between the first wide buffer and the memory array responsive to the execution unit interface control signal.

This embodiment of the architecture permits data to be transferred between the execution unit and the memory array without delays for the slower of the two interfaces. Typically, the access speed of the memory array is much slower than the execution speed of the execution unit. The execution interface unit, transfers data words between the wide buffer and the execution unit and transfers the contents of the entire wide buffer to and from the memory array. For example, if the execution unit is operating with 64 bit words at 200 MHz and the memory array operates at 25 MHZ, then the wide buffer size is 512 bits. Similar speed matching can be obtained for bus transfers using a bus interface unit coupled between the memory array and a system bus.

Yet another aspect of the present architecture includes a second local address generator (LAG) having an address output port and a control input port. The second LAG being configured to generate address values at the second LAG address output port responsive to a second execution control signal received at the second LAG control input port. The first local memory includes first and second blocks, a second I/O port, a second address port and a configuration control input. Responsive to a first value of a local memory configuration control signal received at the configuration control input, the first block of the first local memory is coupled to the first I/O port and first address port and the second block of the first local memory is coupled to the second I/O port and second address port. Responsive to a second value of the local memory configuration control signal, the first block of the first local memory is coupled to the second I/O port and second address port and the second block of the first local memory is coupled to the first I/O port and first address port, the address output port of the second LAG being coupled to the second address port of the first local memory.

This aspect of the architecture permits a microcode program pertaining to a first execution unit operation to be loaded into one block of local memory and operated while a microcode program pertaining to a second execution unit operation is loaded into the other block of local memory. The blocks are then switched by reconfiguring the memory and the second execution unit operation proceeds while yet another microcode program is loaded into the first block of local memory. This provides for fast operation of the execution unit for a variety of types of operations with minimal delay between operations and, most importantly, the use of a slow, large micro-code store in the MCC, e.g., flash memory, ROM, DRAM, wherein the local memories for micro-code supporting the execution units at high speed have smaller memory requirements than larger, slower memory units in the MCCU, and have faster speed.

Multiple execution units can be added to the present architecture to simultaneously perform different functions. In still another aspect of the present execution architecture, the memory array includes a third block coupled to a third I/O port and a third address port of the memory array, wherein the third block of the memory array is configured to be switched with the first and second blocks of the memory array responsive to the configuration control signal. This aspect of the architecture includes another data controller and address generator (DCAC) having an address output port and a control input port, the address output port of the another DCAG being coupled to the third address port of the memory array and the DCAG being configured to generate address values at the DCAG address output port responsive to another vector data control signal received at the second DCAG control input port. A second execution unit has first and second I/O ports, the first I/O port of the first execution unit being coupled to the third I/O port of the memory array. A second local memory array has an I/O port and an address port, the I/O port of the second local memory being coupled to the second I/O port of the second execution unit. And a second local address generator (LAG) has an address output port and a control input port, the address output port of the second LAG being coupled to the address port of the second local memory array and the second LAG being configured to generate address values at the second LAG address output port responsive to a second execution control signal received at the second LAG control input port.

This aspect of the present architecture provides for multiple execution units that simultaneously perform different operations, such as a codec operation in one execution unit and a motion estimation operation in another execution unit. The present architecture can be scaled to provide the number of execution units needed to perform a given function. For example, the architecture can include three execution units to perform motion estimation and one execution unit to act as a codec (coder/decoder). The architecture is therefore particularly suited for a computationally intensive application such as an MPEG-2 encoder.

In still another embodiment of the present architecture, the first execution unit includes a combination multiplier/arithmetic logic unit (ALU) block having first and second input ports and an output port, and a vector register file. The vector register file has a first I/O port coupled to the first I/O port of the first local memory, a second I/O port coupled to the first I/O port of the memory array, a first output port coupled to the first input port of the ALU, a second output port coupled to the second input port of the ALU, and a first input port coupled to the output port of the ALU. In addition, the vector register file has a first output port coupled to the first input port of a combination multiplier/ALU block, a second output port coupled to the second input port of the combination multiplier/ALU block, and a first input port coupled to the output port of the combination multiplier/ALU block. The vector register file includes multiple register blocks configured to be independently coupled to the first and second I/O ports, the first and second output ports and the input port of the vector register file responsive to a vector register control signal. A word size of each of the multiple blocks is independently configurable by the vector register control signal to match a transfer rate of each of the ports of the vector register file.

The vector register file includes multiple memory blocks that can be controlled by an MCC and multiple address generators. Each block can operate independently to feed a different port at a rate and word size appropriate for the transfer rate of the device coupled to the port. This allows multiple operations to be implemented in the register and executed concurrently. The vector register can be interfaced to the memory array, which is typically a DRAM array, by physically connecting bidirectional signal wires from sense amps and write drivers within the memory array. This aspect of the architecture allows data words from a fast local memory to be driven into a separate port of the vector register and then out to the arithmetic logic unit at high speed while a larger data buffer is simultaneously transferred from the memory array into the vector register file.

The present invention is useful in a wide variety of computational and signal processing applications including programmable MPEG-2 encoder and decoder, graphics, speech processing, image processing, array processors, etc. In telecommunications, the invention can be used, for example, for switching applications in which multiple I/O channels are operated simultaneously.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6B illustrates an alternative embodiment in which an MDSPC accesses the memory.

FIGS. 18A–8C are simplified block diagrams illustrating various configurations of segments of a memory block into association with multiple execution units.

DETAILED DESCRIPTION OF A PREFERRED EMBODIMENT

FIG. 1

Figure 1:
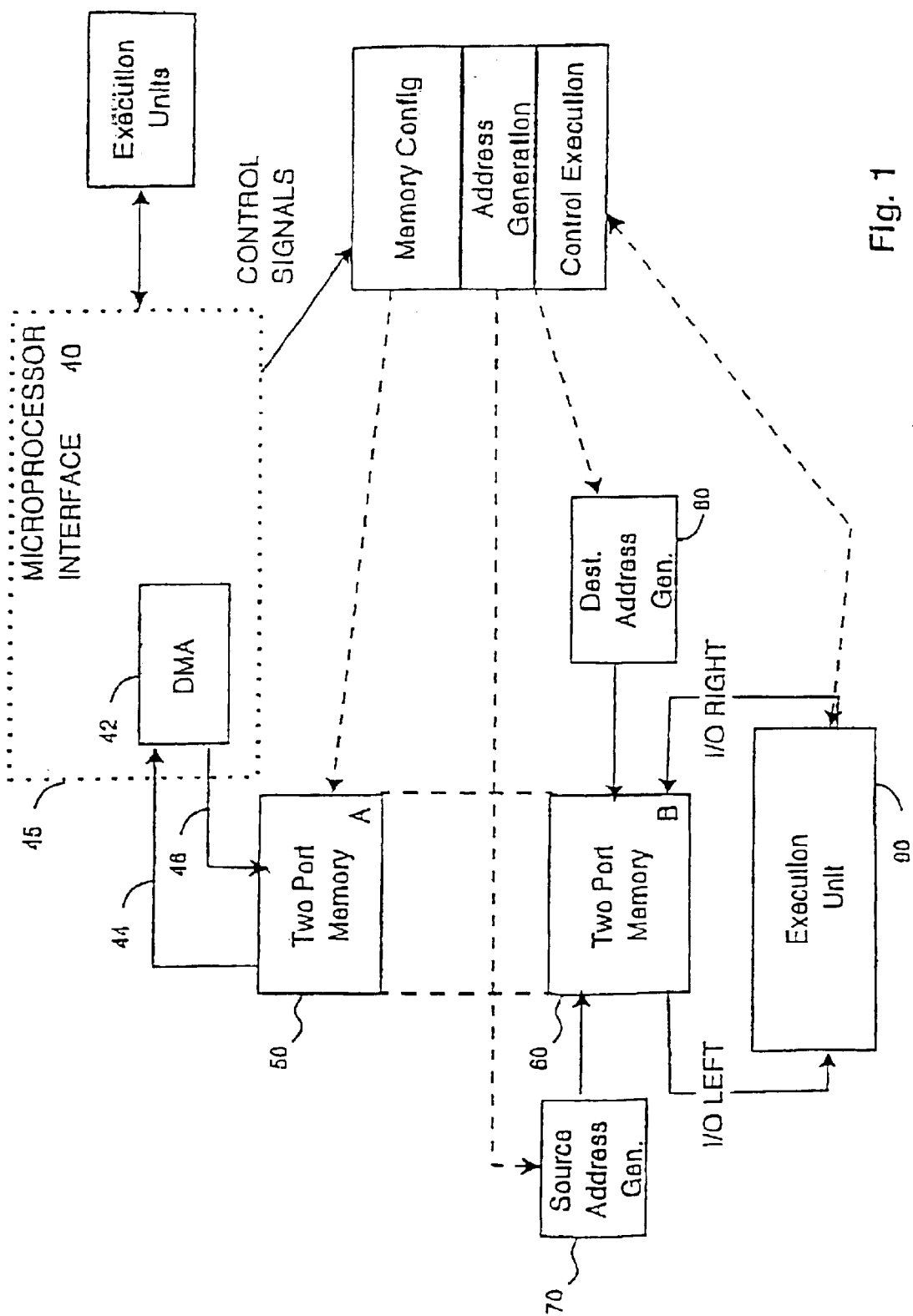
FIG. 1 is a system level block diagram of an architecture for digital signal processing (DSP) using shared memory according to the present invention.

FIG. 1 is a system-level block diagram of an architecture for memory and computing-intensive applications such as digital signal processing. In FIG. 1, a microprocessor interface 40 includes a DMA port 42 for moving data into a memory via path 46 and reading data from the memory via path 44. Alternatively, a single, bidirectional port could be used. The microprocessor interface 40 generically represents an interface to any type of controller or microprocessor. The interface partition indicated by the dashed line 45 in FIG. 1 may be a physical partition, where the microprocessor is in a separate integrated circuit, or it can merely indicate a functional partition in an implementation in which all of the memory and circuitry represented in the diagram of FIG. 1 is implemented on board a single integrated circuit. Other types of partitioning, use of hybrid circuits, etc., can be used. The microprocessor interface (DMA 42) also includes control signals indicated at 52. The microprocessor or controller can also provide microcode (not shown) for memory control and address generation, as well as control signals for configuration and operation of the functional execution units, as described later.

Because the present invention may be integrated into an existing processor or controller core design, so that both the core processor and the present invention reside in the same integrated circuit, reference will be made herein to the core processor meaning the processor that the present invention has been attached to or integrated with.

In FIG. 1, a two-port memory comprises the first memory block 50, labeled "A" and a second memory block 60, labeled "B." The memory is addressed by a source address generator 70 and a destination address generator 80. A functional execution unit 90 also is coupled to the two-port memory, left and right I/O channels, as illustrated at block B. Preferably, these are not conventional two-port memory I/O ports; rather, they have novel structures described later.

In operation, the interface 44, 46 to the two-port memory block A is a DMA interface that is in communication with the host processor or controller 40. Block A receives data coefficients and optionally other parameters from the controller, and also returns completed data to the controller that results from various DSP, graphics, MPEG-2 encoder/decoder or other operations carried out in the execution unit 90. This output data can include, for example, FFT results, or convolution data, or graphics rendering data, etc. Thus the single memory can alternately act as both a graphics frame buffer and a graphics computation buffer memory.

Concurrently, the memory block "B" (60) interfaces with the functional execution unit 90. The functional execution unit 90 receives data from the two-port memory block B and executes on it, and then returns results ("writeback") to the same two-port memory structure. The source address generator 70 supplies source or input data to the functional execution unit while the destination address generator 80 supplies addresses for writing results (or intermediate data) from the execution unit to the memory. Put another way, source address generator 70 provides addressing while the functional execution unit is reading input data from memory block B, and the destination address generator 80 provides addressing to the same memory block B while the functional execution unit 90 is writing results into the memory.

As mentioned above, when the execution unit has completed its work on the data in block B, the memory effectively "swaps" blocks A and B, so that block B is in communication with the DMA channel 42 to read out the results of the execution. Conversely, and simultaneously, the execution unit proceeds to execute on the new input data in block A. This "swapping" of memory blocks includes several aspects, the first of which is switching the memory address generator lines so as to couple them to the appropriate physical block of memory.

In an alternative embodiment, the system can be configured so that the entire memory space (blocks A and B in the illustration) are accessed first by an I/O channel, and then the entire memory swapped to be accessed by the processor or execution unit. In general, any or all of the memory can be reconfigured as described. The memory can be SRAM, DRAM or any other type of random access semiconductor memory or functionally equivalent technology. DRAM refresh is provided by address generators, or may not be required where the speed of execution and updating the memory (access frequency) is sufficient to obviate refresh.

FIG. 2

Figure 2:
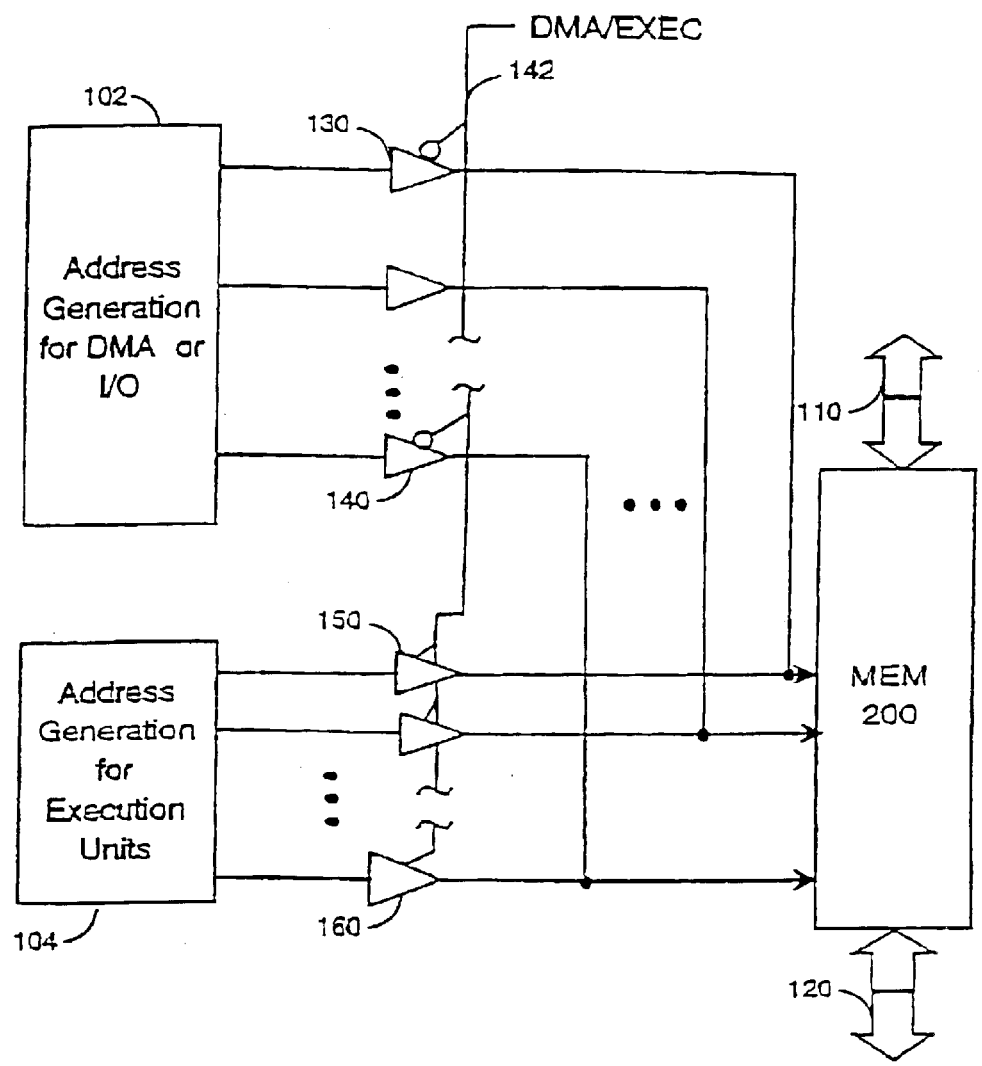
FIG. 2 illustrates circuitry for selectively coupling two or more address generators to a single block of memory.

FIG. 2 illustrates one way of addressing a memory block with two (or more) address generators. Here, one address generator is labeled "DMA" and the other "ADDR GEN" although they are functionally similar. As shown in FIG. 2, one of the address generators 102 has a series of output lines, corresponding to memory word lines. Each output line is coupled to a corresponding buffer (or word line driver or the like), 130 to 140. Each driver has an enable input coupled to a common enable line 142. The other address generator 104 similarly has a series of output lines coupled to respective drivers 150 to 160. The number of word lines is at least equal to the number of rows of the memory block 200. The second set of drivers also have enable inputs coupled to the common enable control line 142, but note the inverter "bubbles" on drivers 130 to 140, indicating the active-low enables of drivers 150 to 160. Accordingly, when the control line 142 is low, the DMA address generator 102 is coupled to the memory 200 row address inputs. When the control line 142 is high, the ADDR GEN 104 is coupled to the memory 200 row address inputs. In this way, the address inputs are "swapped" under control of a single bit. Alternative circuitry can be used to achieve the equivalent effect. For example, the devices illustrated can be tri-state output devices, or open collector or open drain structures can be used where appropriate. Other alternatives include transmission gates or simple pass transistors for coupling the selected address generator outputs to the memory address lines. The same strategy can be extended to more than two address sources, as will be apparent to those skilled in the art in view of this disclosure.

FIG. 3

Figure 3:
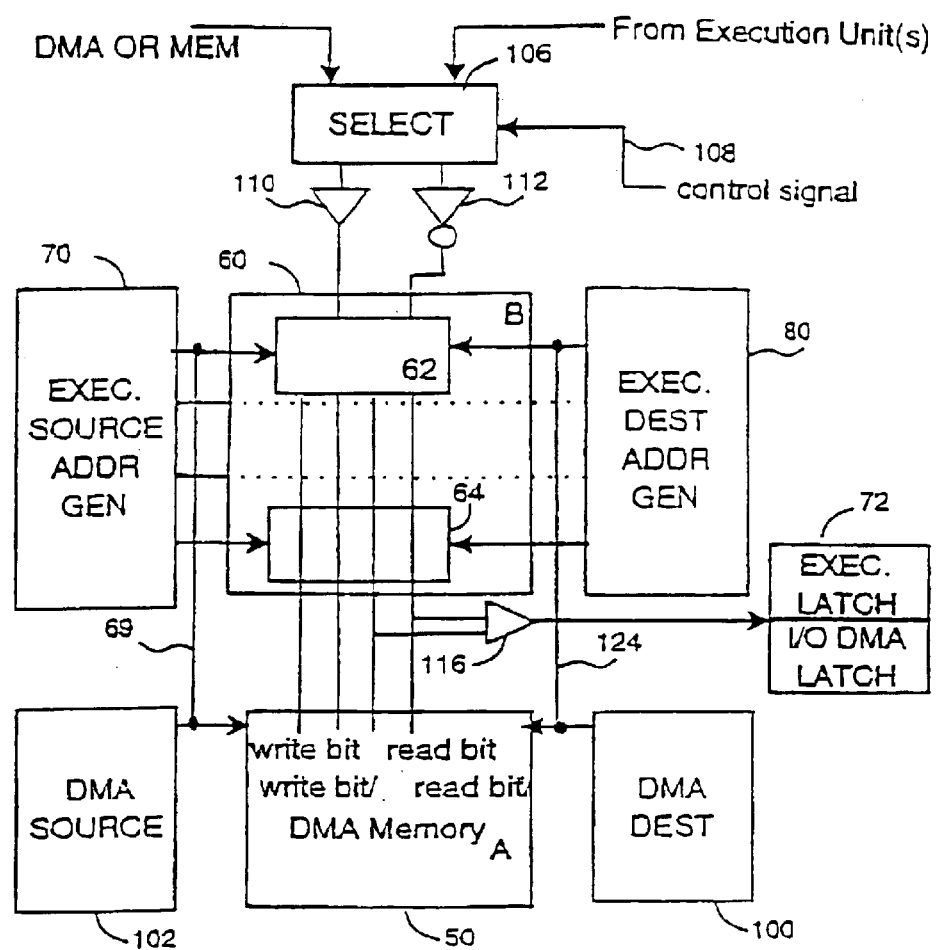
FIG. 3 is a block diagram illustrating portions of the memory circuitry and address generators of FIG. 1 in a fixed-partition memory configuration.

FIG. 3 is a block diagram illustrating a physical design of portions of the memory circuitry and address generators of FIG. 1 in a fixed-partition configuration. By "fixed partition" I mean that the size of memory block A and the size of memory block B cannot change dynamically. In FIG. 3, the memory block A (50) and block B (60) correspond to the same memory blocks of FIG. 1. The memory itself preferably is dynamic RAM, although static RAM or other solid state memory technologies could be used as well. In memory block B, just two bits or memory cells 62 AND 64 are shown by way of illustration. In a typical implementation, the memory block is likely to include thousands or even millions of rows, each row (or word) being perhaps 64 or more bits wide. A typical memory block using today's technology is likely to be one or two megabytes. The memory blocks need not be of equal size. Neither memory depth nor word size is critical to the invention.

Two bits are sufficient here to illustrate the concept without unduly complicating the drawing. The source address generator 70 is coupled to both memory blocks A and B. In block B, the top row includes a series of cells including bit cell 62. In fact, the source address generator preferably has output lines coupled to all of the rows of not only block B, but block A as well, although only one row line is illustrated in block A. Note also that corresponding address lines from the AG 70 and the DMA 102 are shown as connected in common, e.g. at line 69. However, in practice, these address lines are selectable as described above with reference to FIG. 2.

A destination address generator 80 similarly is coupled to the row lines of both blocks of memory. Memory cells 62 and 64 are full two-ported cells on the same column in this example. Thus, either source AG 70 or DMA 102 address the left port, while either destination AG 80 or DMA 100 address the right port. A write select multiplexer 106 directs data either from the DMA (42 in FIG. 1) (or another block of memory) or from the execution unit 90, responsive to a control signal 108. The control signal is provided by the controller or microprocessor of FIG. 1, by a configuration bit, or by an MDSPC. The selected write data is provided to column amplifiers 110, 112 which in turn are connected to corresponding memory cell bit lines. 110 and 112 are bit and /bit ("bit bar") drivers. Below cell 64 is a one-bit sense amplifier 116. A bit output from the sense amp 116 is directed, for example, to a latch 72. Both the DMA and the execution unit are coupled to receive data from latch 72, depending on appropriate control, enable and clock signals (not shown here). Or, both the DMA and the execution path may have separate latches, the specifics being a matter of design choice. Only one sense amp is shown for illustration, while in practice there will be at least one sense amp for each column. Use of multiple sense amps is described later.

FIG. 4

Figure 4:
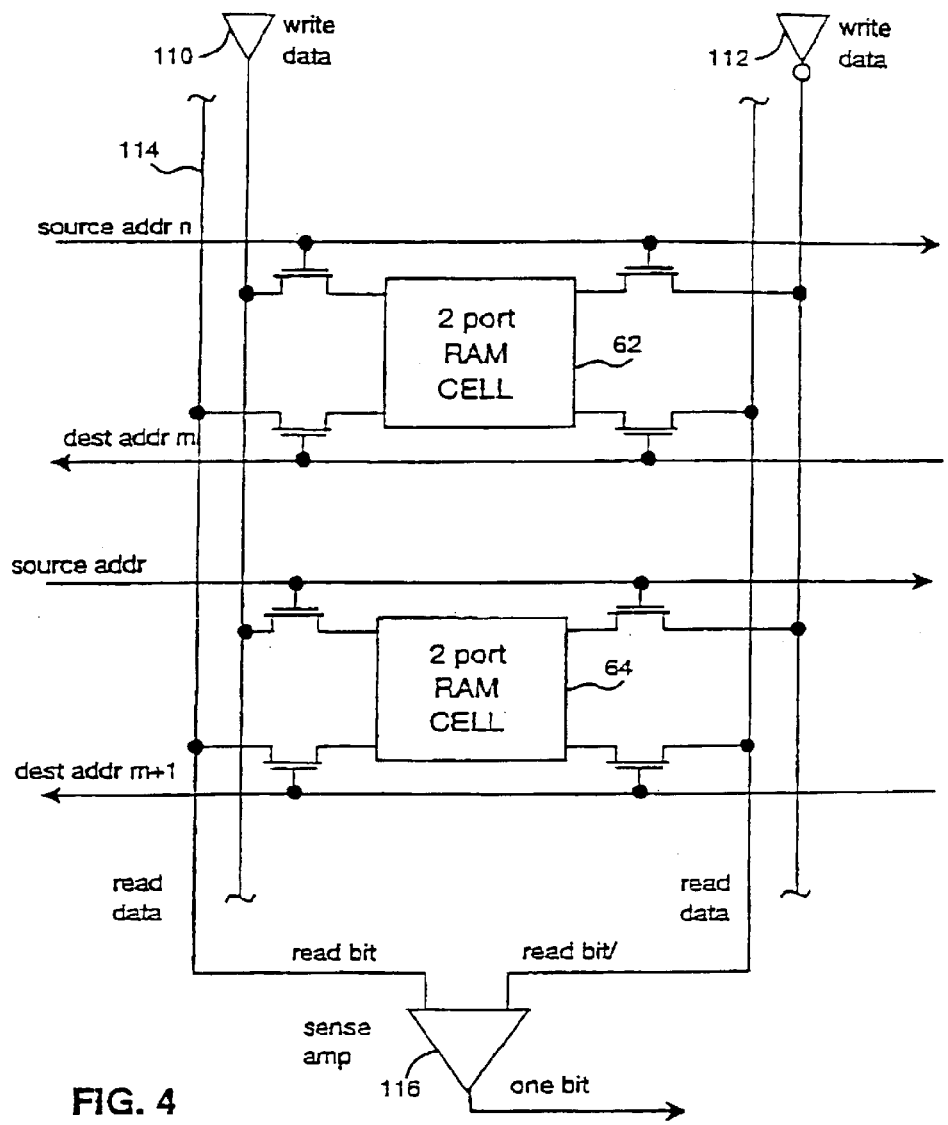
FIG. 4 shows more detail of address and bit line connections in a two-port memory system of the type described.

FIG. 4 shows more detail of the connection of cells of the memory to source and destination address lines. This drawing shows how the source address lines (when asserted) couple the write bit line and its complement, i.e. input lines 110,112 respectively, to the memory cells. The destination address lines couple the cell outputs to the read bit lines 114, 115 and thence to sense amp 116. Although only one column is shown, in practice write and read bit lines are provided for each column across the full width of the memory word. The address lines extend across the full row as is conventional.

Figure 21:
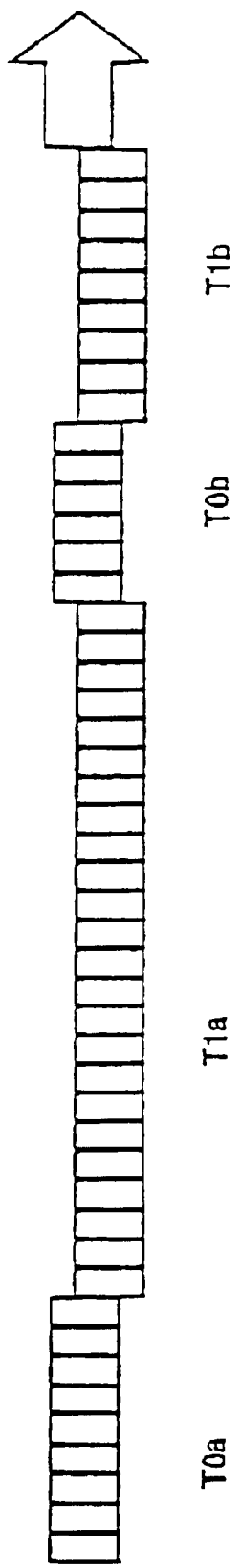
FIG. 21 is a timing diagram illustrating memory swapping cycles.
Figure 22A:
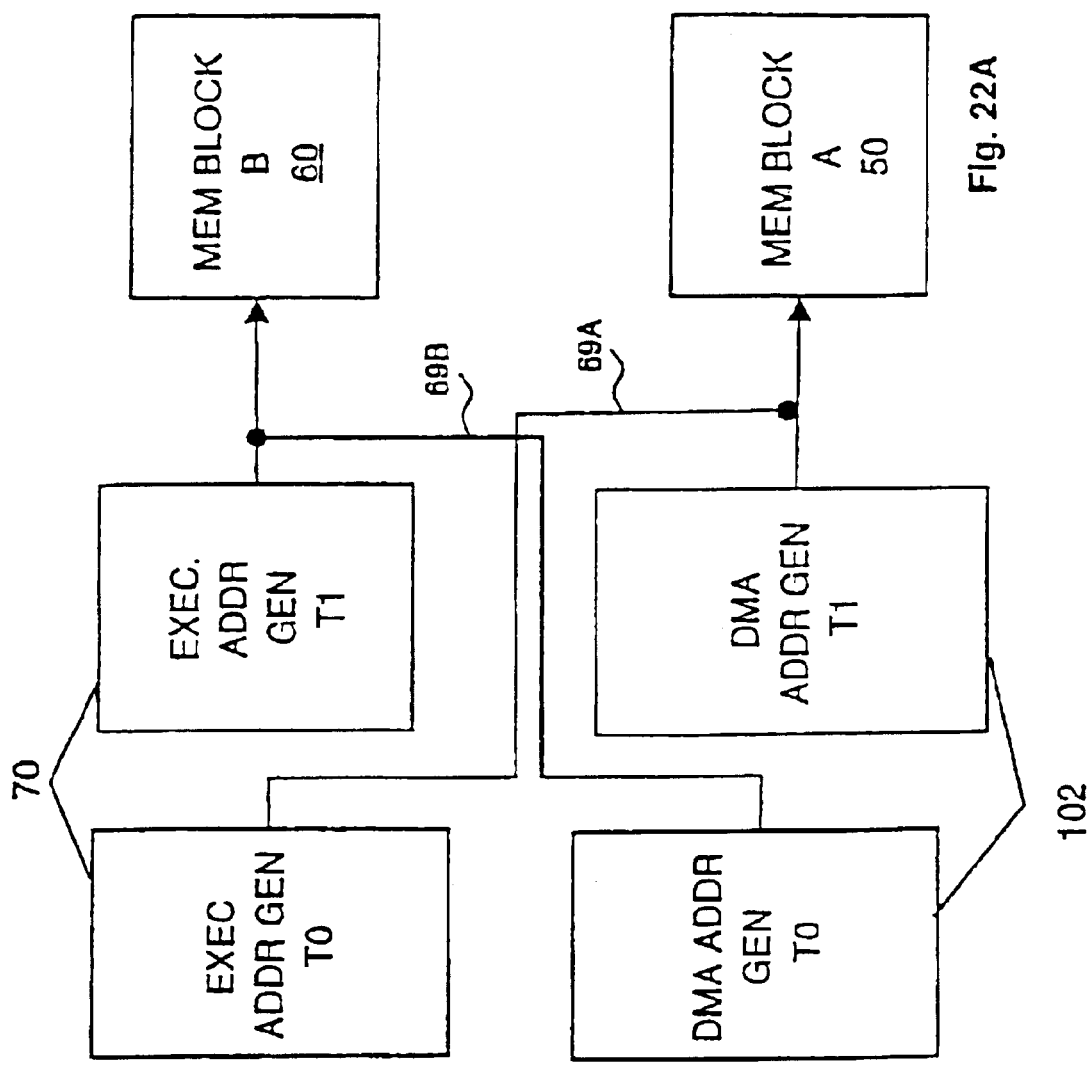
FIG. 22A is a block diagram illustrating memory swapping under bit table control.
Figure 22B:
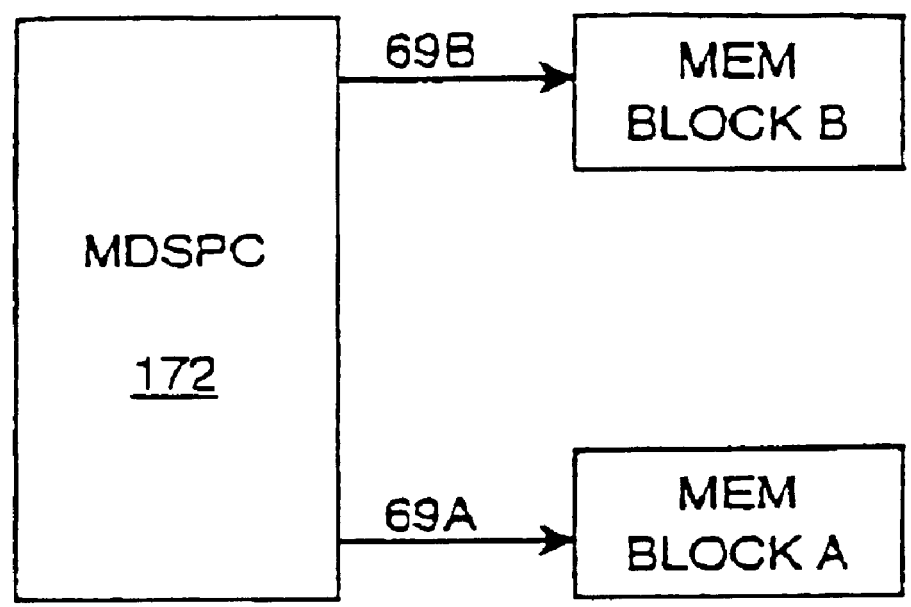
FIG. 22B is a block diagram illustrating memory swapping under MDSPC control.

FIGS. 21, 22A and 22B
Timing

FIG. 21 is a conceptual diagram illustrating an example for the timing of operation of the architecture illustrated in FIG. 1. T0A, T1A, etc., are specific instances of two operating time cycles T0 and T1. The cycle length can be predetermined, or can be a parameter downloaded to the address generators. T0 and T1 are not necessarily the same length and are defined as alternating and mutually exclusive, i.e. a first cycle T1 starts at the end of T0, and a second cycle T0 starts at the end of the first period T1, and so on. Both T0 and T1 are generally longer than the basic clock or memory cycle time.

FIG. 22A is a block diagram of a single port architecture which will be used to illustrate an example of functional memory swapping in the present invention during repeating T0 and T1 cycles. Execution address generator 70 addresses memory block A (50) during T0 cycles. This is indicated by the left (T0) portion of AG 70. During T1 cycles, execution address generator 70 addresses memory block B (60), as indicated by the right portion of 70. During T1, AG 70 also receives setup or configuration data in preparation for again addressing Mem Block A during the next T0 cycle. Similarly, during T0, AG 70 also receives configuration data in preparation for again addressing Mem Block B during the next T1 cycle.

DMA address generator 102 addresses memory block B (60) during T0 cycles. This is indicated by the left (T0) portion of DMA AG 102. During T1 cycles, DMA address generator 102 addresses memory block A (50), as indicated by the right portion of 102. During T1, DMA AG 102 also receives setup or configuration data in preparation for again addressing Mem Block B during the next T0 cycle. Similarly, during T0, DMA 102 also receives configuration data in preparation for again addressing Mem Block A during the next T1 cycle.

During a T0 cycle, the functional execution unit (90 in FIG. 1) is operating continuously on data in memory block A 50 under control of execution address generator 70. Simultaneously, DMA address generator 102 is streaming data into memory block B 60.

At the beginning of a T1 cycle, memory blocks A and B effectively swap such that execution unit 90 will process the data in memory block B 60 under control of execution address generator 70 and data will stream into memory block A 50 under control of DMA address generator 102. Conversely, at the beginning of a T0 cycle, memory blocks A and B again effectively swap such that execution unit 90 will process the data in memory block A 50 under control of execution address generator 70 and data will stream into memory block B 60 under control of DMA address generator 102.

In FIG. 22B, the functions of the execution address generator and DMA address generator are performed by the MDSPC 172 under microcode control.

Figure 5A:
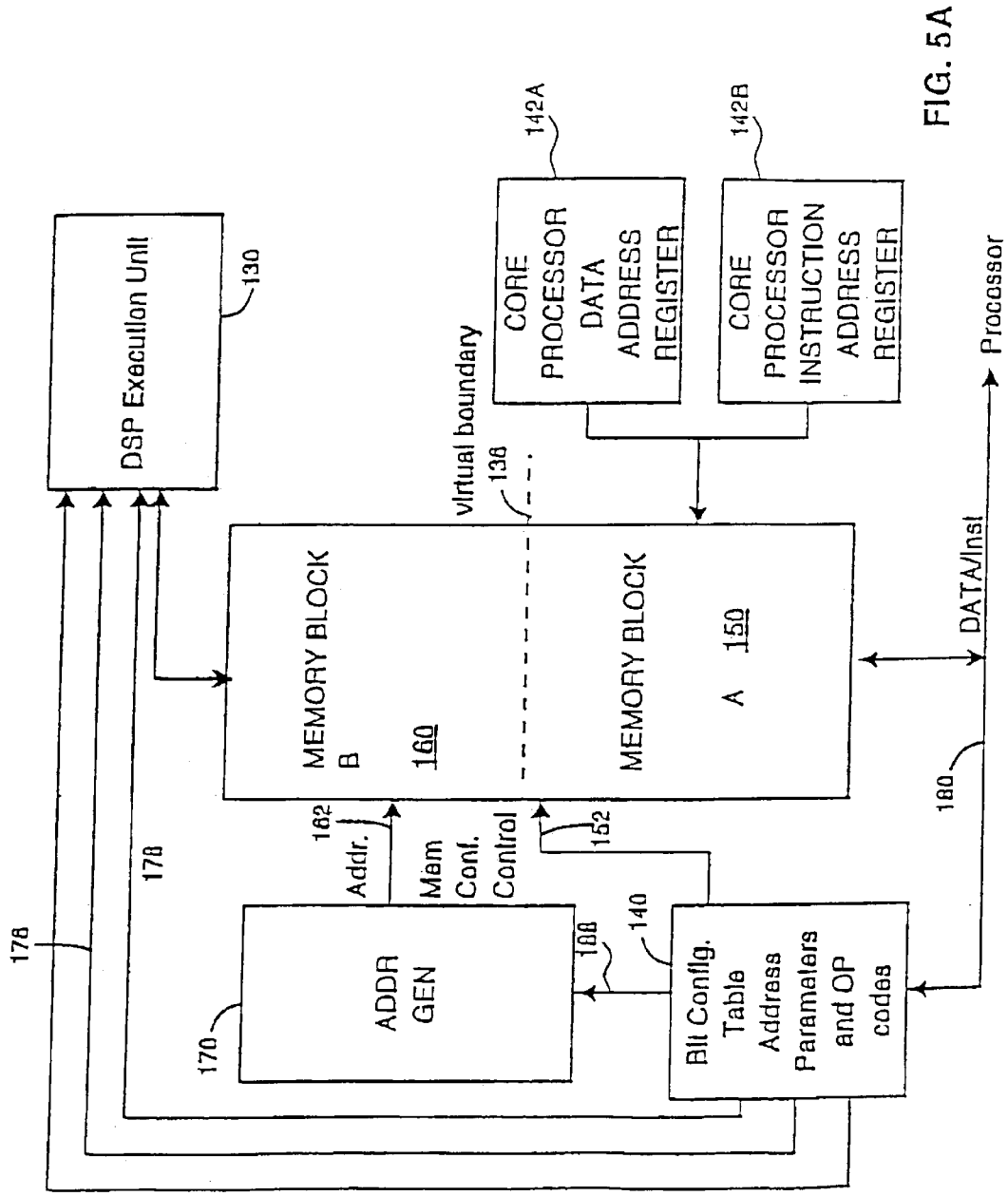
FIGS. 5A–5C illustrate selected address and control signals in a Processor Implementation of a DSP system, i.e. a complete DSP system integrated on a single chip.
Figure 5B:
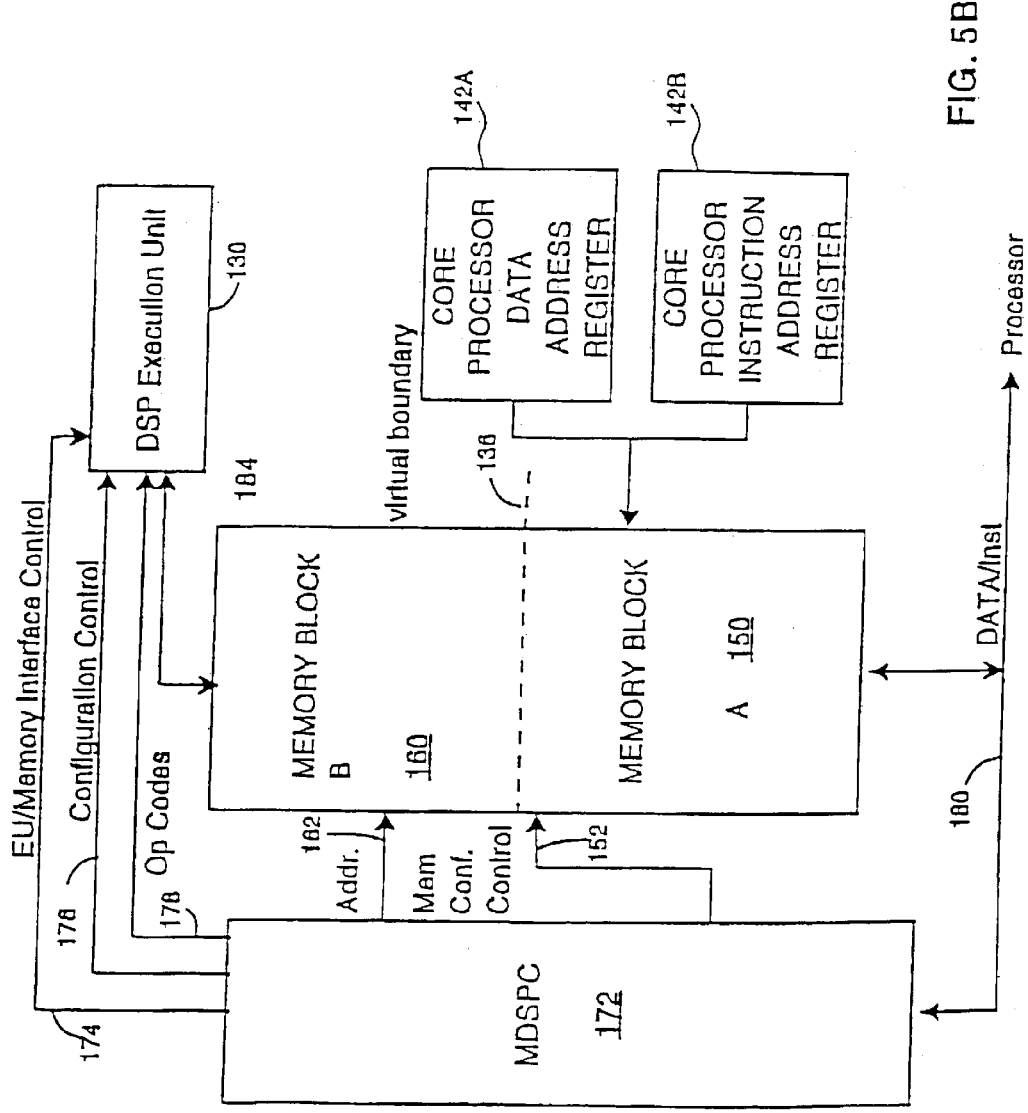
Figure 5C:
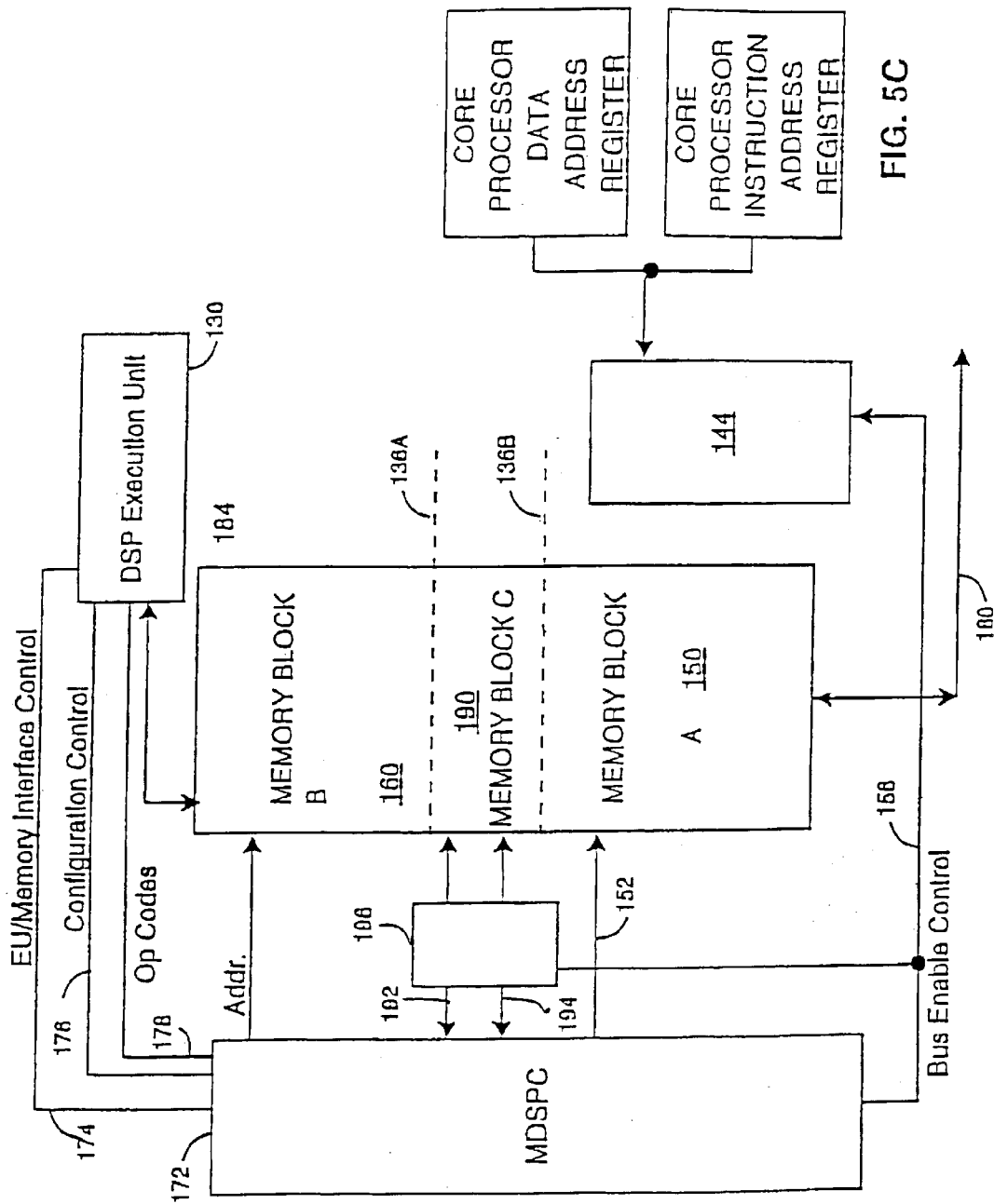

FIGS. 5A–C
Processor Implementation

The preferred architecture for implementation in a processor application, as distinguished from a coprocessor application, is illustrated in FIGS. 5A–C. In FIG. 5A, a two-port memory again comprises a block A (150) and a block B (160). Memory block B is coupled to a DSP execution unit 130. An address generator 170 is coupled to memory block B 160 via address lines 162. In operation, as before, the address generator unit is executing during a first cycle T0 and during time T0 is loading parameters for subsequent execution in cycle T1. The lower memory block A is accessed via core processor data address register 142A or core processor instruction address register 142B. Thus, in this illustration, the data memory and the instructional program memory are located in the same physical memory. A microprocessor system of the Harvard architecture has separate physical memory for data and instructions. The present invention can be used to advantage in the Harvard architecture environment as well, as described below with reference to FIGS. 7A and 7B.

Bit Configuration Tables

FIG. 5A also includes a bit configuration table 140. The bit configuration table can receive and store information from the memory 150 or from the core processor, via bus 180, or from an instruction fetched via the core processor instruction address register 142B. Information is stored in the bit configuration table during cycle T0 for controlling execution during the next subsequent cycle T1. The bit configuration table can be loaded by a series of operations, reading information from the memory block A via bus 180 into the bit configuration tables. This information includes address generation parameters and opcodes. Examples of some of the address parameters are starting address, modulo-address counting, and the length of timing cycles T0 and T1. Examples of op codes for controlling the execution unit are the multiply and accumulate operations necessary for to perform an FFT.

Essentially, the bit configuration table is used to generate configuration control signal 152 which determines the position of virtual boundary 136 and, therefore, the configuration of memory blocks A and B. It also provides the configuration information necessary for operation of the address generator 170 and the DSP execution unit 130 during the T1 execution cycle time. Path 174 illustrates the execution unit/memory interface control signals from the bit configuration table 140 to the DSP execution unit 130. Path 176 illustrates the configuration control signal to the execution unit to reconfigure the execution unit. Path 178 illustrates the op codes sent to execution unit 130 which cause execution unit to perform the operations necessary to process data. Path 188 shows configuration information loaded from the configuration tables into the address generator 170.

The architecture illustrated in FIG. 5A preferably would utilize the extended instructions of a given processor architecture to allow the address register from the instruction memory to create the information flow into the bit configuration table. In other words, special instructions or extended instructions in the controller or microprocessor architecture can be used to enable this mechanism to operate as described above. Such an implementation would provide tight coupling to the microprocessor architecture.

Memory-Centric DSP Controller

FIG. 5B illustrates an embodiment of the present invention wherein the functions of address generator 170 and bit configuration table 140 of FIG. 5A are performed by memory-centric DSP controller (MDSPC) 172. In the embodiment shown in FIG. 5B, the core processor writes microcode for MDSPC 172 along with address parameters into memory block B 150. Then, under core processor control, the microcode and address parameters are downloaded into local memory within MDSPC 172.

A DSP process initiated in MDSPC 172 then generates the appropriate memory configuration control signals 152 and execution unit configuration control signals 176 based upon the downloaded microcode to control the position of virtual boundary 136 and structure execution unit 130 to optimize performance for the process corresponding to the microcode. As the DSP process executes, MDSPC 172 generates addresses for memory block B 160 and controls the execution unit/memory interface to load operands from memory into the execution unit 130 which are then processed by execution unit 130 responsive to op codes 178 sent from MDSPC 172 to execution unit 130. In addition, virtual boundary 136 may be adjusted responsive to microcode during process execution in order to dynamically optimize the memory and execution unit configurations.

In addition, the MDSPC 172 supplies the timing and control for the interfaces between memory and the execution unit. Further, algorithm coefficients to the execution unit may be supplied directly from the MDSPC. The use of microcode in the MDSPC results in execution of the DSP process that is more efficient than the frequent downloading of bit configuration tables and address parameters associated with the architecture of FIG. 5A. The microcoded method represented by the MDSPC results in fewer bits to transfer from the core processor to memory for the DSP process and less frequent updates of this information from the core processor. Thus, the core processor bandwidth is conserved along with the amount of bits required to store the control information.

FIG. 5C illustrates an embodiment of the present invention wherein the reconfigurability of memory in the present invention is used to allocate an additional segment of memory, memory block C 190, which permits MDSPC 172 to execute microcode and process address parameters out of memory block C 190 rather than local memory. This saves the time required for the core processor controlled download of microcode and address parameters to local memory in MDSPC 172 that takes place in the embodiment of FIG. 5B. This embodiment requires an additional set of address 192 and data 194 lines to provide the interface between memory block C 190 and MDSPC 172 and address bus control circuitry 144 under control of MDSPC 172 to disable the appropriate address bits from core processor register file 142. This configuration permits simultaneous access of MDSPC 172 to memory block C 190, DSP execution unit 130 to memory block B and the core processor to memory block A.

Similar to the embodiments shown in FIGS. 5A and 5B, virtual boundaries 136A and 136B are dynamically reconfigurable to optimize the memory configuration for the DSP process executing in MDSPC 172.

The bit tables and microcode discussed above may alternatively reside in durable store, such as ROM or flash memory. The durable store may be part of memory block A or may reside outside of memory block A wherein the content of durable store is transferred to memory block A or to the address generators or MDSPC during system initialization.

Furthermore, the DSP process may be triggered by either decoding a preselected bit pattern corresponding to a DSP function into an address in memory block A containing the bit tables or microcode required for execution of the DSP function. Yet another approach to triggering the DSP process is to place the bit tables or microcode for the DSP function at a particular location in memory block A and the DSP process is triggered by the execution of a jump instruction to that particular location. For instance, at system initialization, the microcode to perform a DSP function, such as a Fast Fourier Transform (FFT) or IIR, is loaded beginning at a specific memory location within memory block A. Thereafter, execution of a jump instruction to that specific memory location causes execution to continue at that location thus spawning the DSP process.

Figure 6A:
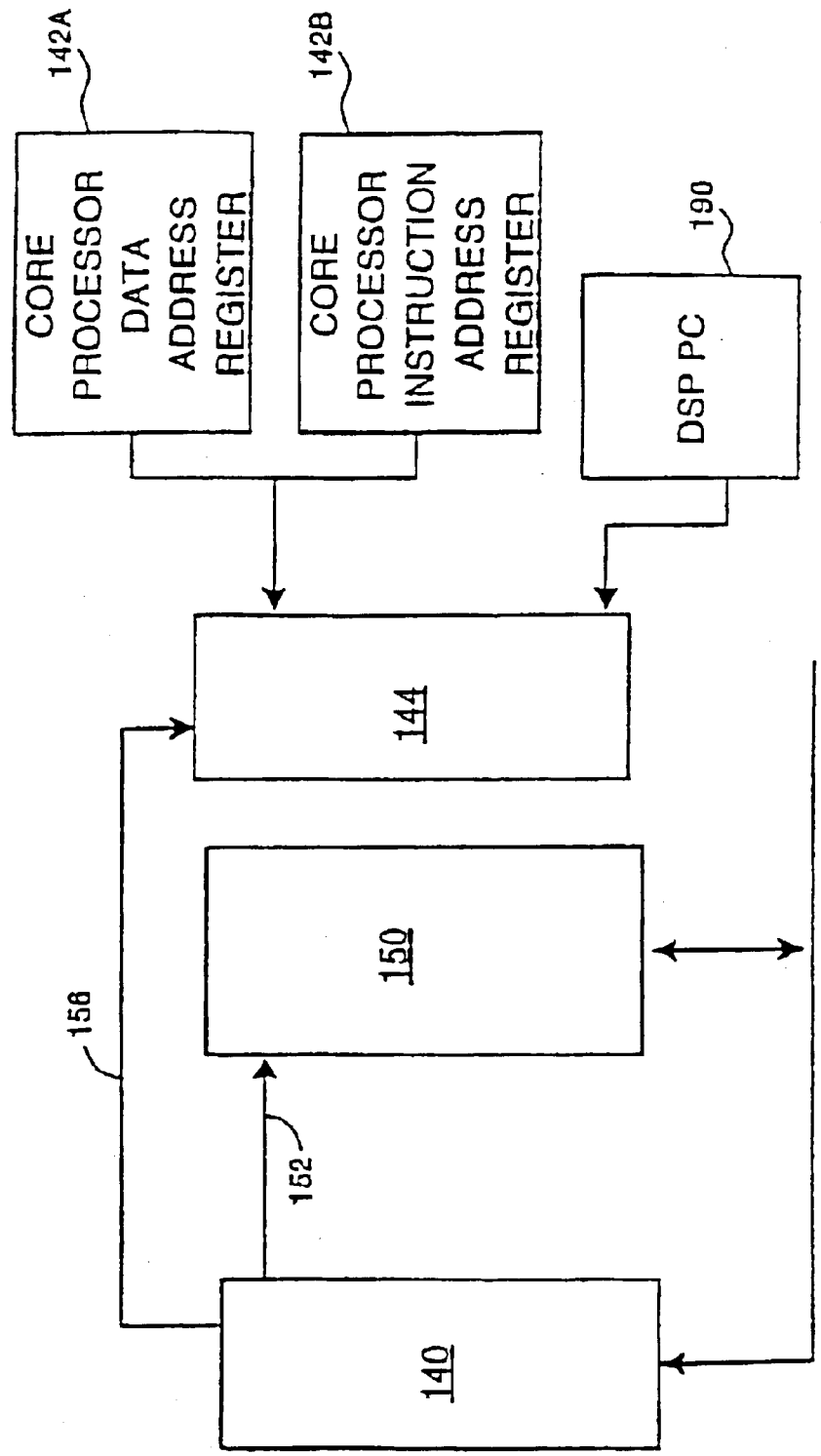
FIG. 6A illustrates an alternative embodiment in which a separate DSP program counter is provided for accessing the memory.

FIGS. 6A and 6B

Referring now to FIG. 6A, in an alternative embodiment, a separate program counter 190 is provided for DSP operations. The core controller or processor (not shown) loads information into the program counter 190 for the DSP operation and then that program counter in turn addresses the memory block 150 to start the process for the DSP. Information required by the DSP operations would be stored in memory. Alternatively, any register of the core processor, such as data address register 142A or instruction address register 142B, can be used for addressing memory 150. Bit Configuration Table 140, in addition to generating memory configuration signal 152, produces address enable signal 156 to control address bus control circuitry 144 in order to select the address register which accesses memory block A and also to selectively enable or disable address lines of the registers to match the memory configuration (i.e. depending on the position of virtual boundary 136, address bits are enabled if the bit is needed to access all of memory block A and disabled if block A is smaller than the memory space accessed with the address bit).

Thus, FIG. 6A shows the DSP program counter 190 being loaded by the processor with an address to move into memory block A. In that case, the other address sources in register file 142 are disabled, at least with respect to addressing memory 150. In short, three different alternative mechanisms are illustrated for accessing the memory 150 in order to fetch the bit configurations and other parameters 140. The selection of which addressing mechanism is most advantageous may depend upon the particular processor architecture with which the present invention is implemented.

FIG. 6B shows an embodiment wherein MDSPC 172 is used to generate addresses for memory block A in place of DSP PC 190. Address enable signal 156 selects between the address lines of MDSPC 172 and those of register file 142 in response to the microcode executed by MDSPC 172. As discussed above, if the microcode for MDSPC 172 resides in memory block A or a portion thereof, MDSPC 172 will be executing out of memory block A and therefore requires access to the content of memory block A.

Memory Arrangement

Referring again to FIG. 5, memory blocks A (150) and B (160) are separated by "virtual boundary" 136. In other words, block A and block B are portions of a single, common memory, in a preferred embodiment. The location of the "virtual boundary" is defined by the configuration control signal generated responsive to the bit configuration table parameters. In this regard, the memory is reconfigurable under software control. Although this memory has a variable boundary, the memory preferably is part of the processor memory, it is not contemplated as a separate memory distinct from the processor architecture. In other words, in the processor application illustrated by FIGS. 5 and 6, the memory as shown and described is essentially reconfigurable directly into the microprocessor itself. In such a preferred embodiment, the memory block B, 160, duly configured, executes into the DSP execution unit as shown in FIG. 5.

In regard to FIG. 5B, virtual boundary 136 is controlled based on the microcode downloaded to MDSPC 172. Similarly, in FIG. 5C, microcode determines the position of both virtual boundary 136A and 136B to create memory block C 190.

Figure 7A:
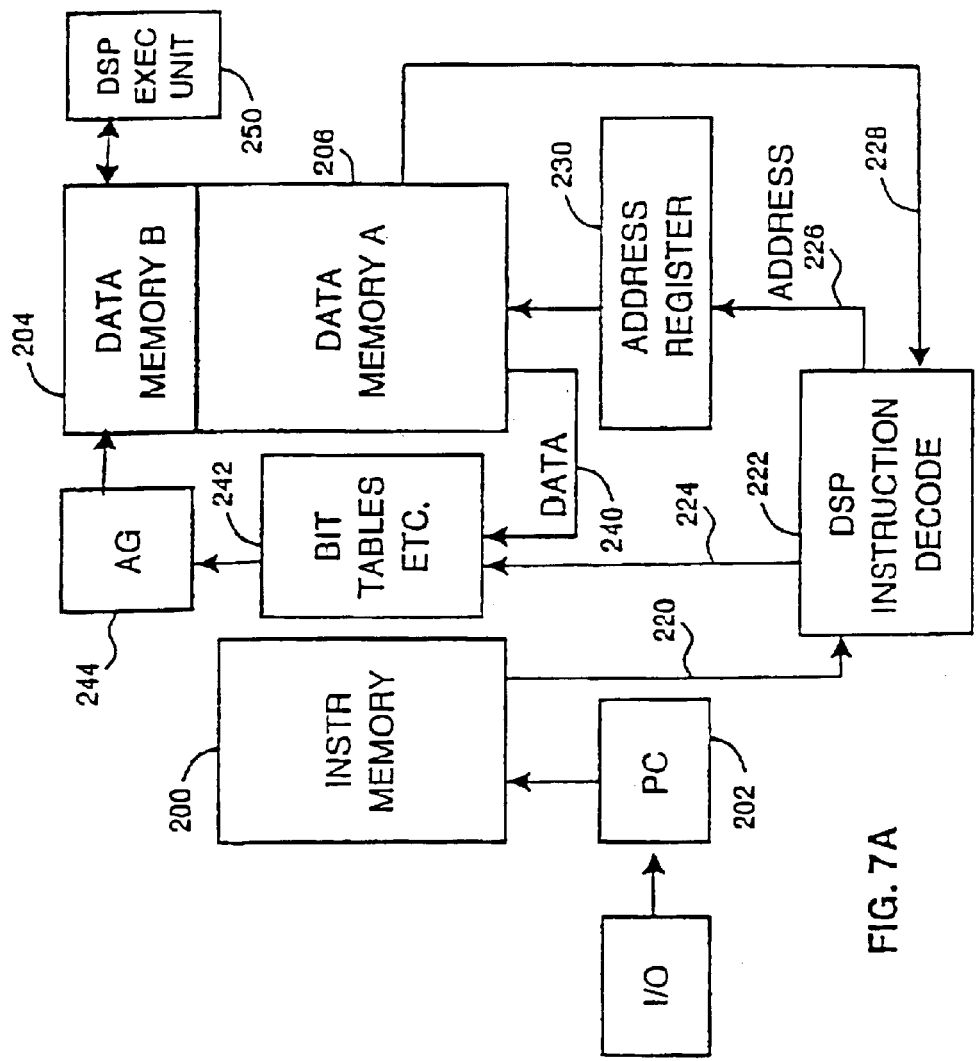
FIGS. 7A–B are block diagrams that illustrate embodiments of the invention in a Harvard architecture.
Figure 7B:
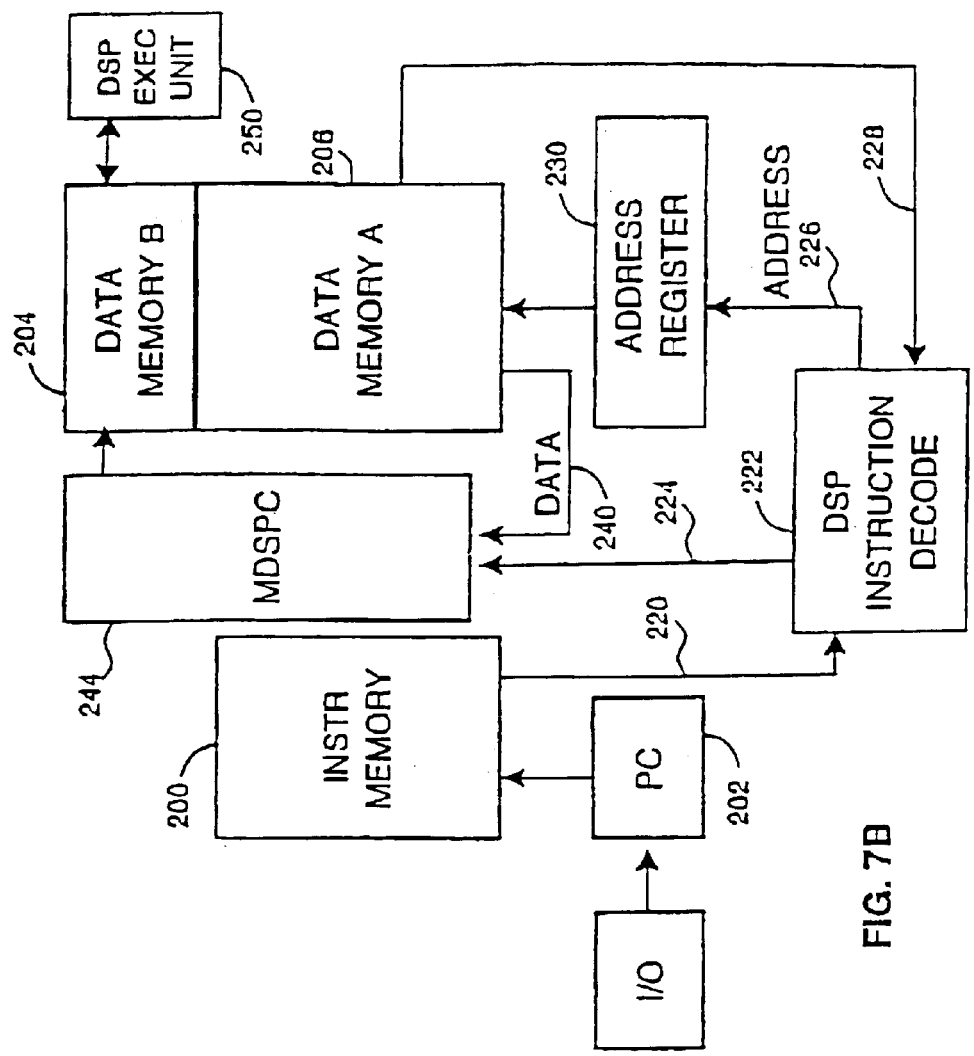

FIGS. 7A and 7B

FIG. 7A illustrates an alternative embodiment, corresponding to FIG. 5A, of the present invention in a Harvard-type architecture, comprising a data memory block A 206 and block B 204, and a separate core processor instruction memory 200. The instruction memory 200 in addressed by a program counter 202. Instructions fetched from the instruction memory 200 pass via path 220 to a DSP instruction decoder 222. The instruction decoder in turn provides addresses for DSP operations, table configurations, etc., to an address register 230. Address register 230 in turn addresses the data memory block A 206. Data from the memory passes via path 240 to load the bit configuration tables etc. 242 which in turn configure the address generator for addressing the data memory block B during the next execution cycle of the DSP execution unit 250. FIG. 6 thus illustrates an alternative approach to accessing the data memory A to fetch bit configuration data. A special instruction is fetched from the instruction memory that includes an opcode field that indicates a DSP operation, or more specifically, a DSP configuration operation, and includes address information for fetching the appropriate configuration for the subroutine.

In the embodiment of FIG. 7B, corresponding to the embodiments in FIGS. 5B and 5C, MDSPC 246 replaces AG 244 and Bit Configuration Table 242. Instructions in core processor instruction memory 200 that correspond to functions to be executed by DSP Execution Unit 250 are replaced with a preselected bit pattern which is not recognized as a valid instruction by the core processor. DSP Instruction Decode 222 decodes the preselected bit patterns and generates an address for DSP operations and address parameters stored in data memory A and also generates a DSP control signal which triggers the DSP process in MDSPC 246. DSP Instruction Decode 222 can also be structured to be responsive to output data from data memory A 206 into producing the addresses latched in address register 230.

The DSP Instruction Decode 222 may be reduced or eliminated if the DSP process is initiated by an instruction causing a jump to the bit table or microcode in memory block A pertaining to the execution of the DSP process.

To summarize, the present invention includes an architecture that features shared, reconfigurable memory for efficient operation of one or more processors together with one or more functional execution units such as DSP execution units. FIG. 6A shows an implementation of a sequence of operations, much like a subroutine, in which a core controller or processor loads address information into a DSP program counter, in order to fetch parameter information from the memory. FIG. 6B shows an implementation wherein the DSP function is executed under the control of an MDSPC under microcode control. In FIGS. 5A–C, the invention is illustrated as integrated with a von Neumann microprocessor architecture. FIGS. 7A and 7B illustrate applications of the present invention in the context of a Harvard-type architecture. The system of FIG. 1 illustrates an alternative stand-alone or coprocessor implementation. Next is a description of how to implement a shared, reconfigurable memory system.

Reconfigurable Memory Architecture

FIG. 8

Figure 8:
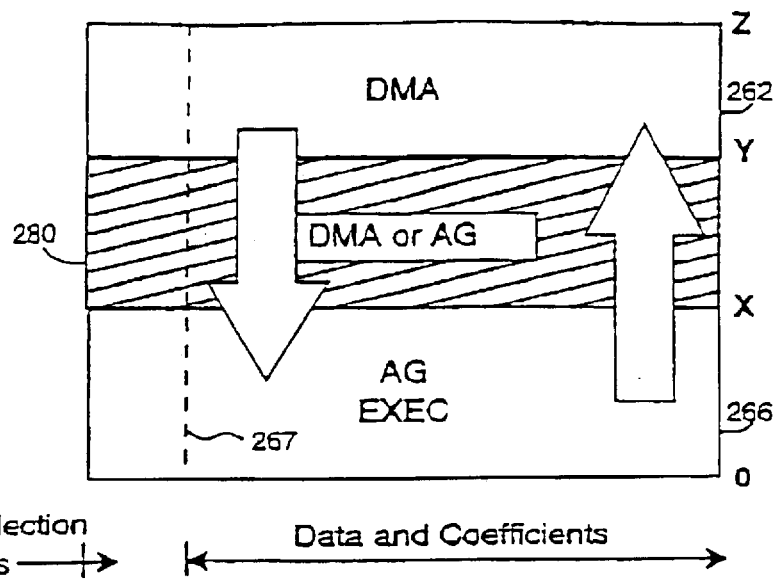
FIG. 8 is a conceptual diagram that illustrates a shared, reconfigurable memory architecture according to the present invention.

FIG. 8 is a conceptual diagram illustrating a reconfigurable memory architecture for DSP according to another aspect of the present invention. In FIG. 8, a memory or a block of memory includes rows from 0 through Z. A first portion of the memory 266, addresses 0 to X, is associated, for example, with an execution unit (not shown). A second (hatched) portion of the memory 280 extends from addresses from X+1 to Y. Finally, a third portion of the memory 262, extending from addresses Y+1 to Z, is associated, for example, with a DMA or I/O channel. By the term "associated" here we mean a given memory segment can be accessed directly by the designated DMA or execution unit as further explained herein. The second segment 280 is reconfigurable in that it can be switched so as to form a part of the execution segment 266 or become part of the DMA segment 262 as required.

The large vertical arrows in FIG. 8 indicate that the execution portion and the DMA portion of the memory space can be "swapped" as explained previously. The reconfigurable segment 280 swaps together with whichever segment it is coupled to at the time. In this block of memory, each memory word or row includes data and/or coefficients, as indicated on the right side of the figure.

Additional "configuration control bits" are shown to the left of dashed line 267. This extended portion of the memory can be used for storing a bit configuration table that provides configuration control bits as described previously with reference to the bit configuration table 140 of FIGS. 5A and 6A. These selection bits can include write enable, read enable, and other control information. So, for example, when the execution segment 266 is swapped to provide access by the DMA channel, configuration control bits in 266 can be used to couple the DMA channel to the I/O port of segment 266 for data transfer. In this way, a memory access or software trap can be used to reconfigure the system without delay.

The configuration control bits shown in FIG. 8 are one method of effecting memory reconfiguration that relates to the use of a separate address generator and bit configuration table as shown in FIGS. 5A and 7A. This approach effectively drives an address configuration state machine and requires considerable overhead processing to maintain the configuration control bits in a consistent and current state.

When the MDSPC of FIGS. 5B, 5C and 7B is used, the configuration control bits are unnecessary because the MDSPC modifies the configuration of memory algorithmically based upon the microcode executed by the MDSPC. Therefore, the MDSPC maintains the configuration of the memory internally rather than as part of the reconfigured memory words themselves.

FIG. 9

Figure 9:
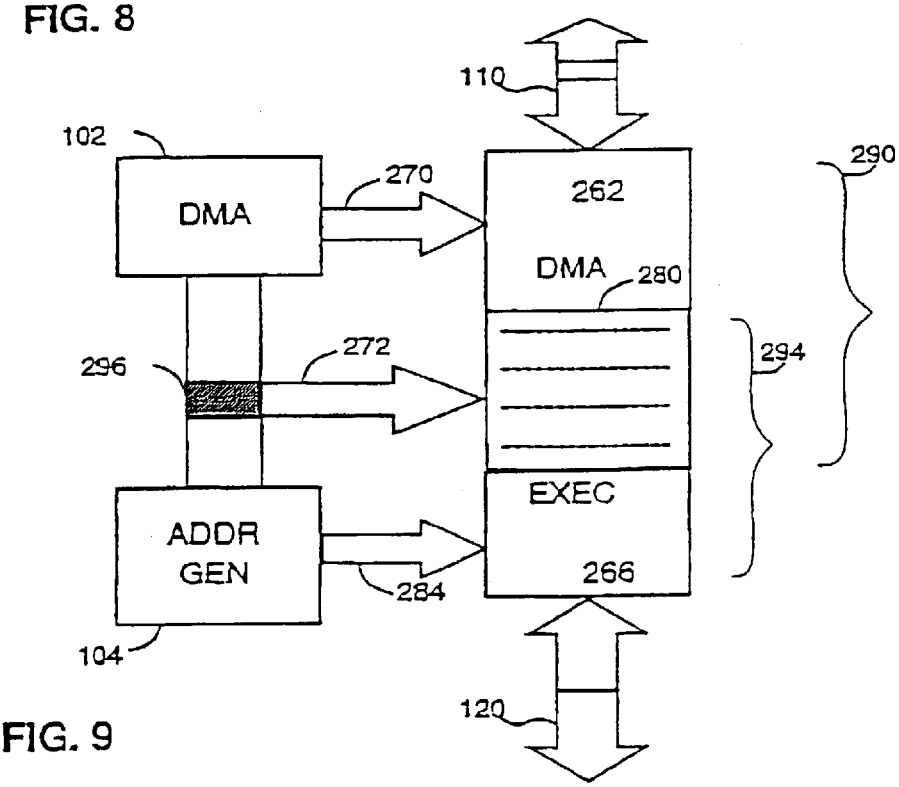
FIG. 9 illustrates connection of address lines to a shared, reconfigurable memory with selectable (granular) partitioning of the reconfigurable portion of the memory.

FIG. 9 illustrates connection of address and data lines to a memory of the type described in FIG. 8. Referring to FIG. 9, a DMA or I/O channel address port 102 provides sufficient address lines for accessing both the rows of the DMA block of memory 262, indicated as bus 270, as well as the reconfigurable portion of the memory 280, via additional address lines indicated as bus 272. When the block 280 is configured as a part of the DMA portion of the memory, the DMA memory effectively occupies the memory space indicated by the brace 290 and the address lines 272 are controlled by the DMA channel 102. FIG. 9 also shows an address generator 104 that addresses the execution block of memory 266 via bus 284. Address generator 104 also provides additional address lines for controlling the reconfigurable block 280 via bus 272. Thus, when the entire reconfigurable segment 280 is joined with the execution block 266, the execution block of memory has a total size indicated by brace 294, while the DMA portion is reduced to the size of block 262.

The address lines that control the reconfigurable portion of the memory are switched between the DMA address source 102 and address generator 104 via switching means 296. Illustrative switching means for addressing a single block of memory from multiple address generators was described above, for example with reference to FIG. 2. The particular arrangement depends in part on whether the memory is single-ported (see FIG. 2) or multi-ported (see FIGS. 3–4). Finally, FIG. 9 indicates data access ports 110 and 120. The upper data port 110 is associated with the DMA block of memory, which, as described, is of selectable size. Similarly, port 120 accesses the execution portion of the memory. Circuitry for selection of input (write) data sources and output (read) data destinations for a block of memory was described earlier. Alternative structures and implementation of multiple reconfigurable memory segments are described below.

It should be noted that the entire block need not be switched in toto to one memory block or the other. Rather, the reconfigurable block preferably is partitionable so that a selected portion (or all) of the block can be switched to join the upper or lower block. The granularity of this selection (indicated by the dashed lines in 280) is a matter of design choice, at a cost of additional hardware, e.g. sense amps, as the granularity increases, as further explained later.

FIG. 10

Figure 10:
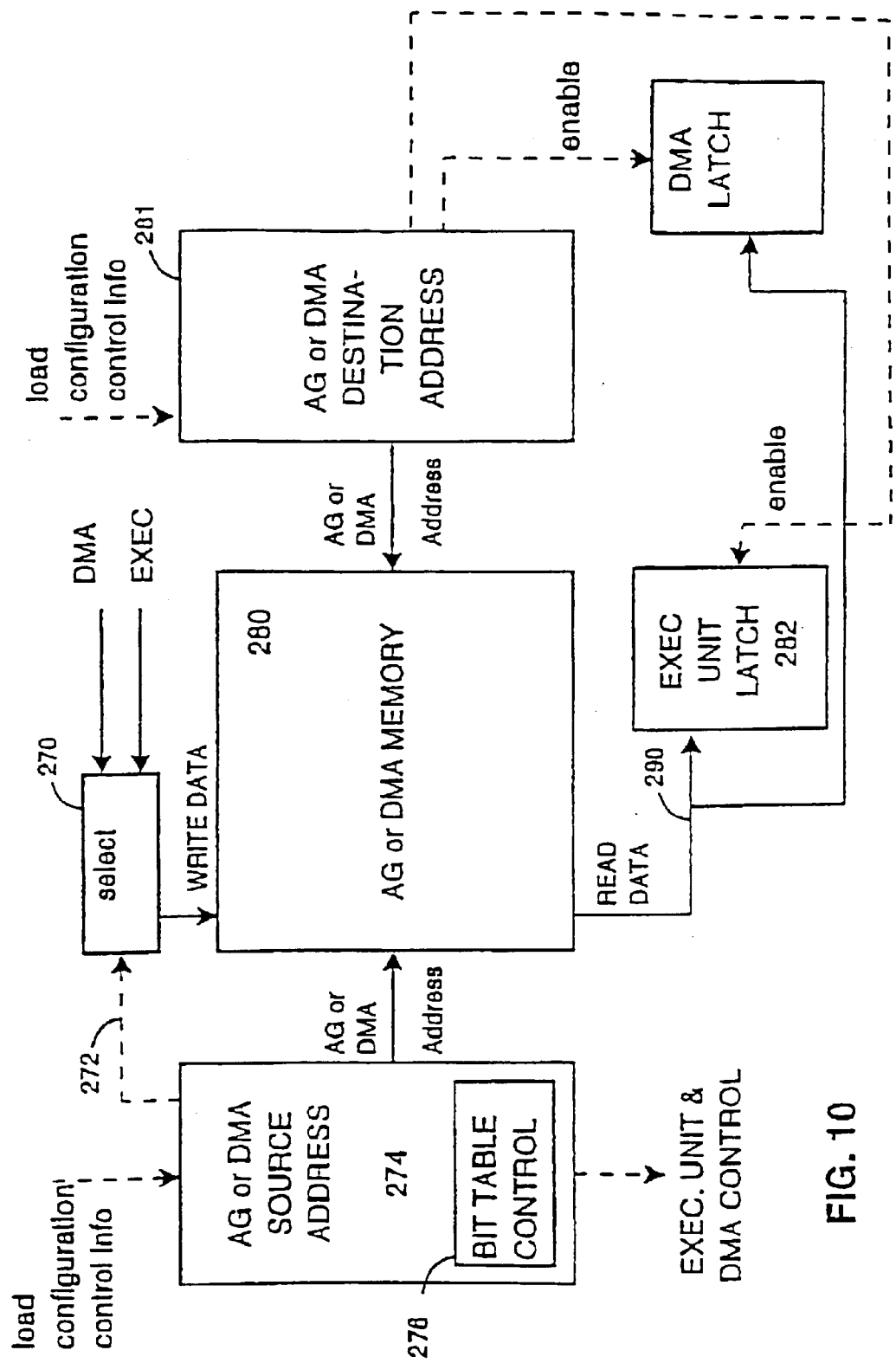
FIG. 10 illustrates a system that implements a reconfigurable segment of memory under bit selection table control.

FIG. 10 illustrates a system that implements a reconfigurable segment of memory 280 under bit selection table control. In FIG. 10, a reconfigurable memory segment 280 receives a source address from either the AG or DMA source address generator 274 and it receives a destination address from either the AG or DMA destination address generator 281. Write control logic 270, for example a word wide multiplexer, selects write input data from either the DMA channel or the execution unit according to a control signal 272. The source address generator 274 includes bit table control circuitry 276. The configuration control circuitry 276, either driven by a bit table or under microcode control, generates the write select signal 272. The configuration control circuitry also determines which source and destination addresses lines are coupled to the memory—either "AG" (address generator) when the block 280 is configured as part of the an "AG" memory block for access by the execution unit, or the "DMA" address lines when the block 280 is configured as part of the DMA or I/O channel memory block. Finally, the configuration control logic provides enable and/or clock controls to the execution unit 282 and to the DMA channel 284 for controlling which destination receives read data from the memory output data output port 290.

FIG. 11

Figure 11A:
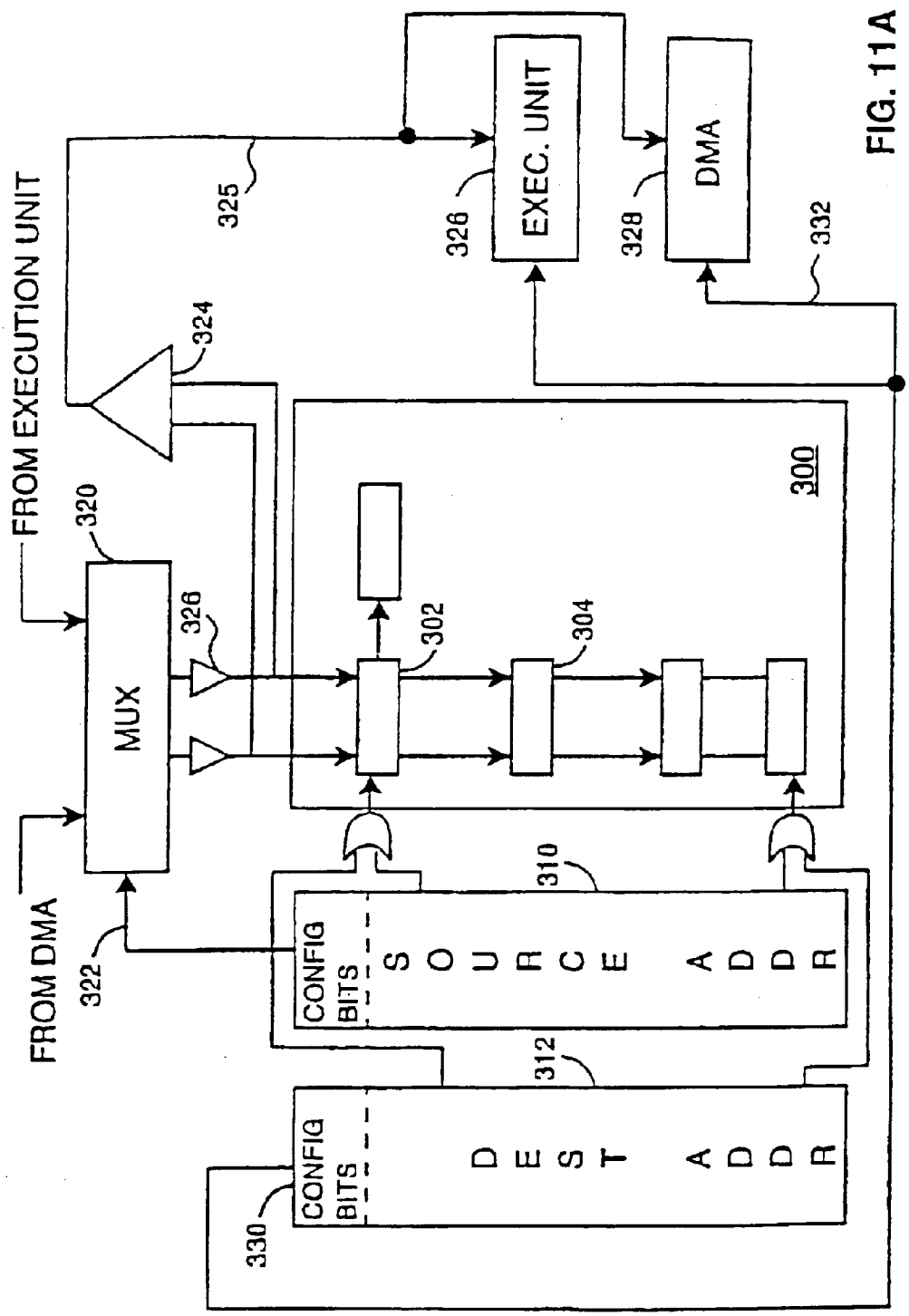
FIG. 11A is a block diagram illustrating an example of using single-ported RAM in a DSP computing system according to the present invention.
Figure 11B:
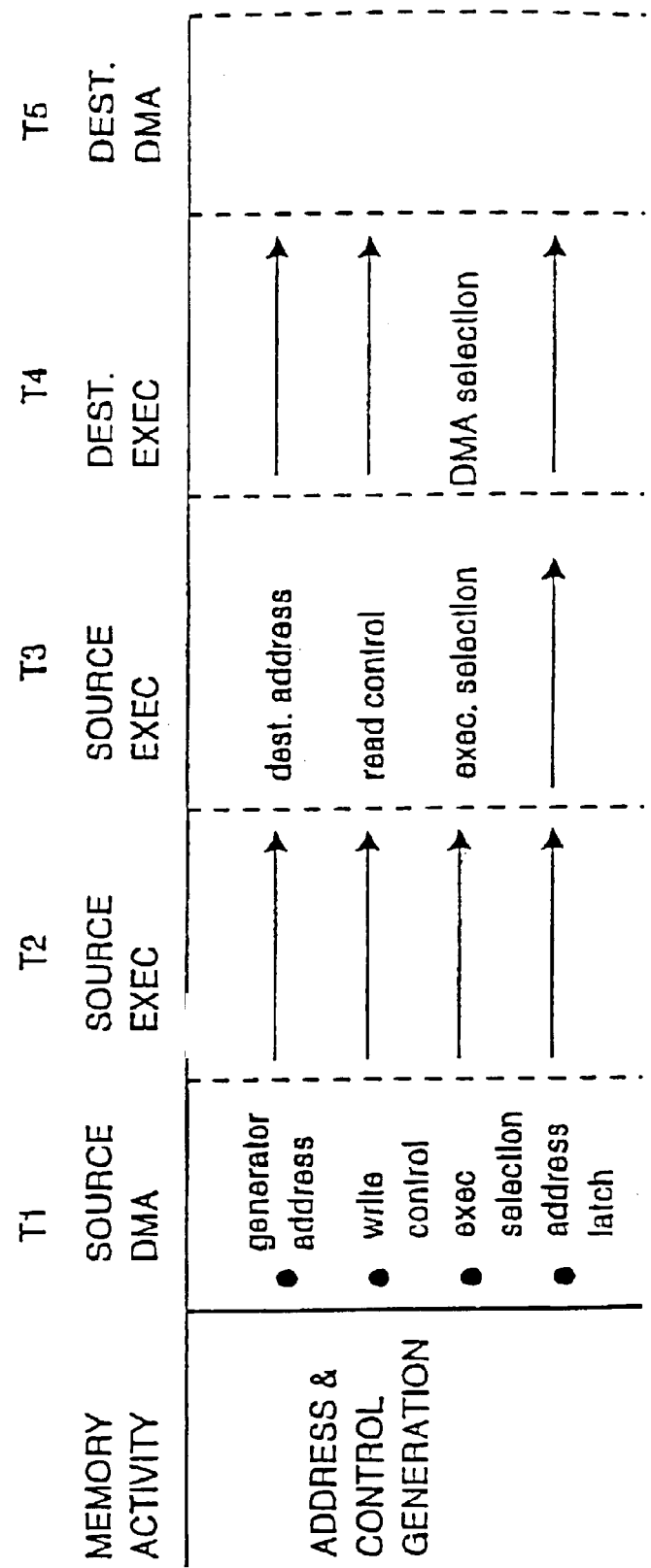
FIG. 11B is a table illustrating a pipelined timing sequence for addressing and accessing the one-port memory so as to implement a "virtual two-port" memory.

FIG. 11 is a partial block/partial schematic diagram illustrating the use of a single ported RAM in a DSP computing system according to the present invention. In FIG. 11, a single-ported RAM 300 includes a column of memory cells 302, 304, etc. Only a few cells of the array are shown for clarity. A source address generator 310 and destination address generator 312 are arranged for addressing the memory 300. More specifically, the address generators are arranged to assert a selected one address line at a time to a logic high state. The term "address generator" in this context is not limited to a conventional DSP address generator. It could be implemented in various ways, including a microprocessor core, microcontroller, programmable sequencer, etc. Address generation can be provided by a micro-coded machine. Other implementations that provide DSP type of addressing are deemed equivalents. However, known address generators do not provide control and configuration functions such as those illustrated in FIG. 10—configuration bits 330.

For each row of the memory 300, the corresponding address lines from the source and destination blocks 310, 312, are logically "ORed" together, as illustrated by OR gate 316, with reference to the top row of the memory comprising memory cell 302. Only one row address line is asserted at a given time. For writing to the memory, a multiplexer 320 selects data either from the DMA or from the execution unit, according to a control signal 322 responsive to the configuration bits, in the source address generator 310. The selected data is applied through drivers 326 to the corresponding column of the memory array 300 (only one column, i.e. one pair of bit lines, is shown in the drawing). For each column, the bit lines also are coupled to a sense amplifier 324, which in turn provides output or write data to the execution unit 326 and to the DMA 328 via path 325. The execution unit 326 is enabled by an execution enable control signal responsive to the configuration bits 330 in the destination address block 312. Configuration bits 330 also provide a DMA control enable signal at 332.

The key here is to eliminate the need for a two-ported RAM cell by using a logical OR of the last addresses from the destination and source registers (located in the corresponding destination or source address generators). Source and destination operations are not simultaneous, but operation is still fast. A source write cycle followed by a destination read cycle would take only a total time of two memory cycles.

FIG. 12

Figure 12:
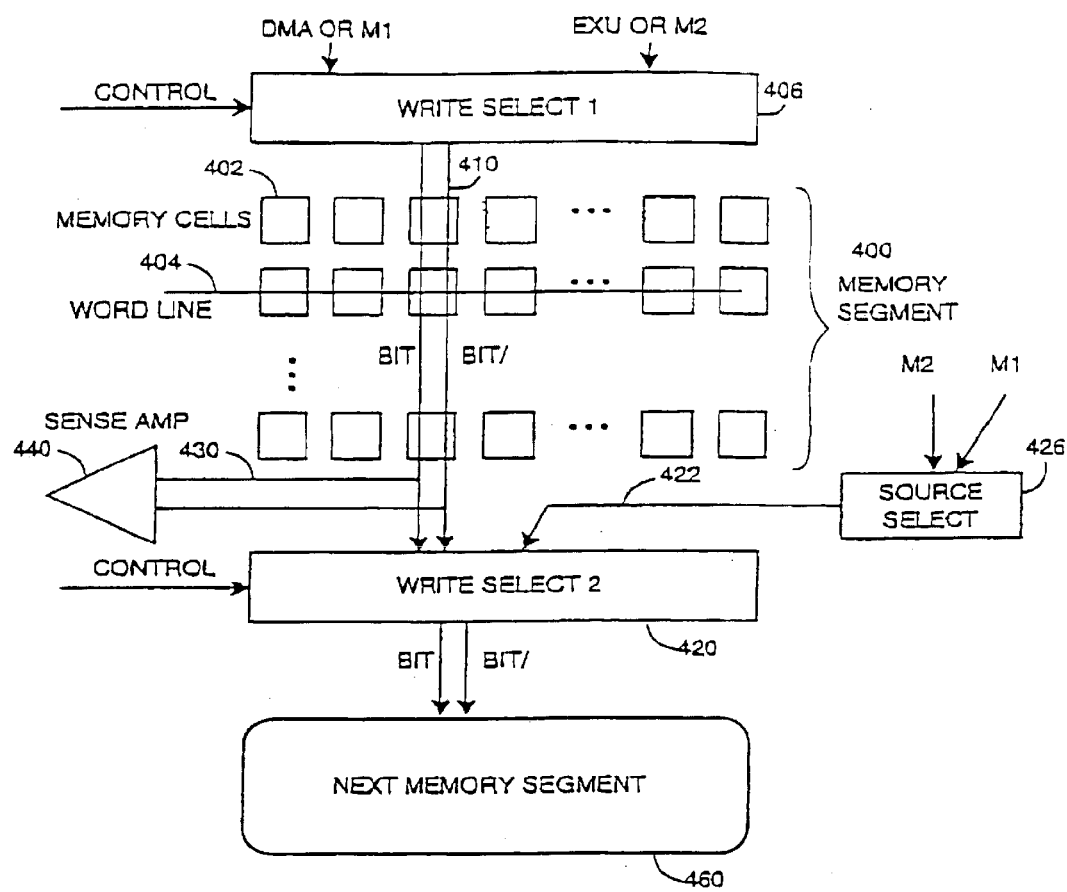
FIG. 12 illustrates a block of memory having at least one reconfigurable segment with selectable write and read data paths.

FIG. 12. The techniques and circuits described above for reconfigurable memory can be extended to multiple blocks of memory so as to form a highly flexible architecture for digital signal processing. FIG. 12 illustrates a first segment of memory 400 and a second memory segment 460. In the first segment 400, only a few rows and a few cells are shown for purposes of illustration. One row of the memory begins at cell 402, a second row of the memory begins at cell 404, etc. Only a single bit line pair, 410, is shown for illustration. At the top of the figure, a first write select circuit such as a multiplexer 406 is provided for selecting a source of write input data. For example, one input to the select circuit 406 may be coupled to a DMA channel or memory block M1. A second input to the MUX 406 may be coupled to an execution unit or another memory block M2. In this discussion, we use the designations M1, M2, etc., to refer generically, not only to other blocks of memory, but to execution units or other functional parts of a DSP system in general. The multiplexer 406 couples a selected input source to the bit lines in the memory segment 400. The select circuit couples all, say 64 or 128 bit lines, for example, into the memory. Preferably, the select circuit provides the same number of bits as the word size.

The bit lines, for example bit line pair 410, extend through the memory array segment to a second write select circuit 420. This circuit selects the input source to the second memory segment 460. If the select circuit 420 selects the bit lines from memory segment 400, the result is that memory segment 400 and the second memory segment 460 are effectively coupled together to form a single block of memory. Alternatively, the second select circuit 420 can select write data via path 422 from an alternative input source. A source select circuit 426, for example a similar multiplexer circuit, can be used to select this input from various other sources, indicated as M2 and M1. When the alternative input source is coupled to the second memory segment 460 via path 422, memory segment 460 is effectively isolated from the first memory segment 400. In this case, the bit lines of memory segment 400 are directed via path 430 to sense amps 440 for reading data out of the memory segment 400. When the bitlines of memory segment 400 are coupled to the second segment 460, sense amps 440 can be sent to a disable or low power standby state, since they need not be used.

FIG. 13

Figure 13:
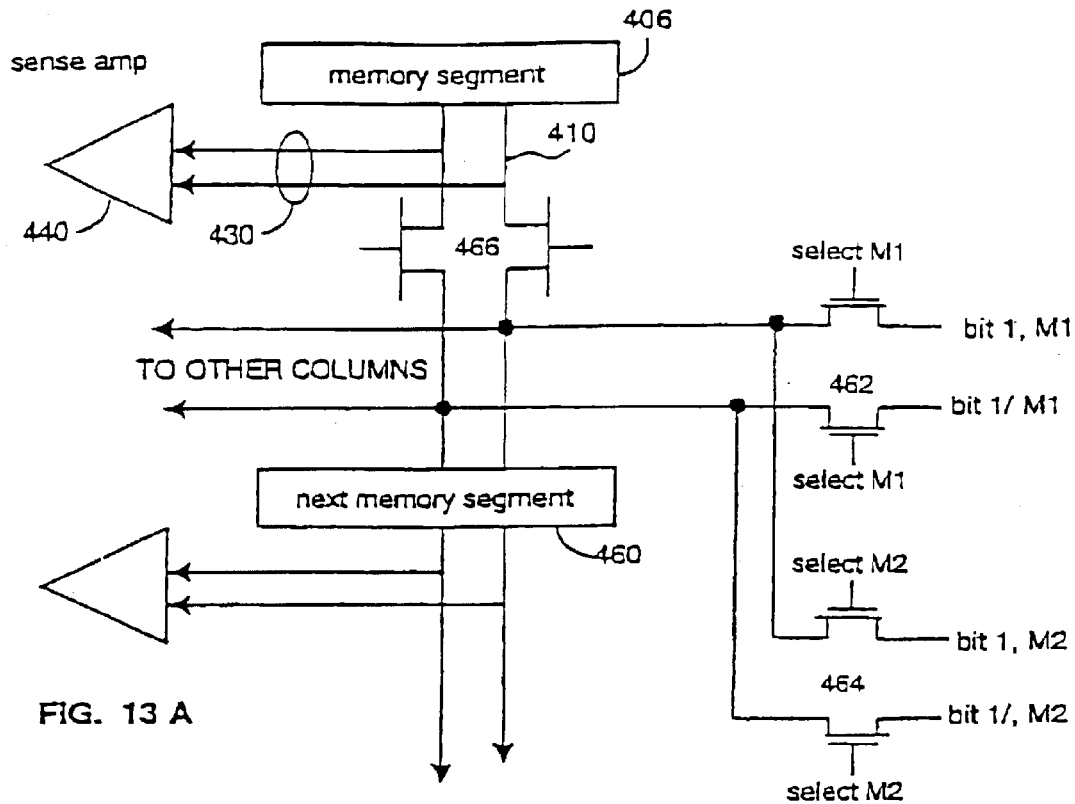
FIG. 13A is a schematic diagram showing detail of one example of the write selection circuitry of the reconfigurable memory of FIG. 12.
FIG. 13B illustrates transistor pairs arranged for propagating or isolating bit lines as an alternative to transistors 466 in FIG. 13A or as an alternative to the bit select transistors 462, 464 of FIG. 13A.
Figure 13:
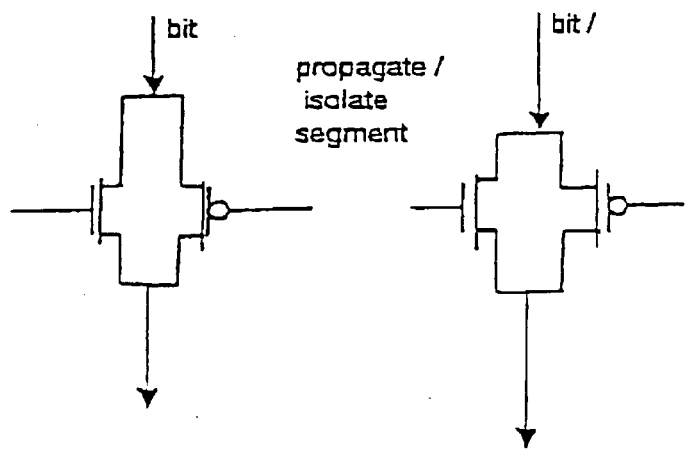

FIG. 13 shows detail of the input selection logic for interfacing multiple memory segments. In FIG. 13, the first memory segment bit line pair 410 is coupled to the next memory segment 460, or conversely isolated from it, under control of pass devices 466. When devices 466 are turned off, read data from the first memory segment 406 is nonetheless available via lines 430 to the sense amps 440. The input select logic 426 includes a first pair of pass transistors 426 for connecting bit lines from source M1 to bit line drivers 470. A second pair of pass transistors 464 controllably couples an alternative input source M2 bit lines to drivers 470. The pass devices 462, 464, and 466, are all controllable by control bits originating, for example, in the address generator circuitry described above with reference to FIG. 9. Pass transistors, transmission gates or the like can be considered equivalents for selecting input (write data) sources.

FIG. 14

Figure 14:
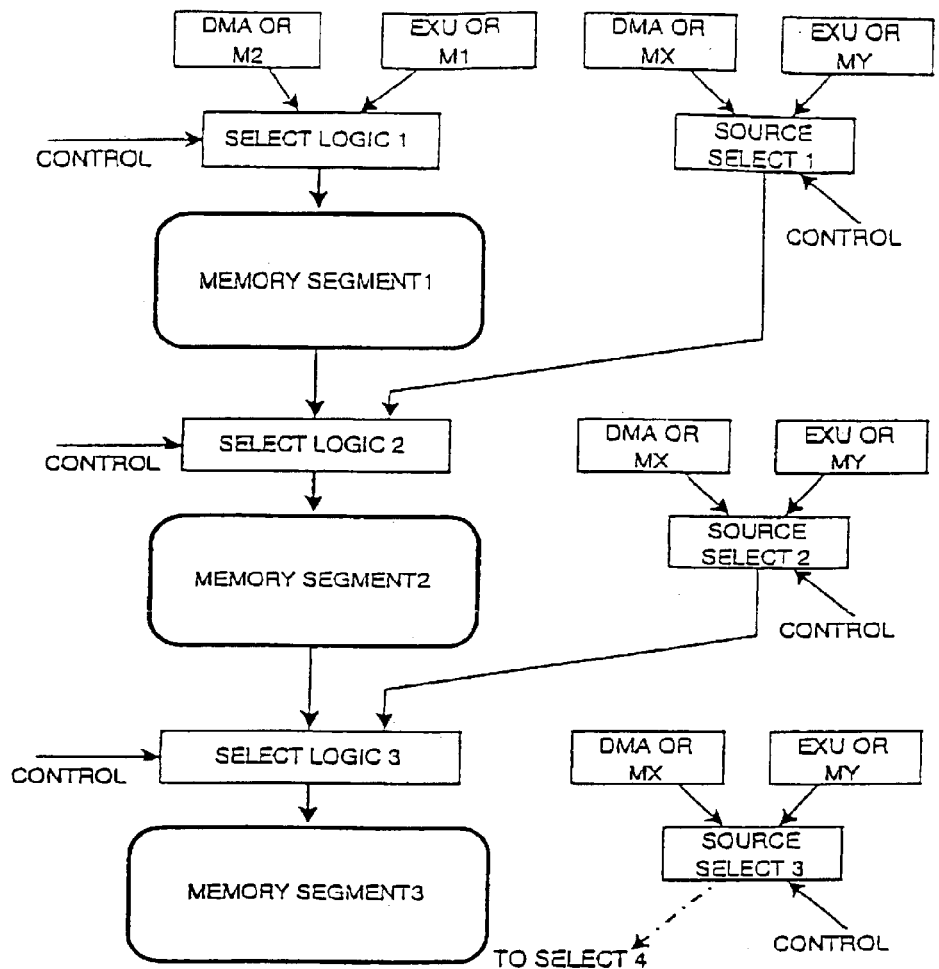
FIG. 14 is a block diagram illustrating extension of the shared, reconfigurable memory architecture to multiple segments of memory.

FIG. 14 is a high-level block diagram illustrating extension of the architectures of FIGS. 12 and 13 to a plurality of memory segments. Details of the selection logic and sense amps is omitted from this drawing for clarity. In general, this drawing illustrates how any available input source can be directed to any segment of the memory under control of the configuration bits.

Figure 15:
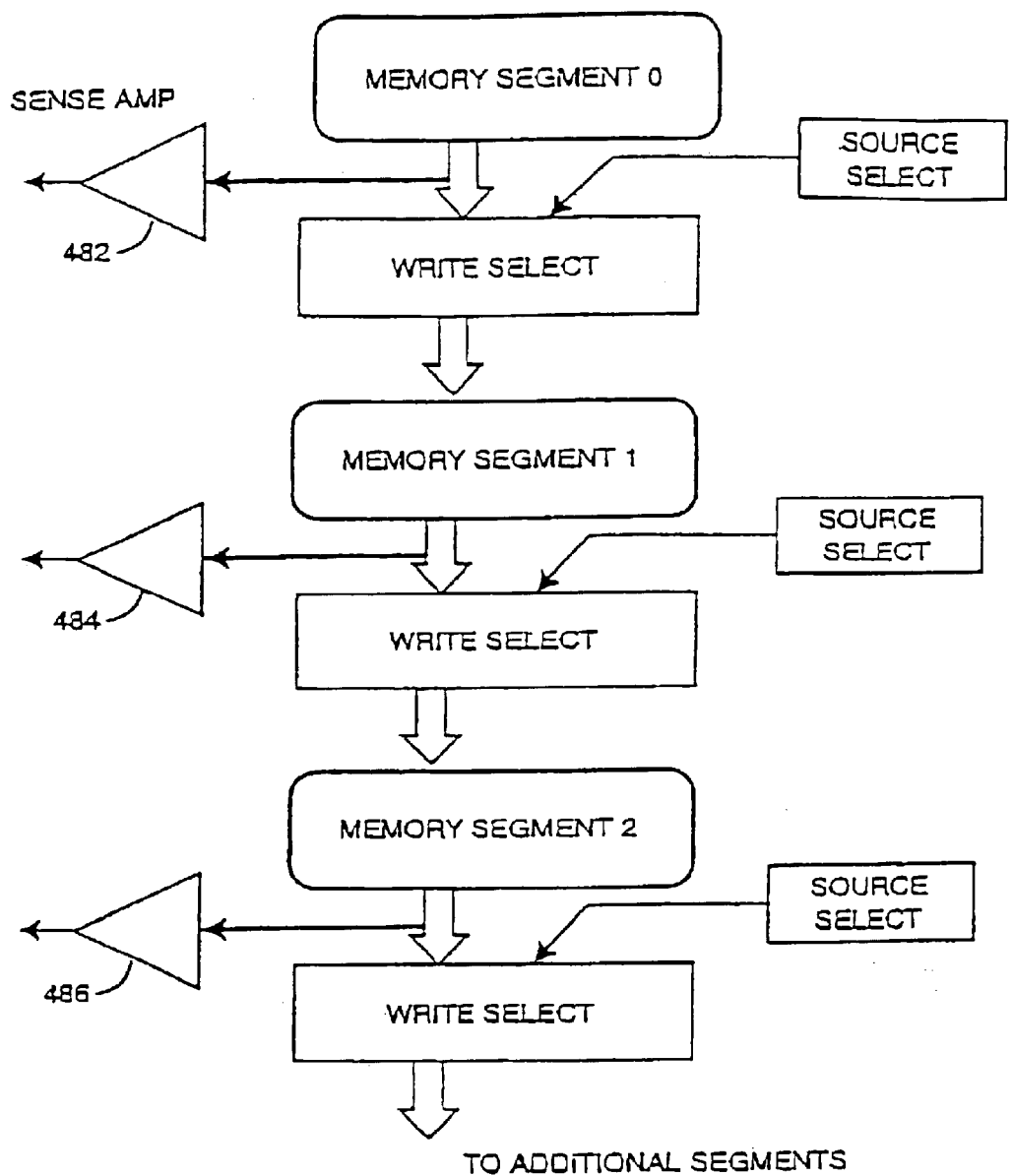
FIG. 15 is a simplified block diagram illustrating multiple reconfigurable memory segments with multiple sets of sense amps.

FIG. 15 is another block diagram illustrating a plurality of configurable memory segments with selectable input sources, as in FIG. 14. In this arrangement, multiple sense amps 482, 484, 486, are coupled to a common data output latch 480. When multiple memory segments are configured together so as to form a single block, fewer than all of the sense amps will be used. For example, if memory segment 0 and memory segment 1 are configured as a single block, sense amp 484 provides read bits from that combined block, and sense amp 482 can be idle.

Figure 16A:
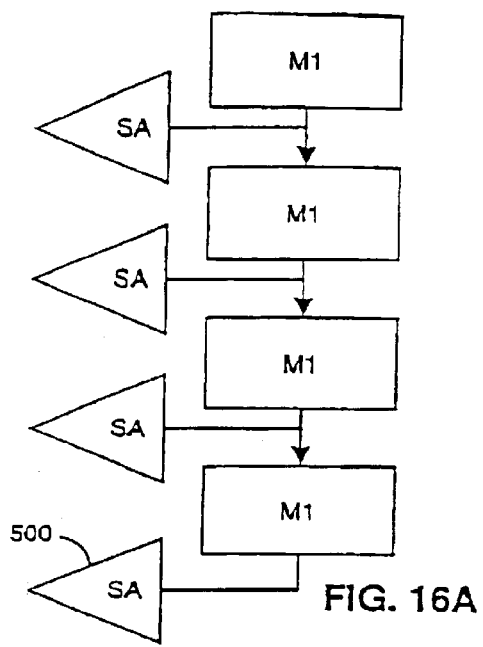
FIGS. 16A–16D are simplified block diagrams illustrating various examples of memory segment configurations to form memory blocks of selectable size.
Figure 16B:
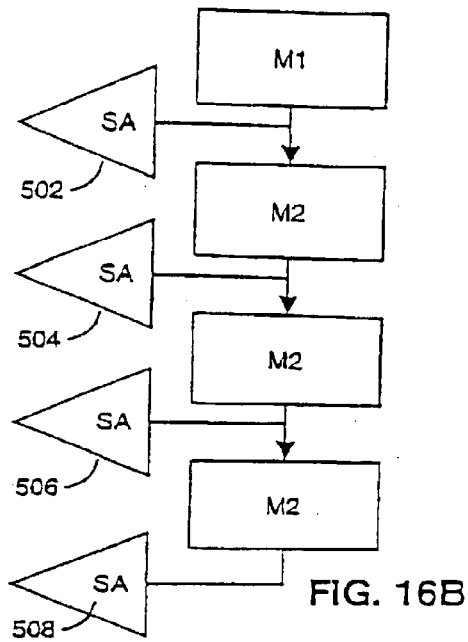
Figure 16C:
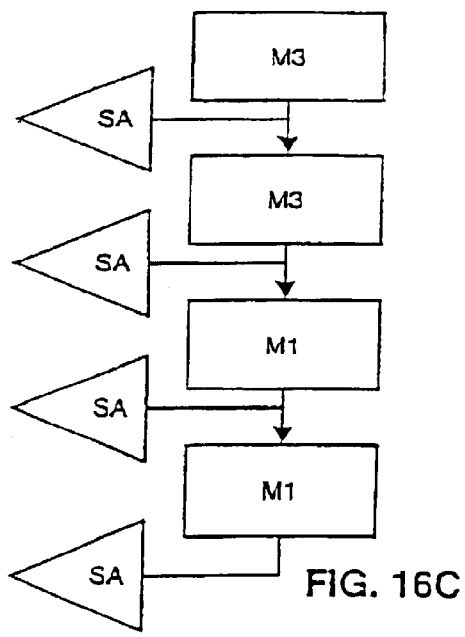
Figure 16D:
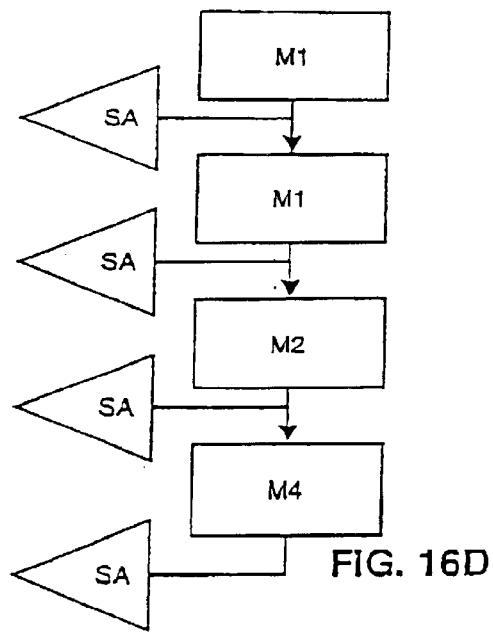

FIGS. 16A through 16D are block diagrams illustrating various configurations of multiple, reconfigurable blocks of memory. As before, the designations M1, M2, M3, etc., refer generically to other blocks of memory, execution units, I/O channels, etc. In FIG. 16A, four segments of memory are coupled together to form a single, large block associated with input source M1. In this case, a single sense amp 500 can be used to read data from this common block of memory (to a destination associated with M1). In FIG. 16B, the first block of memory is associated with resource M1, and its output is provided through sense amp 502. The other three blocks of memory, designated M2, are configured together to form a single block of memory—three segments long— associated with resource M2. In this configuration, sense amp 508 provides output from the common block (3×M2), while sense amps 504 and 506 can be idle. FIGS. 16C and 16D provide additional examples that are self explanatory in view of the foregoing description. This illustration is not intended to imply that all memory segments are of equal size. To the contrary, they can have various sizes as explained elsewhere herein.

Figure 17:
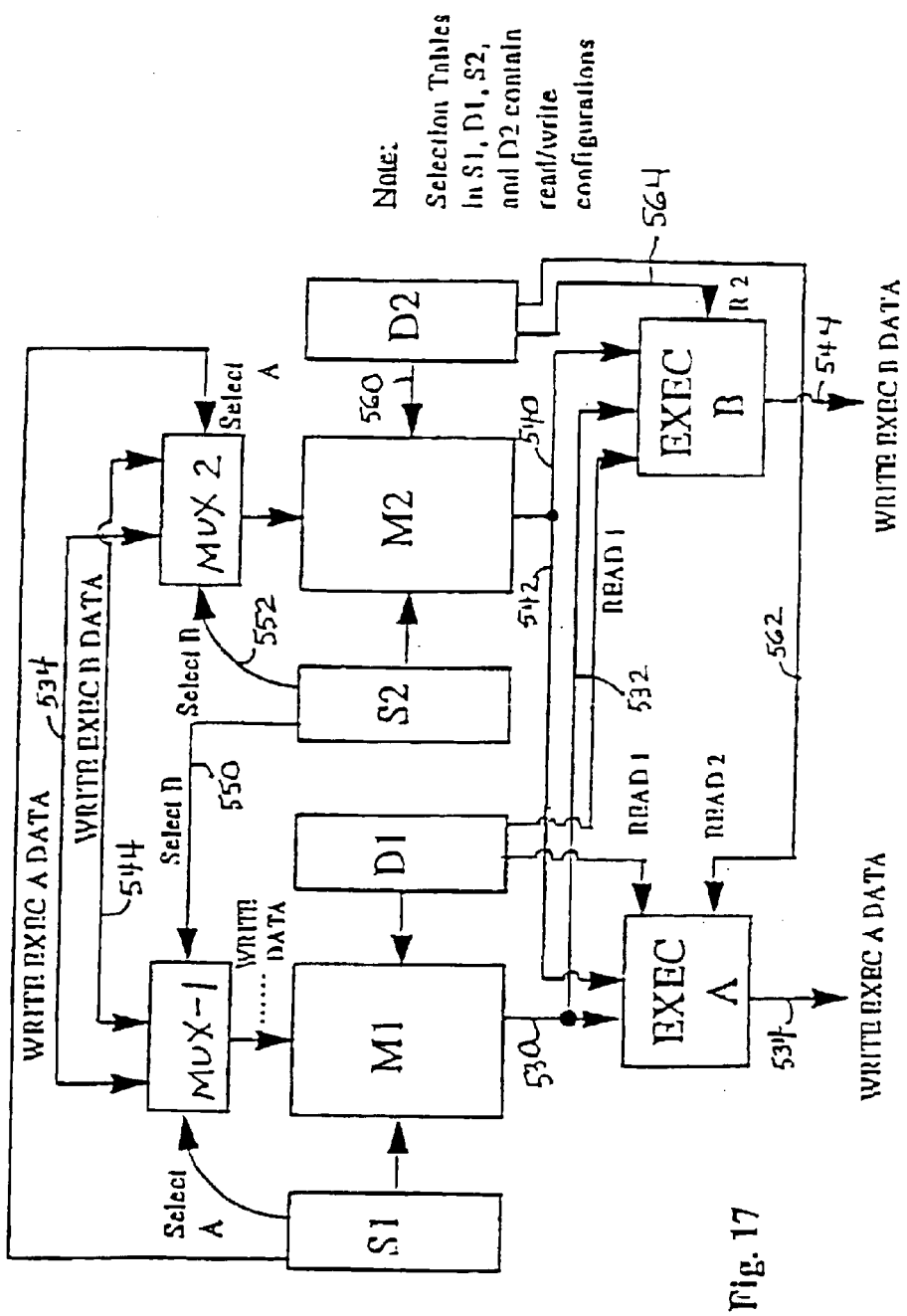
FIG. 17 is a block diagram of a DSP architecture illustrating a multiple memory block to multiple execution unit interface scheme in which configuration is controlled via specialized address generators.

FIG. 17 is a high-level block diagram illustrating a DSP system according to the present invention in which multiple memory blocks are interfaced to multiple execution units so as to optimize performance of the system by reconfiguring it as necessary to execute a given task. In FIG. 17, a first block of memory M1 provides read data via path 530 to a first execution unit ("EXEC A") and via path 532 to a second execution unit (EXEC B"). Execution unit A outputs results via path 534 which in turn is provided both to a first multiplexer or select circuit MUX-I and to a second select circuit MUX-2. MUX-1 provides select write data into memory M1.

Similarly, a second segment of memory M2 provides read data via path 542 to execution unit A and via path 540 to execution unit B. Output data or results from execution unit B are provided via path 544 to both MUX-1 and to MUX-2. MUX-2 provides selected write data into the memory block M2. In this way, data can be read from either memory block into either execution unit, and results can be written from either execution unit into either memory block.

A first source address generator S1 provides source addressing to memory block M1. Source address generator S1 also includes a selection table for determining read/write configurations. Thus, S1 provides control bit "Select A" to MUX—1 in order to select execution unit A as the input source for a write operation to memory M1. S1 also provides a "Select A" control bit to MUX-2 in order to select execution unit A as the data source for writing into memory M2.

A destination address generator D1 provides destination addressing to memory block M1. D1 also includes selection tables which provide a "Read 1" control signal to execution A and a second "Read 1" control signal to execution unit B. By asserting a selected one of these control signals, the selection bits in D1 directs a selected one of the execution units to read data from memory M1.

A second source address generator S2 provides source addressing to memory segment M2. Address generator S2 also provides a control bit "select B" to MUX-1 via path 550 and to MUX-2 via path 552. These signals cause the corresponding multiplexer to select execution unit B as the input source for write back data into the corresponding memory block. A second destination address generator D2 provides destination addressing to memory block M2 via path 560. Address generator D2 also provides control bits for configuring this system. D2 provides a read to signal to execution unit A via path 562 and a read to signal to execution unit B via path 564 for selectively causing the corresponding execution unit to read data from memory block M2.

Figure 18A:
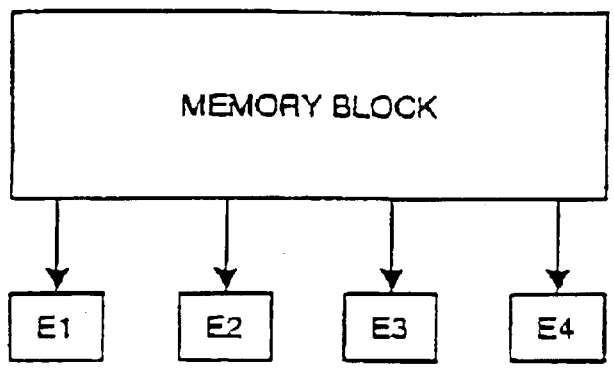
Figure 18B:
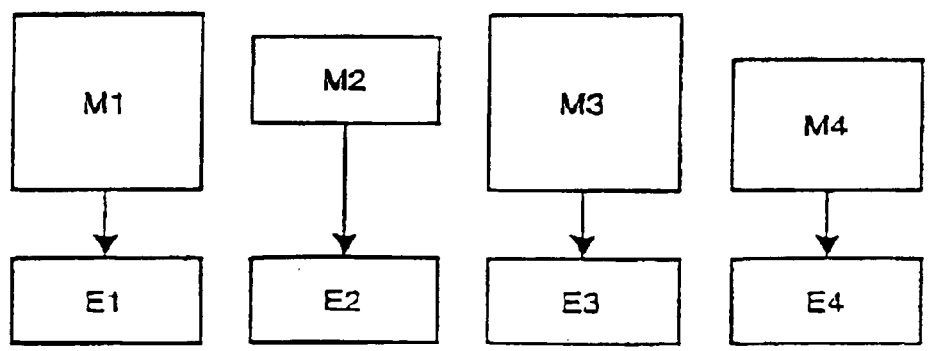
Figure 18C:
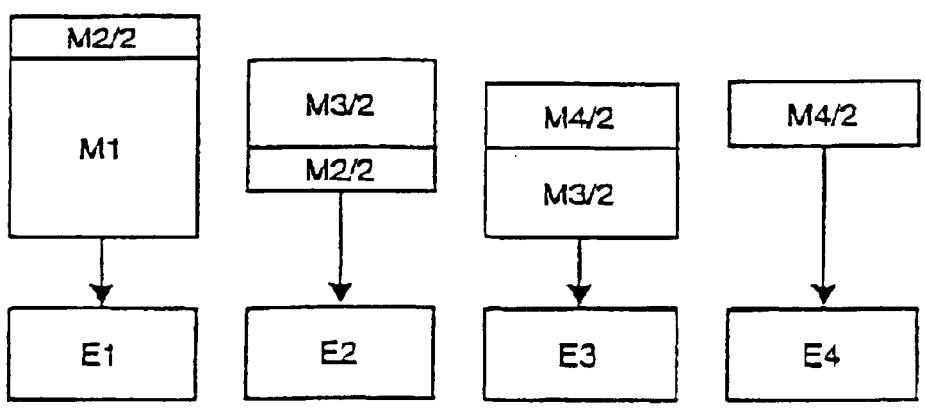

FIG. 18A illustrates at a high level the parallelism of memory and execution units that becomes available utilizing the reconfigurable architecture described herein. In FIG. 18A, a memory block, comprising for example 1,000 rows, may have, say, 256 bits and therefore 256 outputs from respective sense amplifiers, although the word size is not critical. 64 bits may be input to each of four parallel execution units E1–E4. The memory block thus is configured into four segments, each segment associated with a respective one of the execution units, as illustrated in FIG. 18B. As suggested in the figure, these memory segments need not be of equal size. FIG. 18C shows a further segmentation, and reconfiguration, so that a portion of segment M2 is joined with segment M1 so as to form a block of memory associated with execution unit E1. A portion of memory segment M3, designated "M3/2" is joined together with the remainder of segment M2, designated "M2/2", to form a memory block associated with execution unit E2, and so on.

Note, however, that the choice of one half block increments for the illustration above is arbitrary. Segmentation of the memory may be designed to permit reconfigurability down to the granularity of words or bits if necessary.

FIG. 19.

Figure 19:
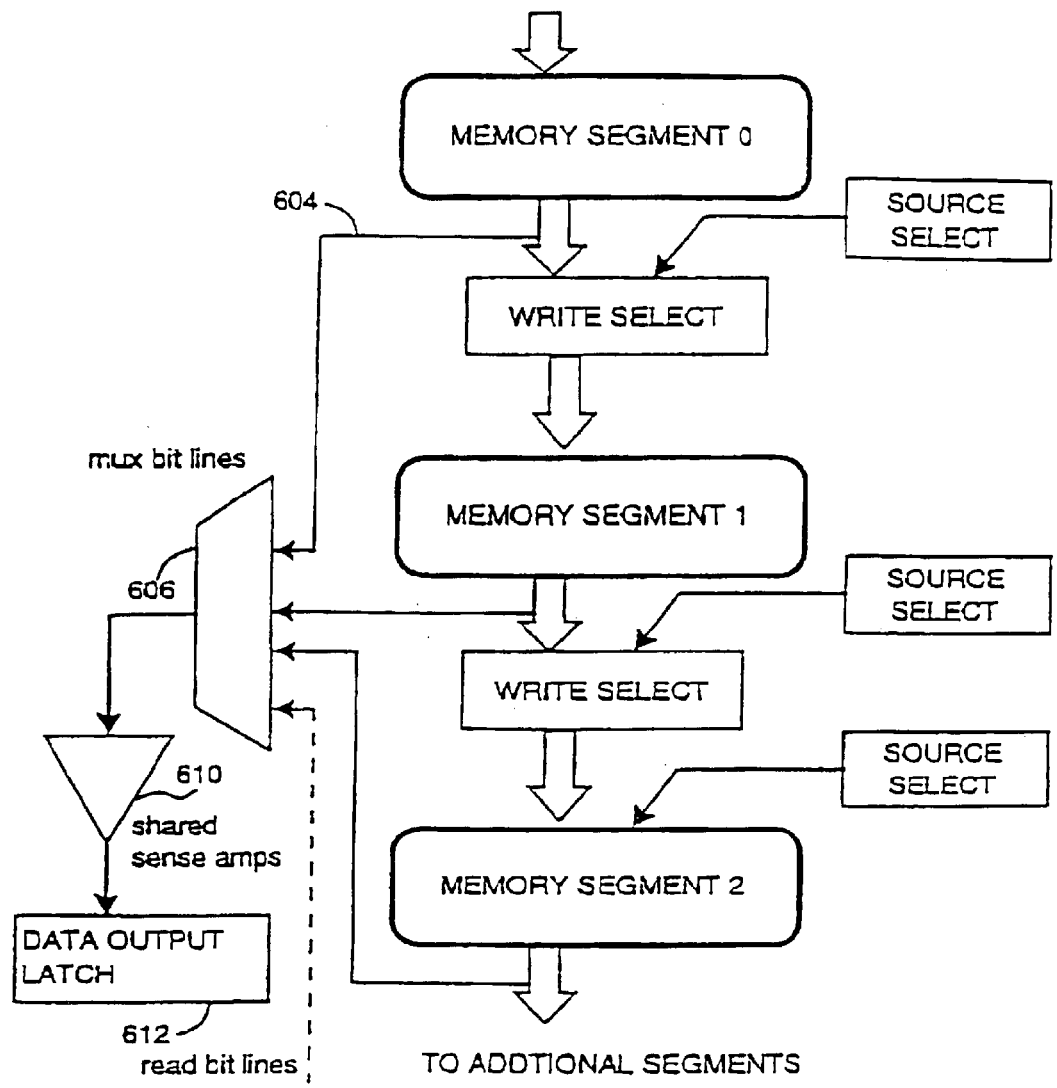
FIG. 19 is a simplified block diagram illustrating a shared, reconfigurable memory system utilizing common sense amps.

The use of multiple sense amps for memory segment configuration was described previously with reference to FIGS. 15 and 16. FIG. 19 illustrates an alternative embodiment in which the read bit lines from multiple memory segments, for example read bit lines 604, are directed to a multiplexer circuit 606, or its equivalent, which in turn has an output coupled to shared or common set of sense amps 610. Sense amps 610 in turn provide output to a data output latch 612, I/O bus or the like. The multiplexer or selection circuitry 604 is responsive to control signals (not shown) which select which memory segment output is "tapped" to the sense amps. This architecture reduces the number of sense amps in exchange for the addition of selection circuitry 606.

Figure 20:
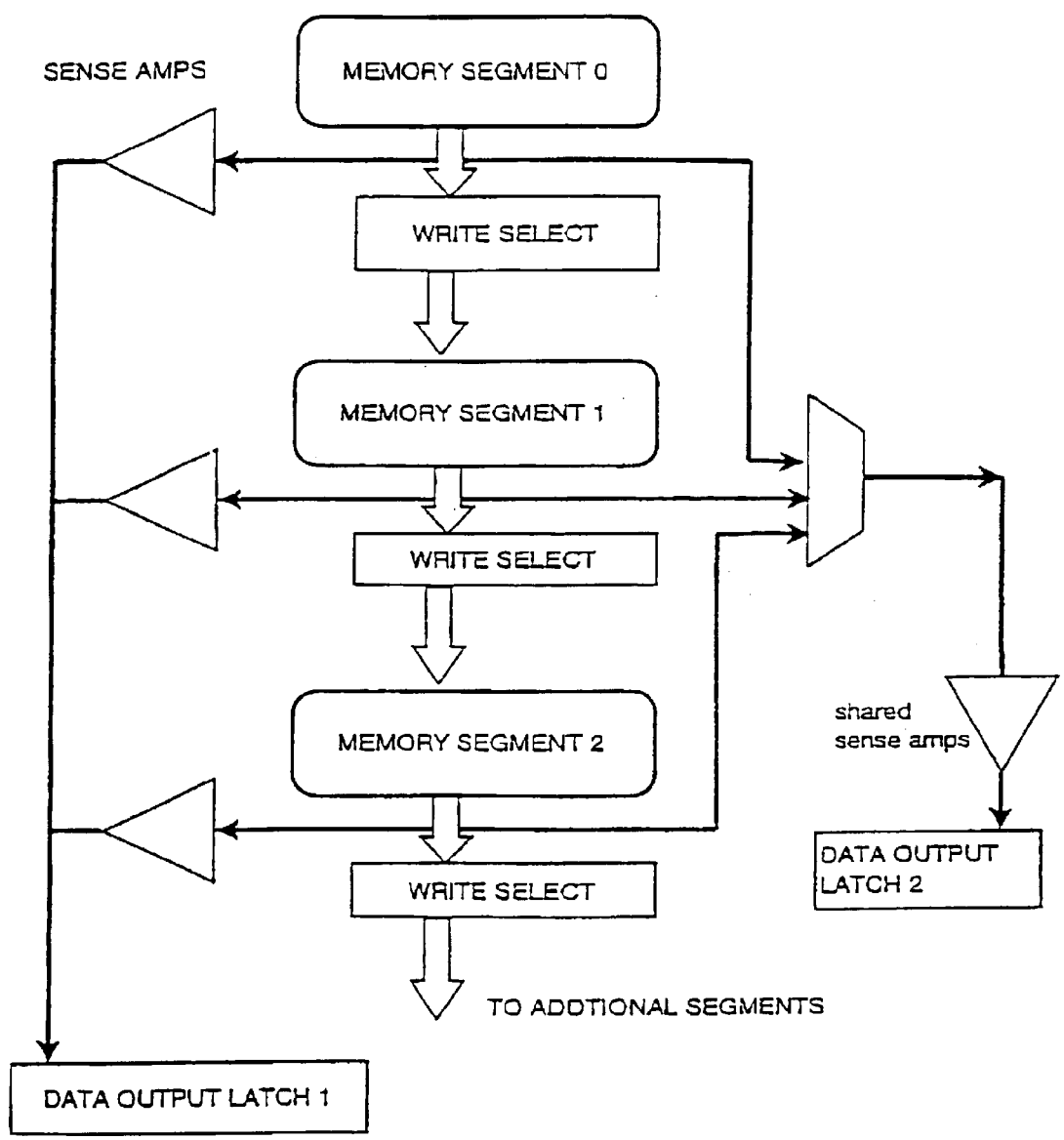
FIG. 20 is a simplified block diagram illustrating a shared, reconfigurable memory system utilizing multiple sense amps for each memory segment.

FIG. 20. is a block diagram illustrating a memory system of multiple configurable memory segments having multiple sense amps for each segment. This alternative can be used to improve speed of "swapping" read data paths and reduce interconnect overhead in some applications.

Figure 23A:
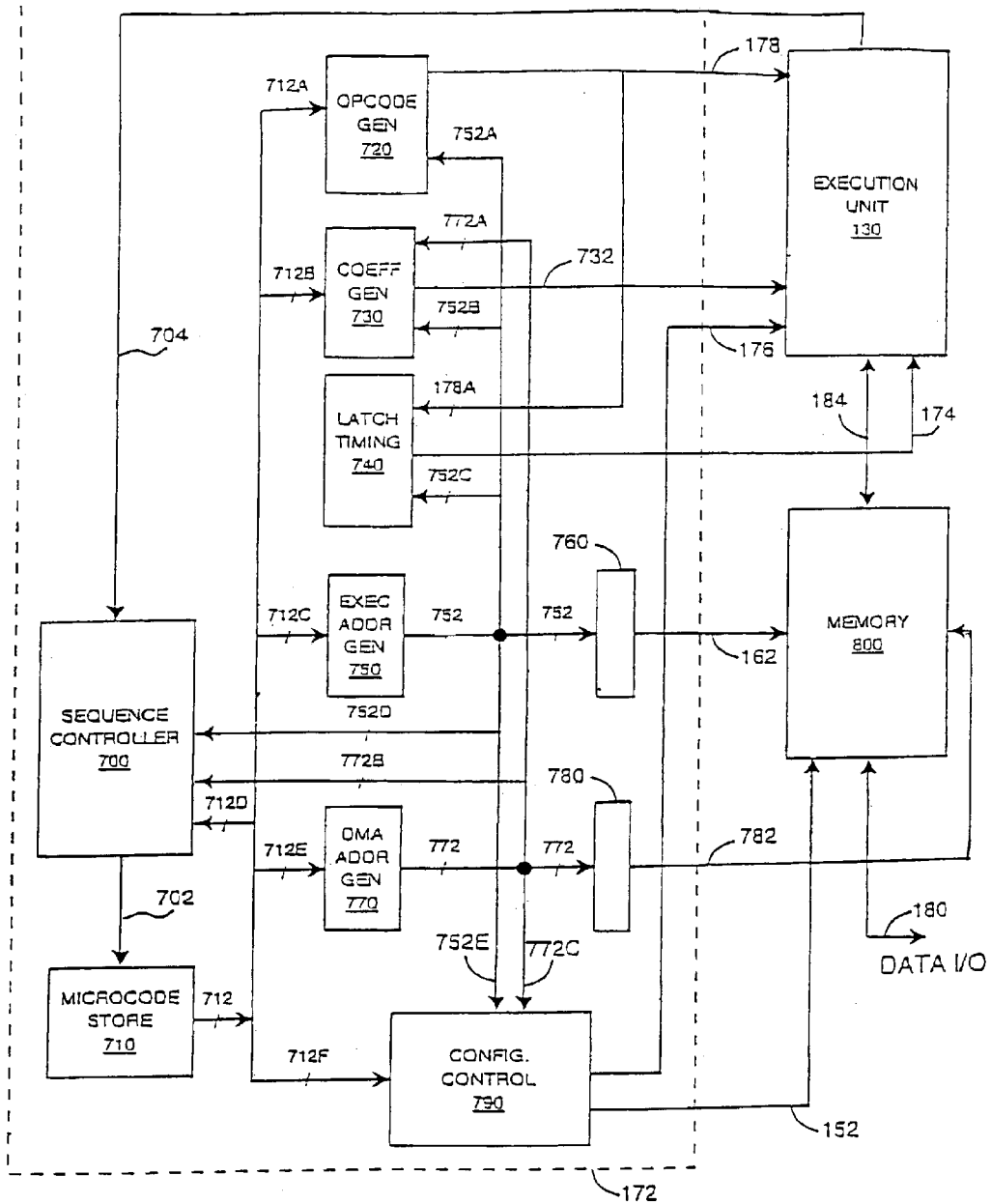
FIG. 23A is a block diagram of an embodiment of the MCC having a general architecture.
Figure 23B:
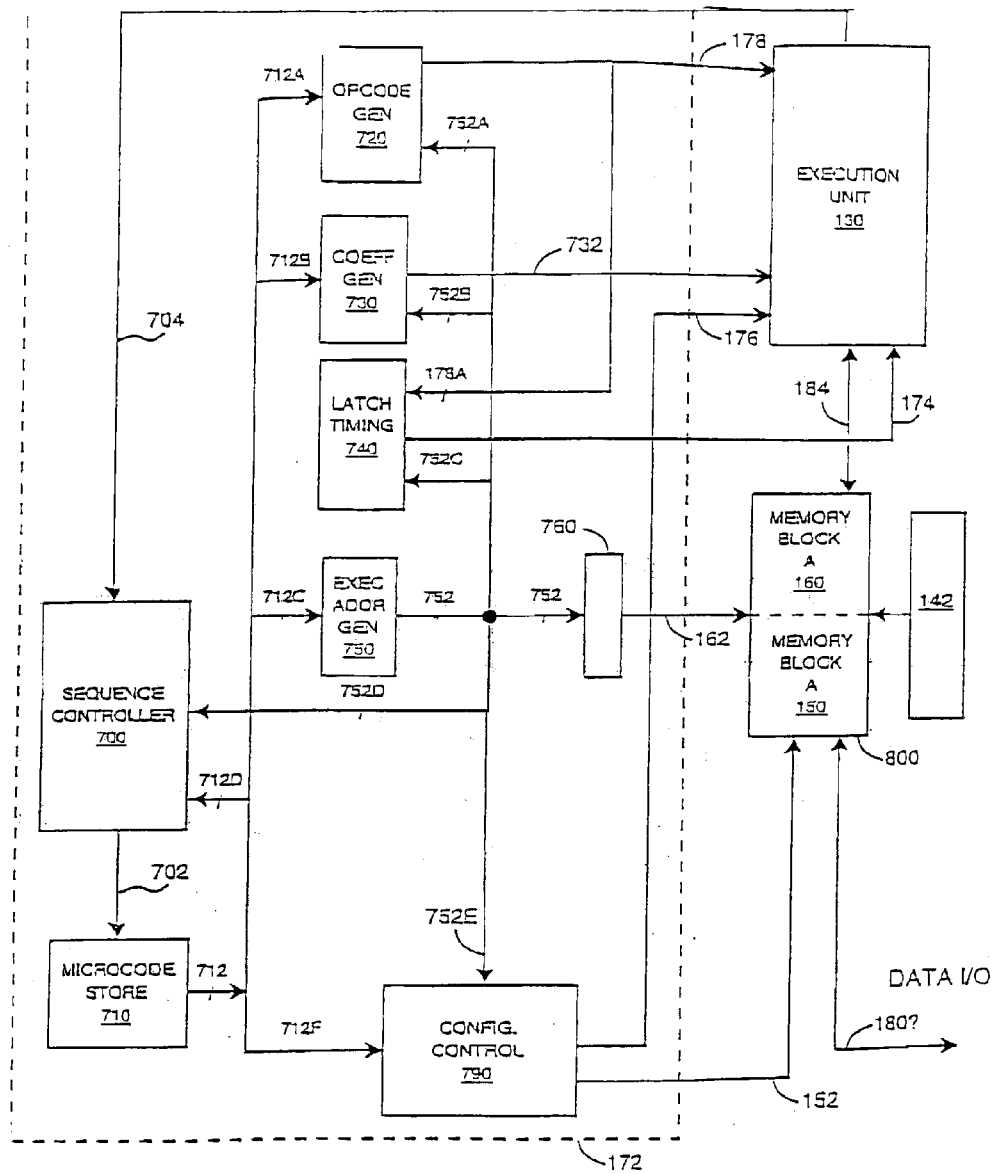
FIG. 23B is a block diagram of an embodiment of the MCC having an architecture adapted to operate in cooperation with a core processor.
Figure 23C:
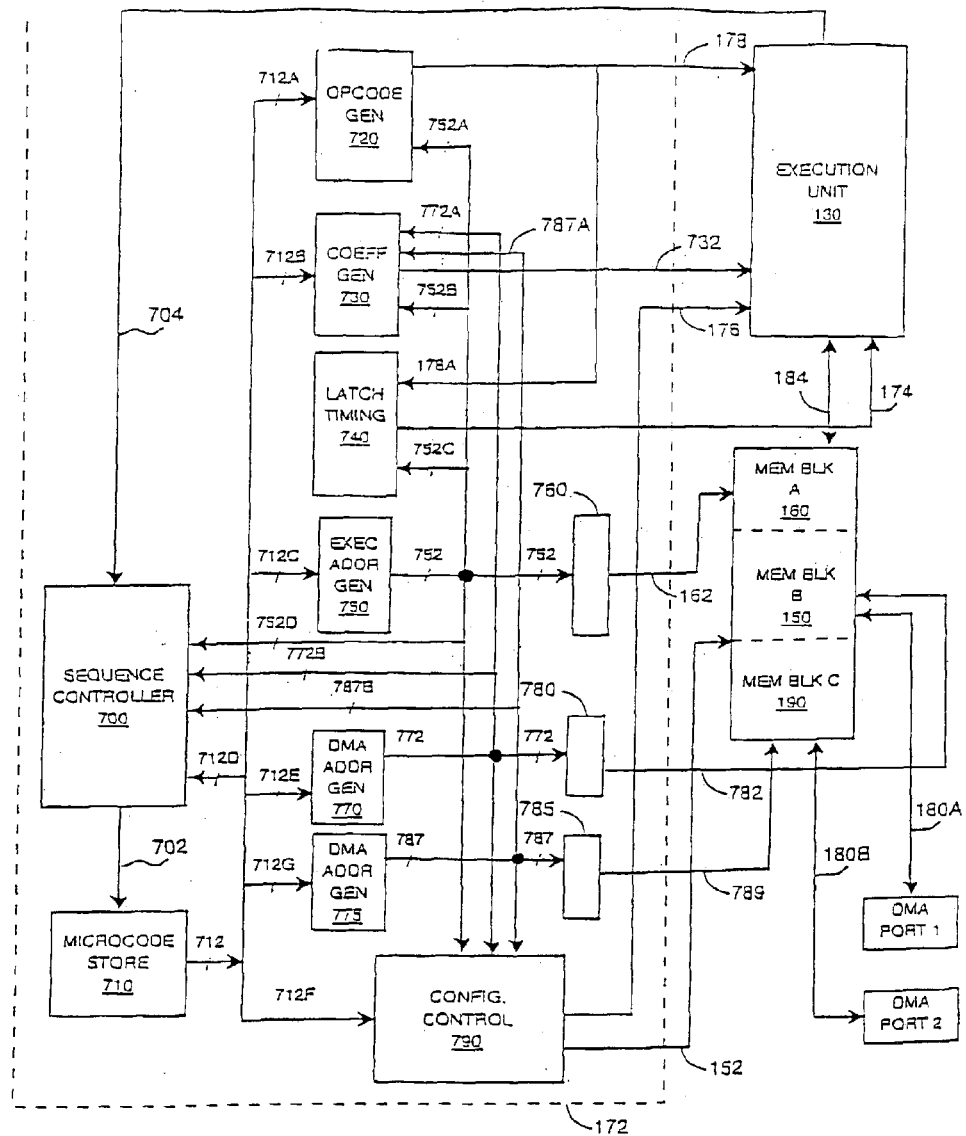
FIG. 23C is a block diagram of an embodiment of the MCC having an architecture adapted to increase data throughput.

FIGS. 23A–C Memory Centric Controller

FIGS. 23A–C illustrate an embodiment of MDSPC 172 according to the present invention. Though the MDSPC 172 is described in the context of a DSP controller, it can be configured to perform a wide variety of functions other than DSP that benefit from the use of a flexible data path control architecture, such as data processing engines for compression/decompression or packet header processing. Therefore, whereas the related application referenced above discussed an MDSPC, the present application will hereinafter utilize the terminology of a Memory-Centric Controller (MCC) to reflect the broader applicability of the present invention.

MCC 172 contains a sequence controller 700 which sequences through a microcode routine stored in microcode store 710. Sequence controller 700 functions in a manner similar to conventional sequencers which are found in a wide variety of applications and which sequence through a set of control instructions in order to control a variety of functional units external to the controller and redirect program flow responsive to microcode instructions and feedback from the external functional units.

However, sequence controller 700 differs from conventional sequencers in its use of a microcode control word for memory centric applications. Memory centric control words include DMA-I/O addresses, execution addresses, opcodes for execution units, reconfiguration and configuration control bits for memory configuration, and latch timing and control for memory interfaces and pipeline control between the memory and execution units.

Microcode Store

Microcode store 710 may take a number of forms and be populated in various ways depending upon the context within which the MCC will operate. For instance, microcode store 710 can include read-only memory (ROM), such as EEPROM, flash memory and other forms of non-volatile storage, which contains all or part of the microcode routines to be executed by MCC 172. Alternatively, microcode store 710 may include volatile memory, such as DRAM or SRAM, which is initialized at power-up by an initialization routine contained within a bootstrap memory also included within microcode store 710, that downloads microcode routines from non-volatile storage. These examples would typically be present in an embedded application where the MCC 172 is, at least in part, an independently functioning processor which executes a relatively narrow set of functions.

In the context where MCC 172 is teamed with a core processor, the microcode can be downloaded under control of the core processor. This requires that microcode store 710 be accessible to the core processor, in addition to the sequence controller 700, but provides for greater flexibility and broader range in the functions performed by MCC 172 because a microcode program is downloaded for the specific task required by the core processor, which allows the code to be optimized for the particular function, rather than being adapted for more general functionality, and also allows the use of customized routines developed by a user of the MCC 172.

Alternatively, MCC 172 can configure a portion of memory 800 to contain the microcode instructions and eliminate the need for a separate microcode store 710. However, the overhead involved in downloading the microcode from the core processor to microcode store 710 for each task is likely to be small relative to the time required to process a block of data. The overhead for download, in turn, may be reduced by structuring the microcode to have subroutines shared by a number of higher level functions so that only the microcode specific to the higher level function need be downloaded for a particular task. In this case, the microcode will include a library of routines and subroutines shared by the higher level functions.

An additional advantage of microcode in MCC 172 is that a complex built-in self test (BIST) can be implemented. A microcode BIST can reconfigure memory 800 and the internal circuitry of MCC 172 to perform extensive testing of the circuitry before a device fabricated with MCC 172 is packaged or shipped. This represents a significant production cost savings. Further, the MCC 172 is able to perform the tests without the need for an extensive on the packaged device, therefore bad devices are selected at wafer sort and final packaged devices will have higher yield thus reducing final device cost. Finally, the BIST microcode does not require additional circuitry nor does it require storage space in the microcode store 710 since it can be replaced with operational microcode programming after the BIST has been performed.

Execution Initialization

Initialization of microcode execution in the MCC 172 can also be accomplished in a variety of ways which are generally understood in the conventional art.

Figures 24A, 24B:
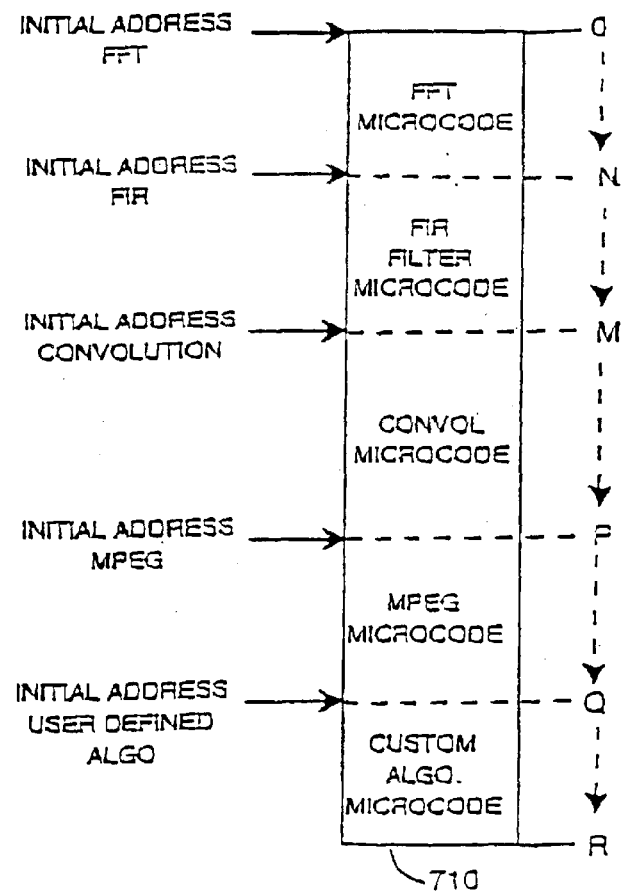
FIGS. 24A and 24B are examples of a memory mapped microcode for the embodiments of FIGS. 23A–C.

One way to initiate execution is through memory mapped function wherein a predetermined address, present upon an address bus from the core processor and corresponding to a specific function, is decoded within the MCC 172 to initiate execution of the microcode for the specific function. FIGS. 24A and 24B illustrate an example of memory mapped function wherein an address of 0x710 corresponds to a Radix 2 FFT function, 0x905 corresponds to a FIR filter, and address 0x2100 corresponds to a convolution function. In this configuration, sequence controller 700 includes decode circuitry which will decode a reserved address value of the core processor address signal and translate the reserved address value into a microcode address in microcode store 710, which corresponds to the function represented by the reserved address value, where microcode execution is initiated.

The importance of memory mapped function is that MCC operations can be implemented transparently to a core processor having a memory mapped software architecture. No change is necessary to the instructions of the core processor. Integration of the MCC can be as simple as modifying I/O software drivers for each functions in the core processor software to access the addresses corresponding to the function in the MCC. Instead of process flow continuing in the core processor when a memory mapped MCC function is addressed, MCC 172 decodes the address and begins process execution.

Another alternative for initiating execution in MCC 172 includes the use of a memory location or mailbox in memory 800 which is reserved for a status word which is accessed by both the core processor and the MCC 172 in order to communicate processing state information. This approach can be implemented in the configuration illustrated in FIG. 23B. For instance, the MCC 172 will write a predetermined status word to the reserved location to indicate to the core processor that processing is complete before the MCC 172 swaps memory blocks, such as memory blocks A (150) and B (160) in FIG. 23B, within memory 800. The reserved location can exist in memory blocks A and B in which case the core processor will access the reserved location through external bus interface mechanism 142 which supports access by the core processor directly or through another external bus, such as a RAMBUS. The core processor periodically reads the status word in the reserved location to determine when the MCC 172 has swapped the memory so that the core processor can proceed to act upon the data present in the memory block (i.e. transfer the result data from the memory block to an output port, transfer new data for processing into the memory block, etc.). Note that the core processor can move the data itself or, if a DMA-I/O address generator is included, MCC 172 can perform a DMA transfer function under microcode control. Note that a dedicated status register that is separate from memory 800 can be utilized instead of the reserved location.

Alternatively, writing the status word to the reserved location or mailbox can also be designed to generate an interrupt to the core processor which reads the status word to determine the appropriate interrupt handling routine corresponding to the information in the status word. Implementing an interrupt driven interface between the MCC and the core processor can be useful to integrating the MCC into a memory mapped software architecture in the core processor.

The mailbox or status word architecture can also be used to create communications links between multiple MCC based devices. When one MCC device, a DSP engine for example, completes processing of a block of data, it can write to a status word to a mailbox corresponding to another MCC based device, a high speed data I/O device or FFT engine for example. Writing to the mailbox can generate an interrupt in the other MCC which reads the status word from the mailbox and initiate a function appropriate to the information in the status word. In this manner, considerable intelligence can be distributed in MCC based devices within a system and the interfaces between the MCC based subsystems can be optimized to take advantage of the high throughput capacity of the present architecture without the requirement of core processor resources.

Yet another alternative for execution initialization is to include a command register within the MCC 172, and accessible by the core processor, which receives macro-instructions from the core processor which indicate the DSP functions (or other complex operations) to be performed by the MCC 172 as well as a DMA-I/O function to be performed, along with the corresponding data addresses for each function. For DMA transfers, the macro-instruction command identifies the direction of data movement and includes such parameters as the starting and ending addresses of a block of data in memory 800 to be transferred. The macro-instructions for DSP functions and DMA transfers can be supported by underlying microcode which executes the function indicated by the macro-instruction. Still other alternatives for initiating execution in the MCC 172 include standard handshaking or interrupt driven protocols wherein various microcode programs in microcode store 710 MCC 172 constitute interrupt routines for the MCC or routines selected based upon information passed during handshaking.

MCC Operation

The exact details of the operation of MCC 172 will vary with the particular implementation of the MCC and the microcode program. However, a general description of execution in MCC 172 follows which will demonstrate the basic principles of operation within the present architecture in the context of embodiments illustrated in FIGS. 23A–C.

In operation, sequence controller 700 outputs a microcode address 702 to microcode store 710 in order to output a microcode control word which contains control words that direct the operation of other individual functional units within MCC 172.

The microcode control word 712 includes control word 712A which combines with output control signal 752A from execution address generator 750, to drive opcode generator 720 to generate opcodes which are output on opcode bus 178 to execution unit 130. The opcodes drive execution unit 130 to process a block of execution data originating in memory 800. In the event that multiple execution units are utilized, control word 712A and opcode generator 750 can be reconfigured to support opcode generation for the additional execution units.

In addition to controlling the algorithmic functions (adds, multiplies, etc.) of execution unit 130, the opcodes output on opcode bus 178 have the ability to reconfigure the data path of execution unit 130 under microcode control. For instance, execution unit 130 may be reconfigured from a 32 bit engine to a 16 bit engine for processing smaller operands or the execution unit could be configured to perform a four-cycle butterfly FFT for one DSP algorithm and reconfigured to perform a three-cycle butterfly FFT for a different DSP algorithm. Also, the pipeline of execution unit 130 can be reconfigured from, for example, a four deep pipeline for 32 bit operation to a two deep pipeline for 16 bit operation. Furthermore, the opcodes output on opcode bus 178 control the use of register files in execution unit 130 in order to support local storage within the execution unit.

Figure 25:
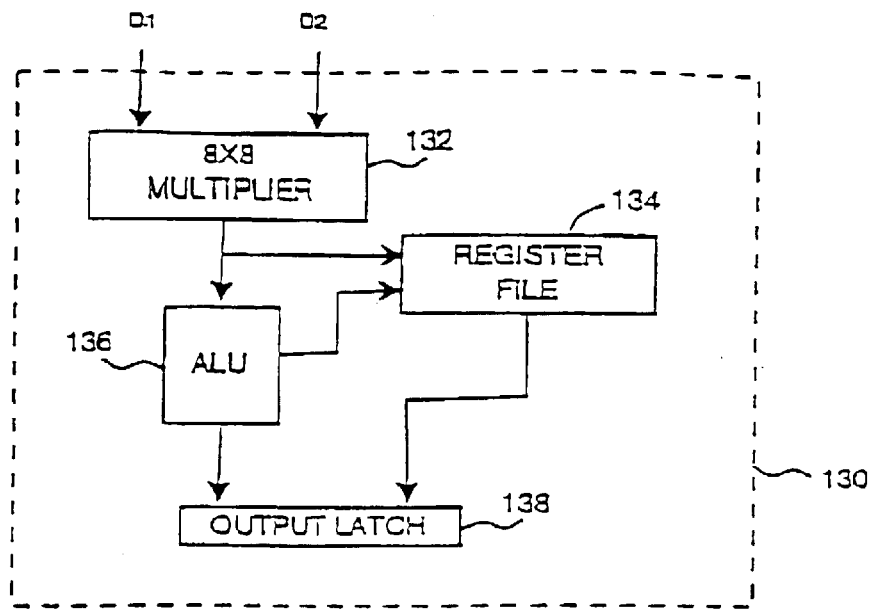
FIG. 25 is a functional block diagram of an example of a configuration of the execution unit of FIGS. 23A–C.
Figure 26:
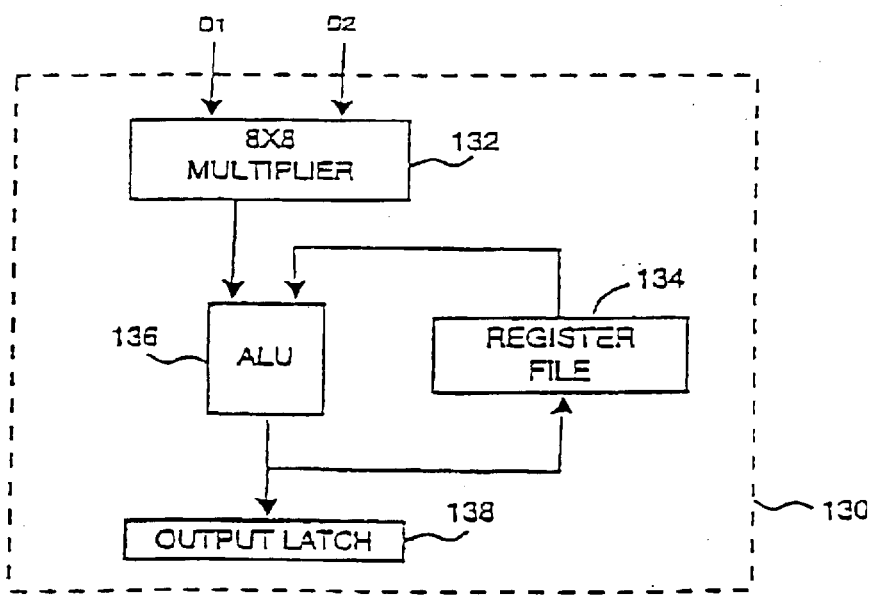
FIG. 26 is a functional block diagram of another example of a configuration of the execution unit of FIGS. 23A–C.

The combined ability to control register file storage and pipeline operation in execution unit 130 results in the flexibility to achieve a wide variety of execution configurations, such as those shown in FIGS. 25 and 26. In a first configuration of execution unit 130, shown in FIG. 25, operands D1 and D2 are input to 8×8 multiplier 132 which generates a product which is output to register file 134 and arithmetic logic unit (ALU) 136. A first output signal from ALU 136 is also input to register file 134 and a second output signal is input to output latch 138. The output of register file 134 is also input to output latch 138. However, execution unit 130 can be reconfigured by opcodes received from opcode generator 720 into other configurations, such as that shown in FIG. 26, wherein the contents of register file 134 feedback into ALU 136.

The flexibility in execution configuration of the present invention permits a wide variety of arithmetic functions to be performed efficiently. In addition, the execution unit can be reconfigured for special non-arithmetic data paths which are useful to performing other forms of coding, such as data coding and decoding or compression and decompression.

At various points in the performance of an algorithm by execution unit 130, immediate data in the form of constants or coefficients may be needed for further processing. Control word 712B combines with control output 752B from execution address generator 750 and control output 772A from DMA address generator 770 to drive coefficient generator 730 to generate the processing constants and coefficients 732 that are required by some of the operations performed by execution unit 130. Control output 752B is included in the determination of coefficient output 732 because some algorithms require different coefficients at various points during execution of the algorithm. Control output 772A is included because coefficient requirements can change in anticipation of a swap of execution memory and DMA-I/O memory. Coefficient generator 730 can be a coefficient table or can function algorithmically to produce immediate data for execution unit 130.

Control words 712C and 712E control execution address generator 750 and DMA address generator 770 respectively. Execution address generator 750 is similar to conventional address generators that are available to support address computation for a variety of functions. Execution address generator 750 can be an address generator which produces a single address signal or can be a device with the capability to output multiple addresses, i.e. multiple addresses for access to different rows in separate memory blocks. For instance, programmable address generators are presently available which are capable of supporting the address generation patterns for FIR, FFT and convolution algorithms for digital signal processing. Other programmable address generators are available which are suitable for performing the address sequencing associated with compression and decompression algorithms. Still other programmable address generators can be used which are suitable for the specialized address generation required for other types of algorithms, such as JPEG, MPEG-2 encoder, DVD or speech recognition algorithms.

In response to control word 712C, execution address generator 750 generates execution addresses which are output on execution address bus 752 and which are latched into address register 760 which is connected to memory 800 by address bus 162. The execution addresses output to memory 800 on address bus 162 access a block of execution data which are output on data bus 184 as operands to execution unit 130. Execution address generator 750 also generates the execution addresses which are used to write the result data from execution unit 130 back into memory 800. Portions of execution address bus 752 also function as control signals to other functional units within MCC 172. Portion 752A provides input to opcode generator 720, portion 752B provides input to coefficient generator 730, portion 752C is input to latch timing and control circuit 740, portion 752D is fed back to sequence controller 700 to determine the next microcode execution address, and portion 752E is output to configuration controller 790 in order to provide input to the configuration of memory 800.

DMA address generator 770 is also similar to conventional programmable address generators and may include the capability to reorder data to allow the data to be processed more efficiently. For instance, if memory 800 is a DRAM device, then DMA address generator 770 can be instructed via control word 712E to reorder incoming data in memory 800 so that operands for execution unit 130 are located on the same data row line so that multiple accesses by execution address generator 750 to different rows of memory 800 are not necessary.

DRAM devices are typically constructed such that a single row address is common to several column addresses. When consecutive memory accesses involve data words having different row addresses then multiple address decode cycles must be performed to obtain the data words. If, however, the memory access pattern for an algorithm can be predicted, then the data can often be reordered in memory so that data words that will be accessed simultaneously or consecutively share the same memory row address. DMA address generator 770 can be instructed to perform this reordering as data is streamed into memory 800 in order to optimize later accesses to the data.

Similarly, DMA address generator 770 can be programmed to perform addressing algorithms, such as modulo, indexed or offset addressing, to reorder data in memory 800 prior to execution or after execution. Alternatively, DMA address generator 770 can be configured to operate under the direct control of a core processor, through an external bus interface mechanism such as bus interface 142 in FIG. 23B, which then provides the information necessary (i.e. source and destination addresses, block size, etc.) to direct the address generation for DMA or I/O transfers involving memory 800.

In response to control word 712E, DMA address generator 770 generates DMA addresses which are output on DMA address bus 772 and which are latched into address register 780 which is connected to memory 800 by address bus 782. The DMA address generation is performed in order to stream blocks of input data, i.e. data to be processed, and output data, i.e. result data, in and out of memory 800 via data bus 180. Portions of DMA address bus 772 also function as control signals to other functional units within MCC 172. Portion 772A influences coefficient generator 730, portion 772B is fed back to sequence controller 700, along with other feedback controls, to determine the next microcode execution address 702, and portion 752C is output to configuration controller 790 in order to affect the configuration of memory 800.

Multiple address generators can be utilized to support the particular requirements of a specific application. For example, in the embodiment illustrated in FIG. 23C, memory 800 is reconfigured by the configuration control circuit 790, in response to control word 712F, to include an additional memory block C 190 in order to support the use of a second DMA port 2. An additional DMA address generator 775 driven by control word 712G is added to the architecture of MCC 172 to generate addresses for memory block C 190. A portion of DMA address bus 787 from DMA address generator 775 is connected to sequence controller 700 to influence control sequencing in microcode store 710. Similarly, multiple execution address generators can be added to support multiple execution units.

Latch timing and control circuit 740 receives an opcode control signal 178A, which is part of the opcode bus 178 output from opcode generator 720, and output control signal 752C, which is part of the execution address bus 752 output from execution address generator 750, in order to generate latch timing and control signal 174. Latch timing and control signal 174 synchronizes the operation of execution unit 130 with the transfer of data with memory 800 on data bus 184 by generating the timing and control for the circuitry at the interface between execution unit 130 and memory 800 which is discussed in greater detail below. In effect, latch timing and control signal 174 coordinates the transfer of operands from memory 800 into execution unit 130 with the output of address signal 162 to memory 800. Similarly, transfer of result data from execution unit 130 is coordinated with output of execution addresses on execution address bus 162 to memory 800, in order to store the results of the processing performed by execution unit 130, by latch timing and control signal 174.

Configuration control circuit 790 receives control word 712F, along with output signal 752E from execution address generator 750 and output signal 772C from DMA address generator 770, and generates memory configuration control signal 152, which controls the sizing, partitioning and swapping of memory blocks within memory 800, such as that described earlier with regard to FIGS. 5A–C. For example, configuration control 790 can swap blocks in memory 800 in response to execution address generator 750 or DMA address generator 770 outputting an address predetermined by the microcoded program. In addition, reconfiguration signal 152 determines the position of boundary 136 in FIG. 23B and boundaries 136A and 136B, which may be fixed boundaries or reconfigurable (virtual) boundaries, to create memory block C 190 in the embodiment illustrated in FIG. 23C. In addition, there may exist situations wherein the particular algorithm being executed by MCC 172 does not require all of the memory space of memory 800, in which case unallocated memory space will exist which is not part of either memory block A 160 or memory block B 150 and which may be utilized to form memory block C 190 (which can also be used as general address space by the processor).

Once execution of a microcode program in microcode store 710 has commenced, sequence controller 700 receives control word 712D from the microcode store 710, along with output control signal 752D from execution address generator 750, output control signal 772B from DMA address generator 770, and execution status signal 704 from execution unit 130, which represent state information, and determines the next microcode execution address to output on microcode address bus 702 in the sequence of the microcode program in microcode store 710.

In addition to multiple DMA and execution address generators and multiple execution units, there can be multiple opcode generator (720) and configuration control (790) blocks and multiple pipe-line control and latch timing and control (740) blocks. Furthermore, other known techniques for optimizing the performance of MCC 172 can be applied, such as two level microcode structuring.

Also, the execution units utilized within the architecture can be specialized units for particular functions, such as MPEG-2 encoder/decoder, graphics, data compression/decompression or other applications for which specialized execution units have been developed. Other execution units which are not specifically directed at data computation but which can directly implement compression/decompression or code/decode algorithms can be employed. One specific example is an execution unit directed at switching applications which controls decoding of the header information in data packets, stores the packets for retransmission toward their appropriate destination, and controls routing of the packets.

Dram Bandwidth Matching at Memory/Execution Unit Interface

An example of a performance enhancement achievable with the highly flexible architecture of MCC 172 of the present invention is a high speed memory interface between memory block 800 and execution unit 130. Memory access times for DRAM technology are typically on the order of 20 to 80 ns., but can vary widely depending upon such factors as the fabrication process used to produce the DRAM or the column size of the DRAM array (e.g. the number of transistors coupled to the column lines). Execution unit execution stages, on the contrary, typically cycle on the order of 2 to 6.66 ns. Memory access, therefore, can represent a severe performance bottleneck.

The latch timing and control along with the memory configuration control of the present invention, however, are capable of providing a high speed interface between memory 800 and execution unit 130 wherein multiple words are read from or written to memory in order to match the relatively slow access time of the memory 800 to the fast execution speed of execution unit 130. The high speed interface permits several words of memory 800 to be accessed in a single read or write operation so that the performance of execution unit 130 is not limited by the memory access time for memory 800.

Figure 27:
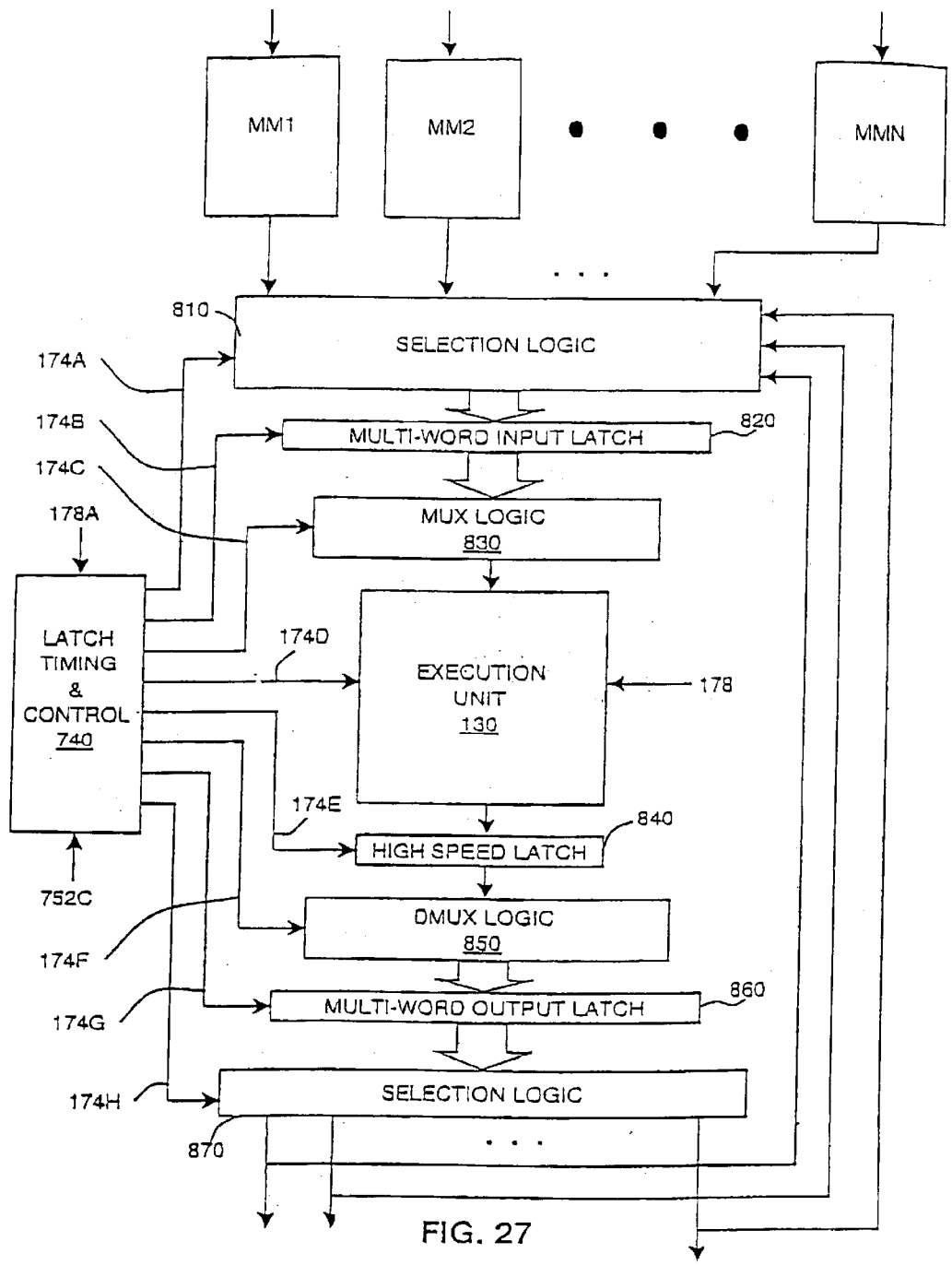
FIG. 27 is a functional block diagram of an example of a memory configuration and execution unit interface for a high bandwidth memory to execution unit interface according to the present invention.

FIG. 27 illustrates a variation on the architecture shown in FIG. 23B wherein memory 800 is constructed using DRAM technology and is divided into N memory blocks MM1, MM2 through MMN which contain operands for execution unit 130. For purposes of demonstration only, memory 800 is assumed to have a memory access time of 40 ns. and execution unit 130 is assumed to have a per stage cycle time of 6.66 ns. The access and cycle times herein recited are intended only as an example and not as a limitation upon the present invention. Other access and cycle time requirements will arise for devices fabricated with different technologies. In addition, it is assumed in the example of FIG. 27 that multiple memory blocks MM1–N take the place of memory block A 160 in FIG. 23B and are required to accommodate data which has not been reordered in memory 800 when the data was streamed into a DMA memory block in memory 800, such as memory block B 150, by DMA address generator 770. As a result, the memory words to be read out are not positioned in the same row of memory in a single memory block, and, similarly, the result data generated by execution unit 130, as determined by the algorithm under execution, cannot be written back to a single row of memory. This example is more complex than the case in which the data in memory 800 has been reordered to optimize access for execution unit 130.

Execution unit 130 is a pipelined execution unit operating with a cycle time of 6.66 ns., for this example, and which includes multiport local register files for feedback within the execution unit. A non-pipelined execution unit could also be utilized.

Figure 28:
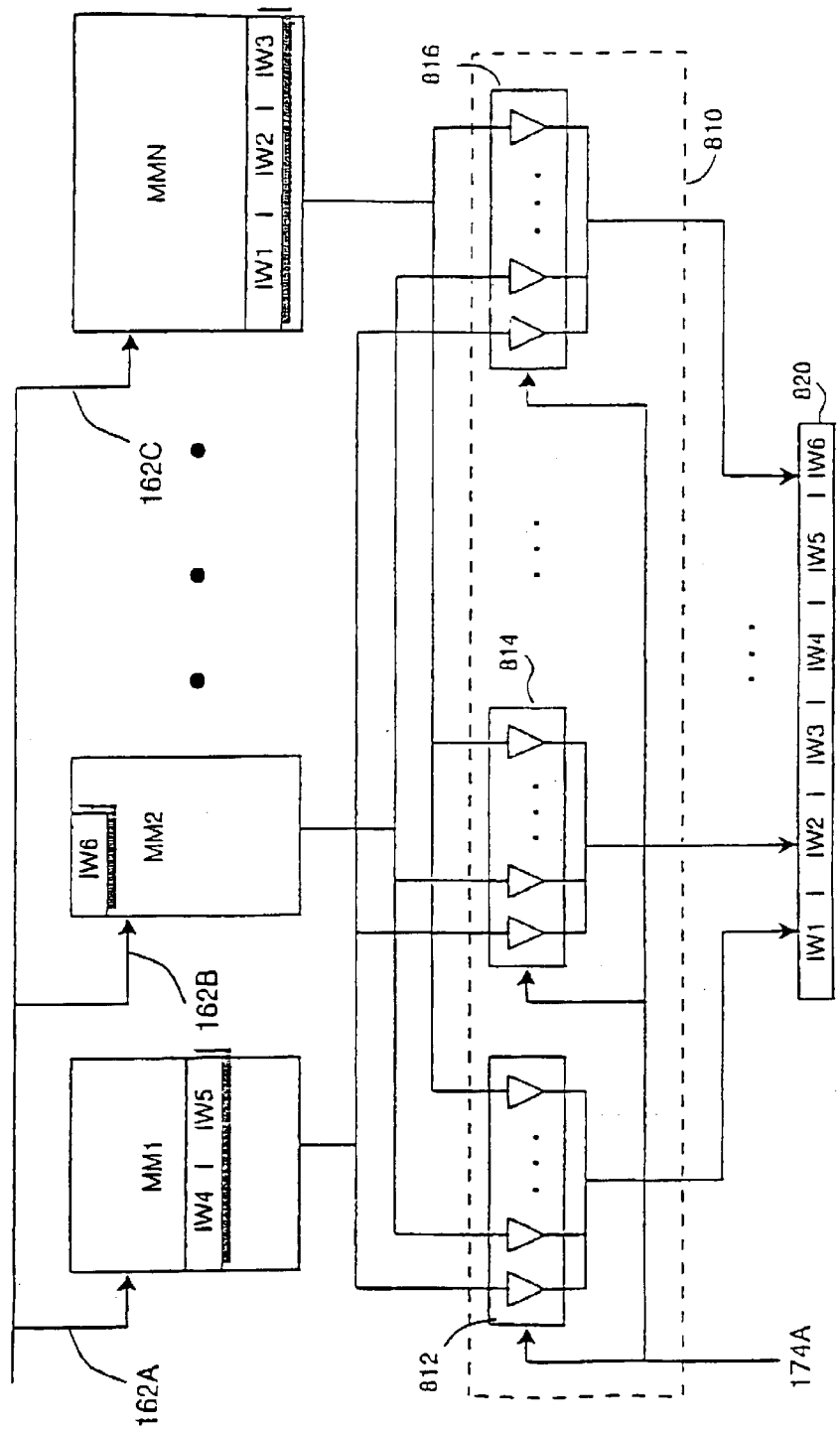
FIG. 28 is a functional block diagram of an embodiment of the selection logic and wide input latch of FIG. 27.
Figure 29:
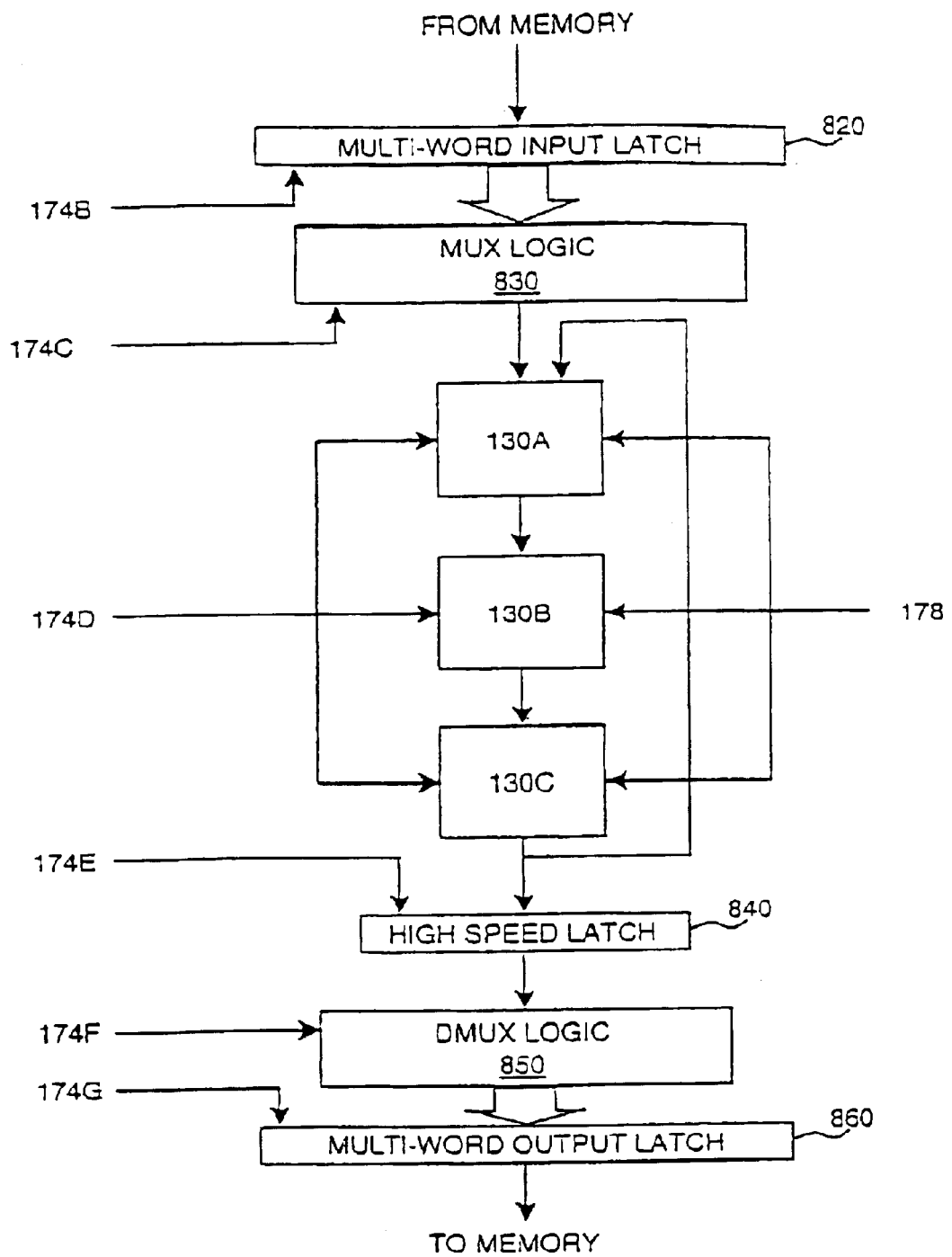
FIG. 29 is a functional block diagram of an embodiment of the high bandwidth memory to execution unit interface of FIG. 27 which illustrates a multi-stage pipeline execution unit.

In order to interface the relatively slow memory access time to the fast execution time of the execution unit, a multi-word latch 820 is included which is sized under control of latch timing and control signal 174B from latch timing and control block 740 to compensate for the difference in memory access time and execution cycle time. For this example, multi-word latch 820 is configured for six words IW1–IW6 which are read into latch 820 in parallel, as shown in FIG. 28. When configured for a three stage execution pipeline, execution unit 130 generates a result in 20 ns. (3 stages×6.66 ns/stage). The three stage pipeline structure of execution unit 130 is shown in FIG. 29, which also illustrates the content input words IW1–IW6 of multi-word input latch 820 and output words OW1–OW5 of multi-word output latch 860.

Because the data in memory block A 160 is not all in the same row, under the assumption for this example that the data was not reordered when streamed into memory block A, selection logic 810 is needed to route the words read from memory into the appropriate position in multi-word latch 820. The selection logic 810 is controlled by latch timing and control signal 174A which is generated by latch timing and control circuit 740. The input words IW1–IW6 are obtained from memory blocks MM1–N and integrated by selection logic 810 for input to multi-word input latch 820. Thus, for example, data words IW1 and IW2 may be obtained from memory block MM1, words 1W3–5 from memory block MM2 and word IW6 from memory block MMN. Address signals 162A, 162B and 162C, shown in FIG. 28, provide the addressing into memory blocks MM1–MMN along row lines of memory 800. Address signals 162A–C can be addresses generated by multiple execution address generators such as execution address 750 or execution address generator 750 can, itself, be a device which has the capability to generate multiple addresses.

Selection logic 810, under control of latch timing and control signal 174A, determines which sense amps in memory 800 to activate in order to route the words of data in memory 800 to the appropriate position in multi-word latch 820. As illustrated in FIG. 28, the latch timing and control signal 174A input to selection logic 810 results in the selective enablement of sense amplifiers within amplifier blocks 812, 814 and 816 to route a word from any of memory blocks MM1–N to an input word position IW1–6 in multi-word latch 820. (Note here that the amplifiers within amplifier blocks 812, 814 and 816 are intended to each represent multiple amplifiers which, in turn, amplify each bit line for a word of memory data.) Latch timing and control signal 174A controls the selection of operands from memory blocks MM1–N by selection logic 810 in synchronization with the operation of execution address generator 750 and opcode generator 720 and, by extension, the operation of multi-word input latch 820.

Multiplexor logic 830, under control of latch timing and control signal 174C, then selects and routes the data words in each of the word positions IW1–IW6 in multi-word latch 820 as operands into execution unit 130. Note that latch timing and control input 174C can reconfigure the size of the words in multi-word latch 820 to be 8, 16, 32 or more bits per word in response to opcode control signal 178A.

Corresponding reconfiguration is simultaneously implemented in the memory blocks MM1–N, selection logic 810, multiplexor logic 830, execution unit 130, high speed latch 840, DMUX logic 850, multi-word output latch 860 and selection logic 870. In addition, MUX 830 can access the words IW1–6 in any order. Therefore, two levels of switching are achieved. First, selection logic 810 performs space switching by obtaining data from anywhere within memory blocks MM1–N. Secondly, MUX 830 performs time division switching by inputting input words IW1–6 in any order desired.

Execution unit 130 performs its computations on the operands provided by multiplexor logic 830 and outputs a result which is latched into high speed latch 840. The result is then routed by DMUX logic 850 into the appropriate position of multi-word output latch 860 (OW1–OW5) for write back to appropriate address in memory block MM1–MMN, wherein output selection logic 870 selects the memory destination of each output word under control of latch control signal 174H, or back into selection logic 810 in order to provide feedback.

Each stage 130A–C of execution unit 130 is running at a clock of 6.66 ns. (20 ns. divided by 3). IW1 and IW2, for example, are multiplexed and clocked into 130A at the beginning of a first 6.66 ns. period. Then, the result from execution in 130A during the first period is clocked into 130B in the following 6.66 ns. period and the result from 130B during the second period is clocked into 130C at the beginning of a third period such that the result of the operation on IW1 and IW2 (IW1×IW2) is stored in position OW1 of output latch 860 after a three pipe stage delay of 20 ns. Subsequently, the product of IW1×1W2 is fed back and multiplied by IW3 in 130A, with the next result being stored in position OW2 of output latch 860 after 34 ns. The operand operations can be summarized as follows:

(1) IW1×IW2=A->OW1; 20 ns.

(2) A×IW3=B->OW2; 20 ns.

(3) B×IW4=C->OW3; 20 ns.

(4) C×IW5=D->OW4; 20 ns.

(5) D×IW6=E->OW1; 20 ns.

where A–E represent the feedback values which loop back into 130A at the top of the pipeline.

After 80 ns., the input latch 820 is free to be reloaded with another set of operands from memory blocks MM1–N because memory word IW6 has entered the pipeline. Similarly, after an initial delay due to results percolating through the execution pipeline, output latch 860 will fill every 80 ns. and be ready for a write back to memory 800 to occur. Once the pipeline is full, during each 80 ns. cycle, six words of data are read from memory 800 and input into input latch 820, 40 ns. later, for example, five words of result data in output latch 860 are written back to memory 800 and, 40 ns. after the write back, another six words are read from memory 800 and input into input latch 820. Meanwhile, operands are being continuously processed by execution unit 130 for output to output latch 860, which may require an additional temporary store positioned between DMUX 850 and output latch 860 to accommodate the results output from execution unit 130 during the 40 ns. write back cycle.

Figure 30A:
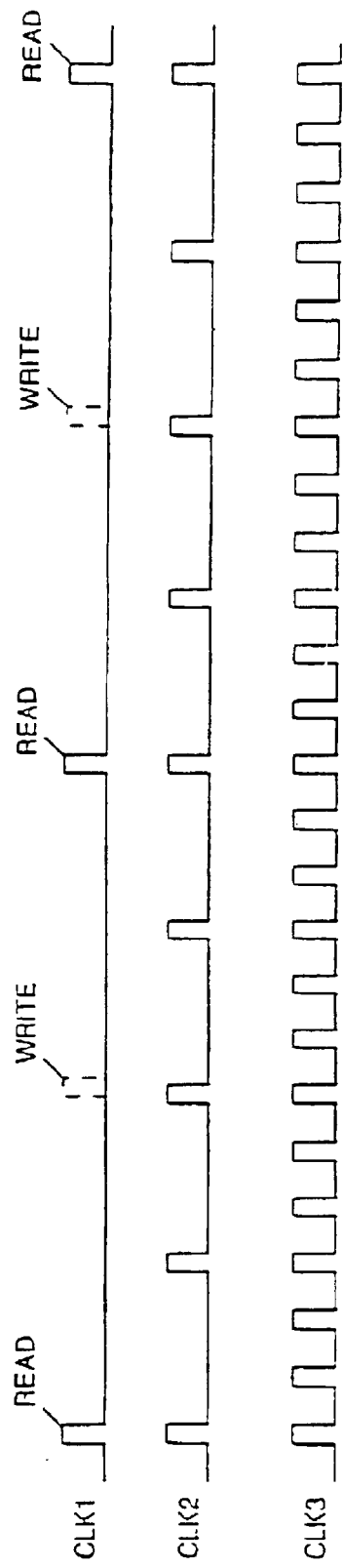
FIG. 30A is a waveform diagram of an example of the clock signals for the circuit of FIG. 27.
Figure 30B:
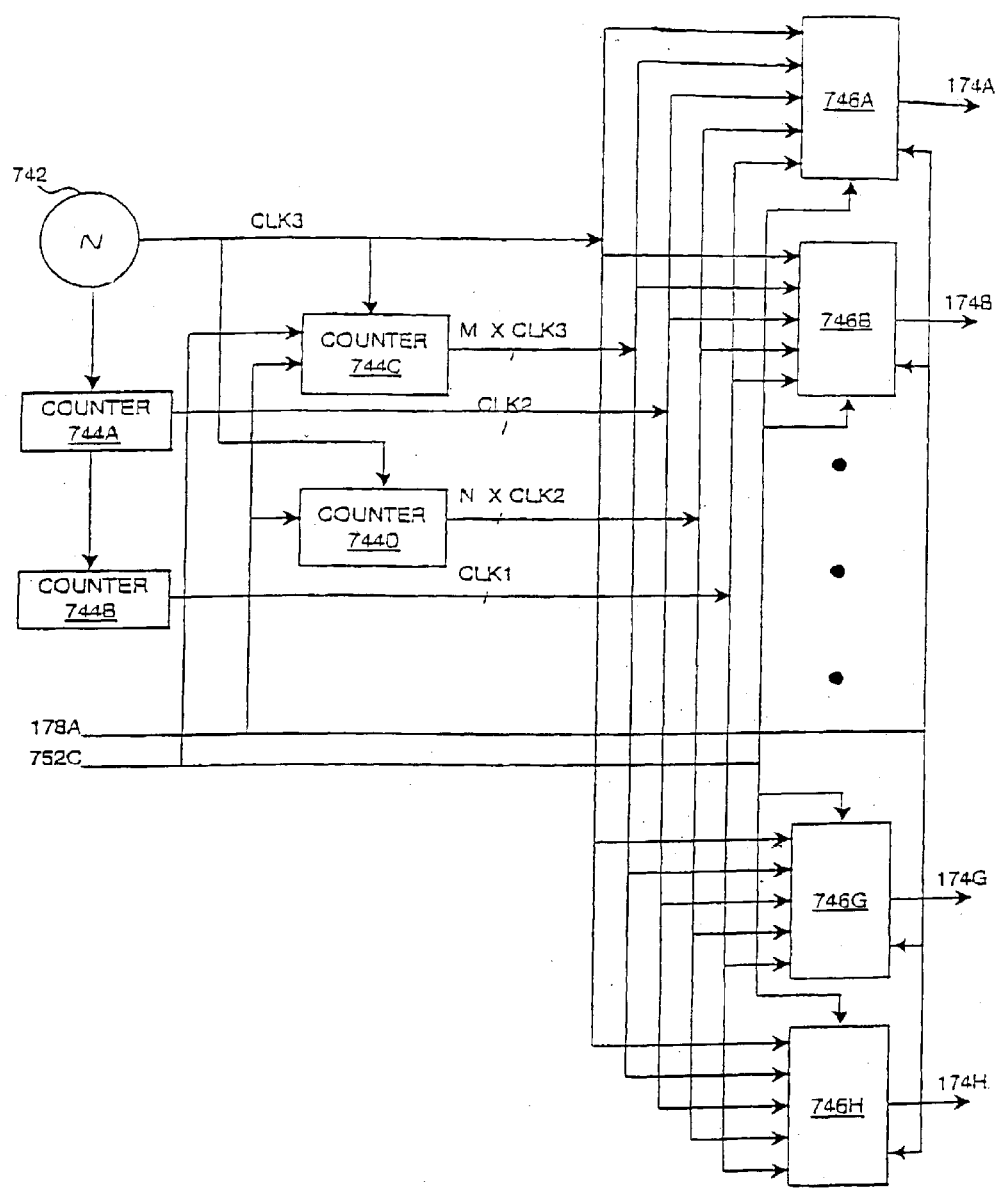
FIG. 30B is a functional block diagram of an example of the high speed timing and control block of FIG. 27.

FIG. 30A illustrates a sample timing diagram for the clock signals within latch timing and control block 740, for the present invention. An example of an embodiment of latch timing and control block 740 is shown in FIG. 30B to demonstrate the generation of the latch timing and control signals 174A–H in the embodiment illustrated in FIGS. 27 and 28.

An oscillator 742 generates a 6.66 ns. period clock CLK3 which enters counter 744A and is divided into a 20 ns. clock CLK2. The 20 ns. clock signal CLK2 is then divided by counter 744B to generate an 80 ns. clock signal, CLK1. Write back of result data from multi-word output latch 860 to memory blocks MM1–N occurs at 80 ns. intervals that are staggered by 40 ns. from the read cycle and are illustrated as the dotted pulses in CLK1. The resulting clock waveforms are shown in FIG. 30A. As noted above, these clock cycle times cited are exemplary and other operating cycles may be utilized.

Latch timing and control signals 174A–H are controlled by and must be synchronized with opcode output signal 178A and execution address output signal 752C. Signals 174A–H provide both timing information and control. Signal 174A determines which data words within memory blocks MM1–N are selected by selection logic 810 and also to select them in synchronization with CLK1, in this example. Signal 174B controls the width of multi-word input latch 820 and also the latching of the data selected by selection logic 810 synchronously with CLK1, in this example. Signal 174C controls the order with which MUX 830 inputs data words IW1–IW6 into execution unit 130 in time with CLK2, in this example. Signal 174D drives the execution unit at CLK3. Signal 174E drives high speed latch 840 at CLK2 to latch results as they are output from execution unit 130. DMUX 850 is controlled by signal 174F to route the output word in high speed latch 840 to temporary storage or a word position in multi-word output latch 860 in time with CLK2. Signal 174G drives multi-word output latch 860 to receive a result word in time with CLK2 and write the result data back to memory 800 in time with CLK1. Signal 174H controls where in memory blocks MM1–N each result word OW1–6 in multi-word output latch 870 is written back in time with CLK1.

The reconfigurability of the various blocks in FIG. 27 also requires that latch timing and control signals 174A–H be flexibly reconfigurable. Signal control blocks 746A–H, in FIG. 30B, generate signals 174A–H respectively under the control of opcode signal 178A and execution address signal 752C. A variety of timing and control sequences are obtainable by altering the codes input by opcode signal 178A to signal control blocks 746A–H in order to match the flexibility and reconfigurability, under the control of MCC 172, of memory 800 and execution unit 130. The circuit of FIG. 30B can be extended to include further signal generation blocks to accommodate, for instance, timing and control signals to individual stage elements internal to execution unit 130.

FIG. 29 illustrates one configuration of the internal stage elements 130A, 130B and 130C of execution unit 130 in relation to the memory and execution unit interface circuitry discussed above. As discussed above, latch timing and control signal 174B drives input latch 820 and signal 174F drives output latch 860 in reading data from and writing data back to memory 800, respectively, at the 80 ns. intervals of CLK 1. Signal 174C drives MUX 830 to route an operand from input latch 820 to stage element 130A of execution unit 130 every 20 ns. in time with CLK2. Signal 174E drives high speed latch 840 to also capture the result output from stage element 130C every 20 ns. in time with CLK2. Signal 174D drives the internal pipeline stage elements 130A, 130B and 130C of execution unit 130 in time with CLK3 to process the operands supplied by MUX 830.

One advantage to the present architecture is that most of the MCC 172 circuitry runs at the relatively slow 80 ns. clock speed of CLK1. Memory blocks MM1–N are clocked every 40 ns. by the alternating read and write cycles described above. Selection logic blocks 810 and 870 operate at the CLK1 rate. MUX 830, high speed latch 840 and DMUX logic 850 run at the 20 ns. clock speed of CLK2 (in this example, but are capable of operating at higher clock speeds). And only the pipeline stages 130A, 130B and 130C of execution unit 130 run at the highest clock speed of CLK3. Because most of the MCC 172 circuit runs at the slower clock speed, the power dissipation of the circuit is relatively low.

As discussed above, the reconfiguration of the datapath in execution unit 130 is accomplished by the opcodes 178 generated by opcode generator 720. The control signals 174A–H generated by latch timing and control block 740 are determined in part by opcode signal 178A. Therefore, the datapath can be dynamically reconfigured along with the control and timing by the output of opcode generator 720.

For instance, stages 130A and 130B can be reconfigured such that they require a slower clock cycle, for example 2×6.66 ns., in order to operate. The opcode signal 178A then combines with execution address portion 752C, as shown in FIG. 23B, to modify the output 174 from latch timing and control block 740. As shown in FIG. 30B, programmable counter 744C receives opcode signal 178A and execution address signal 752C and produces a clock signal with a period of M×CLK3, which is 2×6.66 ns. in the present example, which is output to stages 130B and 130C of execution unit 130. As a result, the operational feedback for results feeding back from 130C to 130A becomes 5×6.66 ns. (1×6.66 ns. for 130A, 2×6.66 ns. for each of 130B and 130C). Therefore, a second programmable counter 744D is included which divides the basic 6.66 ns. clock signal by a value N, which is 5 for the example shown, determined by the control inputs 178 and 752C.

Figure 31:
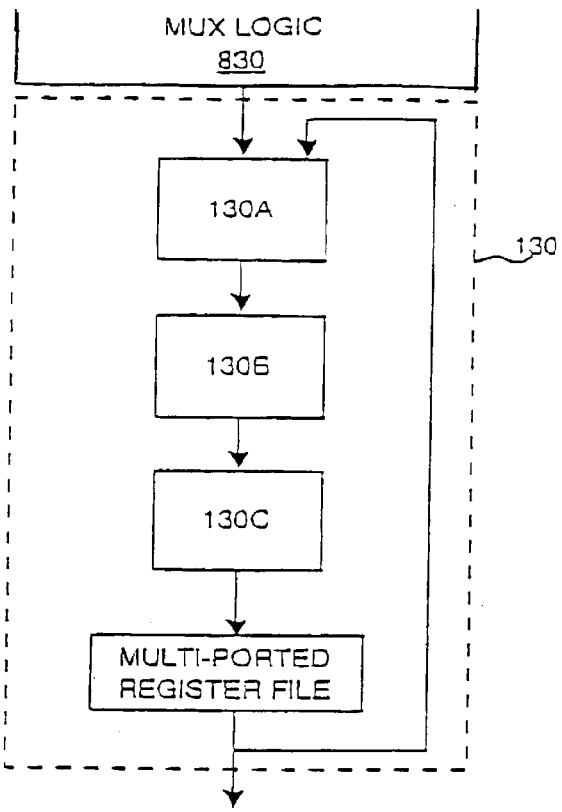
FIG. 31 is a functional block diagram illustrating an example of a configuration for the reconfigurable multi-stage pipelined execution unit of FIG. 27 which utilizes a multi-ported register file to obtain feedback in a pipelined data path.

The example of FIG. 29 illustrates how the pipeline and local storage timing can be reconfigured under the control of the opcode generator 720 and latch and timing control 740. The local storage and feedback internal to execution unit 130 can take a variety of forms in addition to the closed loop feedback shown in FIG. 29, such as a circuit which includes a multi-ported register file for active storage in the feedback path, as shown in FIG. 31. Note that the multi-ported register file in FIG. 31 can also be positioned at the top of the pipeline between MUX 830 and stage element 130A.

Figure 32:
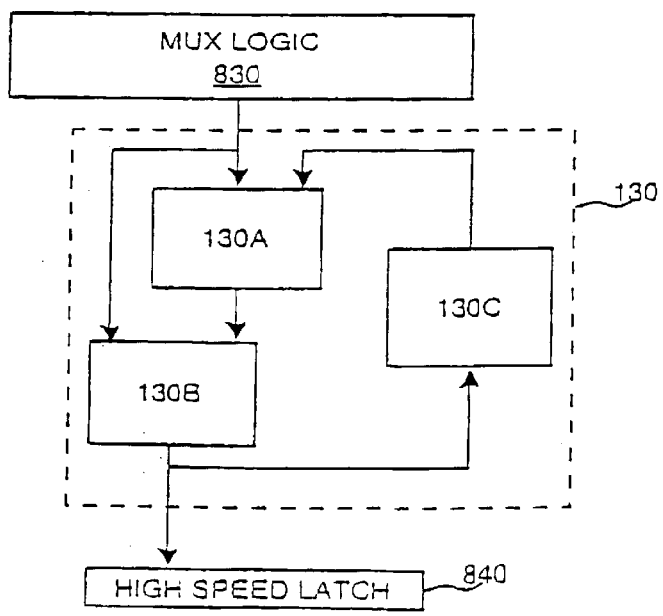
FIG. 32 is a functional block diagram illustrating another example of a configuration for the reconfigurable multi-stage pipelined execution unit of FIG. 27 which demonstrates a different feedback path in a pipelined data path.

To demonstrate the flexibility available through reconfiguration of the datapath of execution unit 130, a reconfigured execution unit is shown in FIG. 32 which includes a multiplier block 130A, an adder 130B and a multiported register file 130C. Multiplier 130A can, for example, be configured as two single stage 16 bit multipliers including latches or as a single four layer 32 bit multiplier composed of two 16 bit multipliers which are cycled twice. Adder 130B can be configured as two 16 bit adders or as a single 32 bit adder.

As noted above, in the configuration shown in FIG. 27, the selection logic blocks 810 and 870 are necessary to accommodate the data in memory blocks MM1–N which, in the example illustrated, was not aligned by DMA address generator 770 as the data was streamed into memory 800. The embodiment of FIG. 27 is complex and demonstrates the highest degree of flexibility because it can control the reordering of data to handle algorithms wherein the data cannot be reordered by DMA generator 770 for direct access to a group of data words in a single row of memory 800 during read or write back. It is important, in the embodiment of FIG. 27, that high speed latch 840 provide sufficient multiported temporary storage to support the highly pipelined data path of execution unit 130 such that the memory to execution unit interface is compatible with DRAM memory operating at cycle times of 20 to 80 ns. High speed latch 840, in the embodiment of FIG. 29, is the same register used to provide feedback in the pipelined datapath of execution unit 130, but it can also be deployed as a separate unit. It should also be noted that selection logic block 810 and multi-word input latch 820 can, in some applications, be replaced by a multi-ported register file. Similarly, selection logic block 870 and multi-word output latch 860 can also be replaced by a multi-ported register file.

However, DMA address generator 770 can be programmed to provide sequencing and control for aligning data for optimum processing by the execution unit 130 of algorithms which do permit reordering of the data. For instance, in DRAM memory technology, placing in the same row data which is to be accessed simultaneously (i.e. all six words, in the example, to be read into multi-word latch 820), the selection logic 810 and 870 for reading and write back, respectively, can be eliminated and memory blocks MM1–N consolidated into a single memory block to simplify the circuit and improve the effective access time of the memory to execution unit interface.

In addition, DMA address generator 770 can be programmed to reorder data after processing by execution unit 130, i.e. reorder the data while streaming the data out of memory 800. As a simple example, bytes of result data in memory 800 can be "swapped", the higher order and lower order bytes interchanged to match another processor's data format, as the bytes of data are streamed out of memory 800 to the core processor or other destination. More sophisticated and complex reordering is also possible.

Data Reordering

An example of the reordering discussed above is the reordering required to perform an FFT algorithm. The following is an example of a 16-point radix-2 DIT FFT implemented in MCC 172 in the configuration illustrated in FIG. 23A. First, execution is initiated, by means of one of the mechanisms for execution initiation in MCC 172 described above, which causes sequencer 700 to output, on microcode sequence signal 702, the address in microcode store 710 of a 16-point radix-2 DIT FFT microcode program. When sequencer controller 700 issues this first micro-code address for the FFT routine in micro-code store 710, micro-code store outputs a full micro-code word 712.

Microcode control word 712D is received by sequence controller 700 to set up for execution of the next microcode command in the FFT sequence, while microcode control word 712F is received by configuration control block 790 in order to determine the memory configuration control signal 152 which is output to memory block 800 to configure the memory for the FFT. In the present example, the data to be processed by execution unit 130 will be initially be loaded into memory block B 160 and will be prescrambled prior to switching memory block B 160 with memory block A 150.

Micro-code control word 712E entering DMA address generator 770, provides the following information to DMA ADDR Generator 770:

Starting address for location of data in DMA memory block is X.

Sixteen data points starting at X are to be scrambled for FFT.

The DMA address generator 770 then reorders the data as follows:

| BEFORE SCRAMBLE | | AFTER SCRAMBLE | |
| --- | --- | --- | --- |
| Location | Data | Location | Data |
| X | (0) | X | (0) |
| X + 1 | (1) | X + 1 | (8) |
| X + 2 | (2) | X + 2 | (4) |
| X + 3 | (3) | X + 3 | (12) |
| X + 4 | (4) | X + 4 | (2) |
| X + 5 | (5) | X + 5 | (10) |
| X + 6 | (6) | X + 6 | (6) |
| X + 7 | (7) | X + 7 | (14) |
| X + 8 | (8) | X + 8 | (1) |
| X + 9 | (9) | X + 9 | (9) |
| X + 10 | (10) | X + 10 | (5) |
| X + 12 | (12) | X + 12 | (3) |
| X + 13 | (13) | X + 13 | (11) |
| X + 14 | (14) | X + 14 | (7) |
| X + 15 | (15) | X + 15 | (15) |

The numbers in parentheses represent the offset location from X where the data was originally located.

These scrambling operations by the DMA address generator 770 involve reading X+8 (8) and storing in a temporary buffer or location and then writing X+1 (1) into X+8, this is followed by writing temporary location (TR) data (8) into location (X+1). The next step is storing X+4 (4) into the temporary buffer via read/write cycle followed by reading data located in X+2 (2) and writing into (X+4) 2. This operation is followed by reading TR data (4) and writing it into location X+2. This process continues under control of the DMA address generator 770 until all 16 points of data have been reordered. Alternatively, the microcode program in microcode store 710 can be suitably structured to program the DMA address generator 770 to reorder the data in the manner shown above as the data is streamed in from an external source, such as through Data I/O port 180.

When MCC 172 includes the hardware shown in the embodiment of FIG. 27, however, reordering by DMA address generator 770 may not be necessary or advantageous since selection logic 810 and multi-word input latch 820 can perform a wide parallel read from the execution memory, memory blocks MM1–N in FIG. 27, and then MUX 830 can reorder the data within input latch 820 on the fly by taking operands from the latch in the order required by the FFT algorithm. This feature of automatic (on the fly) reordering eliminates the need for prescrambling by the DMA address generator prior to swapping memory block A 160 and memory block B 150 before processing by execution unit 130. On the fly reordering is useful in cases where the data is not amenable to the reordering required by the processing algorithm prior to execution. Reordering on the fly also has the advantage that it can typically be performed by MUX 830 at much higher speeds than reordering by DMA address generator 770 which is subject to the relatively slow memory access times of memory 800.

Built-In Self Test and the Memory Centric Controller 172

Another advantage to the present architecture is that an extensive BIST can be performed on the memory array 800, execution unit 130, and MCC 172 itself. The ability of MCC 172 to reconfigure the data path and timing, via opcode generator 720 and latch timing and control block 740, of execution unit 130 allows a worst case data path, or a variety of different data path configurations, to be selected for testing. In addition, latch timing and control block 740 can be configured to test execution unit 130 at an elevated clock rate. Instead of driving execution unit 130 at 6.66 ns., for example, the opcode signal 178A can be configured to operate execution unit 130 at 5 ns. timing under control of a microcode BIST loaded into microcode store 710. The elevated test clock rate enables the BIST to compensate for the differences between room temperature wafer testing of devices and higher temperature packaged testing devices. The microcode BIST is able, due to reconfiguration to a higher clock speed, to detect defective devices that will fail a BIST executed at normal clock speeds after the devices are packaged.

There is a special BIST microcode downloaded which is performed in order to do the self-test. The downloaded BIST microcode supports the selection of a worst case path in execution unit 130 through the microcode control word 712A output to opcode generator 720. For instance, instead of configuring the execution unit elements to be three or four stages deep, opcode signal 178 configures execution unit 130 to have two data paths which are two stages deep which each operate at 5 ns. in order to obtain a stress performance of the execution unit elements. The worst case path is run it at a faster clock rate during wafer testing than is the clock rate that is normally utilized during the high temperature packaged testing.

Another advantage of BIST in the present architecture is that the BIST microcoded can be downloaded from test probes at a low speed but the BIST microcode executes at high speed. Similarly, the test results and can be subsequently transferred through the test probes at a low transfer rate. Testing of an MCC based device is therefore not restricted by the electrical limitations (i.e. inductance, capacitance, noise interference, etc.) of the test probe interface to the MCC based device.

Also, using the test microcode, the entire memory block 800 can be minutely checked because the test microcode controls configuration control block 790 in order to perform a variety of memory configuration set-ups to check the function of the sense amps within memory array 800. Memory array 800 can be configured to have multiple memory blocks, such as block 150 and 160, which can be checked by switching the blocks back and forth. Also, memory test patterns, such as a checkerboard pattern, can be written into memory and read back out in order to check the function of individual memory cells in memory array 800. Defective memory elements can be located and information relating to the location of defective cells can be output so that a determination can be made of what circuitry to burn in through a laser fuse in order to replace the defective cells with redundant memory elements which are typically included when memory arrays are fabricated.

The defective memory element information can be output as a status word or other data which can be output through a dedicated test port or through a status word in memory array 800 which is accessible through the data interface ports, such as data I/O bus 180 or external bus interface mechanism 142, which are already provided by the present architecture. Compilation and output of status information is performed, again, under control of the microcode self test. The result is a high powered memory based device which can test itself and which can reconfigure itself to obtain worst case or special case testing.

Power Management by MCC 172

The MCC 172 also has the capability to manage the power dissipation of execution unit 130 and the components of MCC 172. As was described above with respect to latch timing and control block 740 and FIG. 30B, the clock speeds used to drive execution unit 130, as well as the other functional blocks shown in FIG. 27, can be adjusted under control of opcode signal 178A which, in turn, is determined under control of microcode control word 712A input to opcode generator 720. For instance, as described above, the clock speed for execution unit stage elements 130A–C can be modified to be 2×CLK3 resulting in an effective clock cycle, in the example shown, of 13.33 ns. and cutting the operating frequency in half. The relation of power dissipation to operating frequency is $P=CV^2f$. Therefore, doubling the clock cycle cuts the power dissipation in half.

Thus, because the microcode program for the algorithm in microcode store 710 has embedded in it the control information to modify the speed of data transfer through input latch 820, MUX 830, high speed latch 840, DMUX 850, execution unit 130 and output latch 860, the microcode also has the capability of controlling the power dissipation of these circuits by reconfiguring the clock cycle times of the circuits. For instance, as described in the example above, MUX 830, under the control of latch timing and control signal 174C, selects an operand from input latch 820 for input to the pipeline of execution unit 130 at the 20 ns. intervals of CLK2. In fact, operands can be selected at the 6.66 ns. clock rate of CLK3 constituting a threefold increase in the operating frequency, and therefore the power dissipation, of MUX 830. Thus, by moving data from latch 820 into execution unit 130 at 20 ns. intervals, a substantial improvement in power dissipation is achieved.

In addition, the microcode program can include multiple subroutines which support different levels of performance of an algorithm and, consequently, also support different levels of power dissipation. The microcode program can be structured to select a microcode subroutine which configures execution address generator 750, opcode generator 720 and latch timing and control circuit 740 for slower operation when fast performance is not required. Power dissipation is reduced in the execution address generator 750, the opcode generator 720 and latch timing and control 740 by the microcode selected for an algorithm. The opcode generator block 720 and latch timing and control block 740 have their power reduced by microcode that generates slower signal frequencies in latch timing and control signals 174A–H to the data path and reducing the requirements of the opcode output 178 (updates of the execution unit and latches occur less frequently which decreases the operating frequency). This also means less power is dissipated in the latch timing and control unit 740 itself. Thus, there is power reduction achieved within the three major block levels described above. Also note that the reconfiguration of the data path will also result in reduction of power dissipation. The important consideration here is that the microcode subroutine can effect the power dissipation of algorithmic calculations by determining the timing rates for latches and timing signals for pipe-lines in the execution unit, and indeed, the nature of the reconfiguration of the execution units themselves.

The above power reduction technique, in addition to being enabled through a specific piece of micro-code, can also be enabled via branching into a segment of microcode that enables less power dissipation. For example, for a given algorithm there may be more than one micro-code subroutine which would support the algorithm of different levels of power dissipation and speed. Thus, through a branching option, this selection would be determined. For example, when more then one algorithm is being processed concurrently through the execution unit 130, it may be necessary to utilize the faster speeds in the latch timing and control signals 174A–H and faster issuance of opcodes in opcode signal 178 in order to meet the throughput requirements of the algorithm. However, when only one algorithm is being processed in execution unit 130, slower latch timing and control and issuance of opcodes can be accommodated. An example would be executing an FIR and FFT through parallel data paths in execution unit 130 with the goal of providing maximum throughput versus executing an FIR alone in which the highest throughput was not necessary.

High-Speed Branching

The reduction of power dissipation by arranging branching, as discussed above, is not the sole reason for utilization of a branching mechanism in this architecture. There are two levels of branching in the present architecture. The first level of branching is at a slower speed and occurs through the operation of sequence controller 700 and sequences at a rate equivalent to approximately the read/write cycle time of memory array 800, which is typically a DRAM. Power dissipation in sequence controller 700 is reduced because the slower operational speed allows for minimal size device transistors, since the performance of sequence controller 700 does not have to perform at a high clock rate, and simpler levels of chips interconnect can be utilized.

As illustrated in FIG. 23C, the execution unit feedback signal 704 from the execution unit 130, as well as the feedback signals 752D, 772B, and 787B, provide feedback for creating a branch in the microcode sequence under the control of sequence controller 700. Thus, branching in the sequence controller 700 can be achieved by standard methods and, as mentioned above, can be supported by more then one level of micro-coding standard methods. This high-level branching method can support the power reduction techniques described earlier as well as bringing various microcode subroutines into operation.

Figure 33:
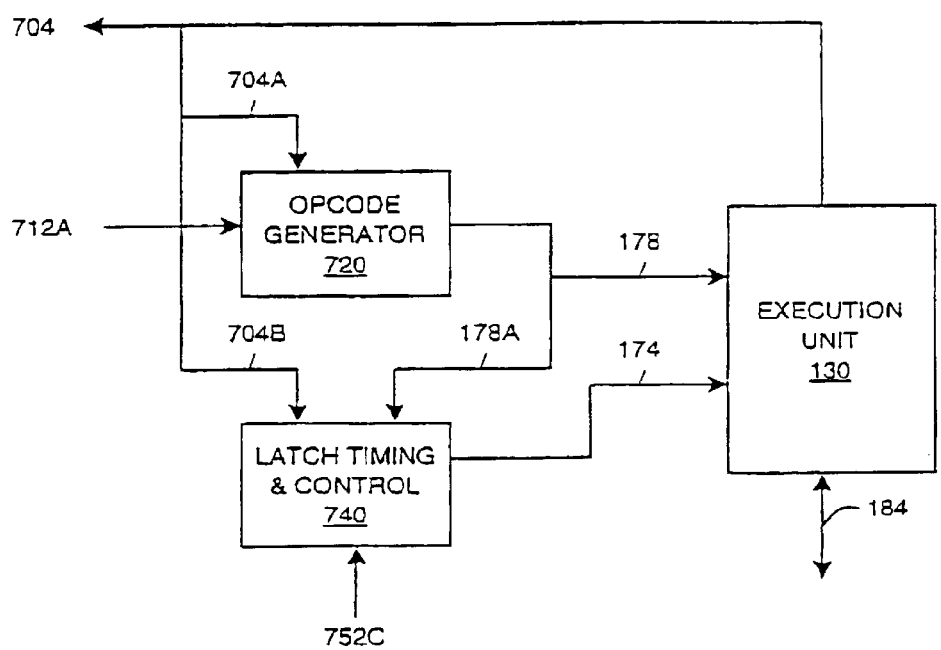
FIG. 33 is a functional block diagram illustrating an embodiment of the circuit of FIGS. 23A–C which includes feedback signal paths to support fast branching within an execution unit.

However, to accomplish a high-speed branch, additions need to be made to the architecture which are illustrated in FIG. 33. The execution unit 130 provides feedback control information signals 704A to opcode generator 720 and 704B to latch timing and control circuit 740. Feedback signal 704 continues to be connected to sequence controller 700. The feedback of signals 704A and 704B is necessary to enable a high-speed branch to occur within the processing performed within the execution unit 130 as opposed to the lower speed branch associated with sequence controller 700. Specifically, the high-speed branch arranges modifications to the operations which take place within the circuitry illustrated in FIG. 27, excluding memory. The circuit blocks 810, 820, 830, 840, 850, and 860 of FIG. 27 indicate a requirement to relate to high-speed calculation of the algorithm coupled with optimizing or reordering the operands which feed into the pipeline of execution unit 130 to accommodate the read/write issues associated with memory 800 (i.e. DRAM) or algorithms requiring descrambling of data, e.g. reordering input data to do an FFT as described above.

Figure 34:
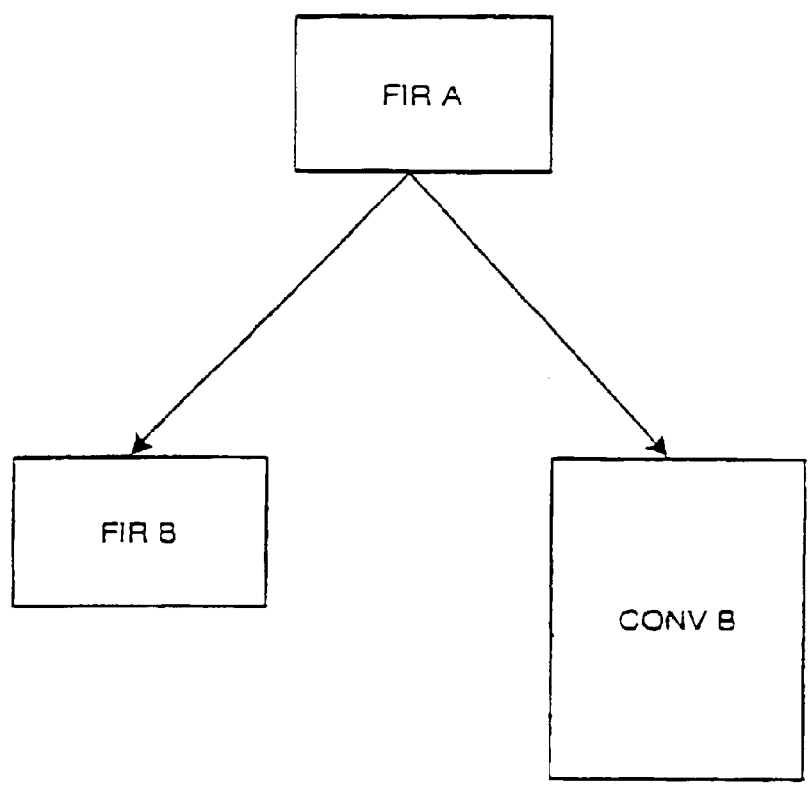
FIG. 34 is a process flow diagram illustrating branching in the circuit of FIG. 33.

An example of fast branching involves executing a first FIR algorithm FIR A followed by a branch to one of a second FIR algorithm FIR B and a convolution algorithm CONV B, which is illustrated in FIG. 34. The data required for implementing FIR A, which involves a small number of data points, is loaded into multi-word input latch 820 (or a multi-ported register file which takes the place of blocks 820 and 830). After FIR A completes, a fast branch occurs to either FIR B or CONV B depending on a branch condition resulting from FIR A which feeds back to opcode generator 720 via feedback signal 704A and latch timing and control block 740 via feedback signal 704B, as shown in FIG. 33.

Note that the high speed branch to either FIR B or CONV B is achieved by opcode generator 720 and latch timing and control block 740 in response to the feedback signals 704A and 704B. Opcode generator 720 issues the next opcode on opcode output signal 178 and outputs opcode control signal 178A to latch timing and control block 740 to drive the next latch timing and control signals 174A–H in order to execute either FIR B or CONV B, depending upon the branch feedback condition reflected in feedback signals 704A and 704B.

Speculative Execution in MCC 172

The present architecture also has the capability to perform speculative execution. Expanding upon the example discussed above in regard to FIG. 34, assume that FIR A, FIR B and CONV B are long algorithms wherein each of the FIR operations require a large number of operands, thus resulting in the need to perform multiple read and write cycles to memory 800 (whereas the previous example was limited so that the algorithms could be executed within execution unit 130 without additional memory accesses). In the present example, speculative execution can be accomplished by doing FIR A, FIR B and CONV B in parallel.

Figure 35:
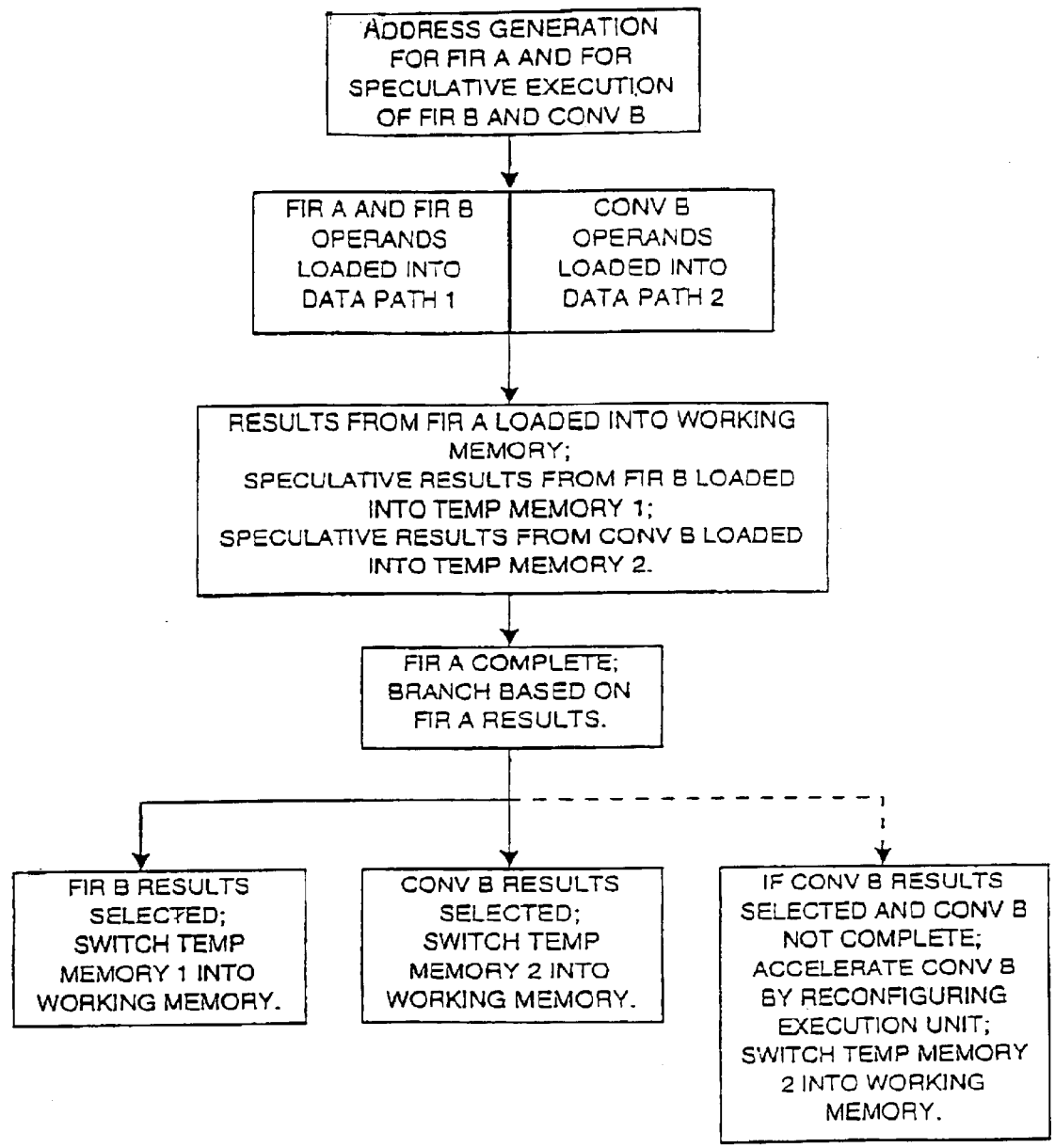
FIG. 35 is a process flow diagram illustrating branching in the circuit of FIG. 33 and FIG. 23C for a more complex example involving speculative execution.

For instance, execution unit 130 can be configured, as described above, to have two parallel data paths wherein FIR A and FIR B are calculated in the first data path and CONV B is calculated in the second data path. Note that since these operations require multiple accesses to memory 800, execution address generator 750 (or multiple address generators) provides address generation for the processes of all three algorithms running in parallel. This can be accomplished by a high level address generator capable of generating addresses for multiple processes (algorithmic memory addressing) being addressed concurrently or by the use of smaller address generators where each smaller address generator handles one process. The result of address generation is that operands are obtained from memory 800 and input to execution unit 130 for FIR A, FIR B and CONV B in parallel. The results from FIR B and CONV B are held in temporary memory locations until FIR A completes thereby setting the branch condition. Based upon the branch condition from FIR A, the temporary memory location for either FIR B or CONV B is switched into the final result segment of storage in memory 800, e.g., switched into working memory through reconfiguration of the memory. Thus, reconfiguration of memory 800 also comes into play in obtaining speculative execution in the present architecture. The process flow of the present example is illustrated in FIG. 35.

Figure 36:
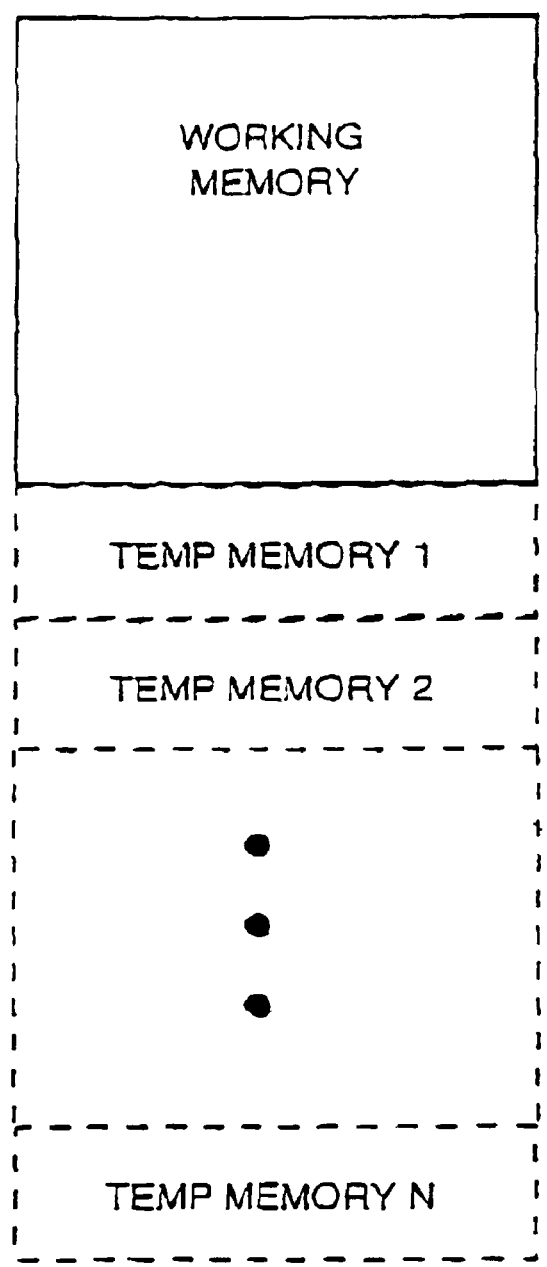
FIG. 36 is a diagram of the memory configuration for the process illustrated in FIG. 35.

The configuration of memory 800 into working memory and temporary memory locations 1–N, as shown in FIG. 36, is accomplished by configuration control block 790 under the control of the microcode program in microcode store 710. Reconfiguration of memory 800 will occur after the branch from FIR A to either FIR B or CONV B in the present and prior examples.

Note that it is possible, in the event that FIR A completes and the algorithm FIR B or CONV B that is selected based upon the results of FIR A has not completed execution, to reconfigure execution unit 130 to devote more processing resources to completion of the selected algorithm. At the same time, memory 800 can be reconfigured to couple the temporary memory location for the selected results into the working memory containing the results of FIR A.

Further note from the present example that reconfiguration of memory 800 together with speculative execution combine to accomplish higher execution speed for computational algorithms.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. An execution architecture, the architecture comprising:
   a memory array, the array having first and second blocks, first and second I/O ports, first and second address ports, and a configuration control port, where a first value of a configuration control signal received at the configuration control port configures the first block to be coupled to the first I/O port and the first address port and the second block to be coupled to the second I/O port and the second address port, and a second value of the configuration control signal configures the first block to be coupled to the second I/O port and the second address port and the second block to be coupled to the first I/O port and the first address port;
   a data controller and address generator (DCAG) having an address output port and a control input port, the address output port of the DCAG being coupled to the first address port of the memory array and the DCAG being configured to generate address values at the DCAG address output port responsive to a vector data control signal received at the DCAG control input port;
   a DMA controller and address generator (DMACAG) having an address output port and a control input port, the address output port of the DMACAG being coupled to the second address port of the memory array and the DMACAG being configured to generate address values at the DMACAG address output port responsive to a DMA control signal received at the DMACAG control input port;
   a first execution unit having first and second I/O ports, the first I/O port of the first execution unit being coupled to the first I/O port of the memory array;
   a first local memory array having a first I/O port and a first address port, the first I/O port of the first local memory being coupled to the second I/O port of the first execution unit; and
   a first local address generator (LAG) having an address output port and a control input port, the address output port of the first LAG being coupled to the first address port of the first local memory array and the first LAG being configured to generate address values at the first LAG address output port responsive to a first execution control signal received at the first LAG control input port.

2. The execution architecture of claim 1, including a memory centric controller (MCC) configured to generate the configuration control signal, the vector data control signal, the DMA control signal and the first execution control signal, where the MCC is configured to switch the first and second blocks of the memory array and drive the DCAG and DMACAG independently of one another to simultaneously transfer data through the first and second I/O ports of the memory array and the MCC is configured to independently drive the first LAG to transfer data between the first local memory and the first execution unit.

3. The execution architecture of claim 2, wherein the configuration control signal, the vector data control signal, the DMA control signal and the first execution control signal are each microcode values generated by the MCC.

4. The execution architecture of claim 1, including a sequencer configured to generate the configuration control signal, the vector data control signal, the DMA control signal and the first execution control signal, where the sequencer receives a status signal from each of the first EU, first LAG, DCAG, and DMACAG and generates values for the configuration control signal, the vector data control signal, the DMA control signal and the first execution control signal responsive to the status signal from each of the first EU, first LAG, DCAG, and DMACAG and a microcode program.

5. The execution architecture of claim 4, wherein the values for the configuration control signal, the vector data control signal, the DMA control signal and the first execution control signal are microcode control words.

6. The execution architecture of claim 1, the architecture including:
   an execution unit interface unit interposed the execution unit and the memory array and having a first I/O port coupled to the first I/O port of the execution unit and a second I/O port coupled to the first I/O port of the memory array, a control input port configured to receive an execution unit interface control signal, and a first wide buffer, where a first predetermined number of words of the first wide buffer is proportional to a ratio of an execution speed of the execution unit to an access speed of the memory array and the execution unit interface unit transfers individual words of data between the execution unit and the first wide buffer and transfers the first predetermined number of words between the first wide buffer and the memory array responsive to the execution unit interface control signal.

7. The execution architecture of claim 1, the architecture including:
   a bus interface unit coupled between the second port of the memory array and a system bus, where the bus interface unit having a first I/O port coupled to the second I/O port of the memory array and a second I/O port coupled to the system bus, a control input port configured to receive a bus interface control signal, and a second wide buffer, where a second predetermined number of words of the second wide buffer is proportional to a ratio of a transfer speed of the system bus to an access speed of the memory array and the bus interface unit transfers individual words of data between the system bus and the second wide buffer and transfers the second predetermined number of words between the second wide buffer and the memory array responsive to the bus interface control signal.

8. The execution architecture of claim 1, including:
   a second local address generator (LAG) having an address output port and a control input port, and the second LAG being configured to generate address values at the second LAG address output port responsive to a second execution control signal received at the second LAG control input port; and
   wherein the first local memory includes first and second blocks, a second I/O port, a second address port and a configuration control input, where, responsive to a first value of a local memory configuration control signal received at the configuration control input, the first block of the first local memory is coupled to the first I/O port and first address port and the second block of the first local memory is coupled to the second I/O port and second address port and where, responsive to a second value of the local memory configuration control signal, the first block of the first local memory is coupled to the second I/O port and second address port and the second block of the first local memory is coupled to the first I/O port and first address port, the address output port of the second LAG being coupled to the second address port of the first local memory.

9. The execution architecture of claim 8, wherein the second I/O port of the first local memory is coupled to a microcode store.

10. The execution architecture of claim 1, wherein the memory array includes a third block coupled to a third I/O port and a third address port of the memory array, wherein the third block of the memory array is configured to be switched with the first and second blocks of the memory array responsive to the configuration control signal and including:

another data controller and address generator (DCAC) having an address output port and a control input port, the address output port of the another DCAG being coupled to the third address port of the memory array and the DCAG being configured to generate address values at the DCAG address output port responsive to another vector data control signal received at the second DCAG control input port;

a second execution unit having first and second I/O ports, the first I/O port of the first execution unit being coupled to the third I/O port of the memory array;

a second local memory array having an I/O port and an address port, the I/O port of the second local memory being coupled to the second I/O port of the second execution unit; and a second local address generator (LAG) having an address output port and a control input port, the address output port of the second LAG being coupled to the address port of the second local memory array and the second LAG being configured to generate address values at the second LAG address output port responsive to a second execution control signal received at the second LAG control input port.

11. The execution architecture of claim 10, wherein:

the first local memory includes a codec microcode program; and the second local memory includes a motion estimation microcode program.

12. The execution architecture of claim 11, wherein the architecture is configured to operate as an MPEG-2 encoder.

13. The execution architecture of claim 1, wherein the first execution unit includes:

a combination multiplier/arithmetic logic unit (ALU) block having first and second input ports and an output port; and a vector register file having a first I/O port coupled to the first I/O port of the first local memory, a second I/O port coupled to the first I/O port of the memory array, a first output port coupled to the first input port of the combination multiplier/ALU block, a second output port coupled to the second input port of the combination multiplier/ALU block, and a first input port coupled to the output port of the combination multiplier/ALU block, where the vector register file includes multiple register blocks configured to be independently coupled to the first and second I/O ports, the first and second output ports and the input port of the vector register file responsive to a vector register control signal, where a word size of each of the multiple blocks is independently configurable by the vector register control signal to match a transfer rate of each of the ports of the vector register file.

* * * * *

UNITED STATES PATENT AND TRADEMARK OFFICE
CERTIFICATE OF CORRECTION

PATENT NO. : 6,895,452 B1 Page 1 of 1
APPLICATION NO. : 09/174057
DATED : May 17, 2005
INVENTOR(S) : Coleman et al.

It is certified that error appears in the above-identified patent and that said Letters Patent is hereby corrected as shown below:

On cover page, item 56, under Other Publications, please replace "Guttang" with --Guttag --
On cover page, item 56, under U.S. Patent Documents, please replace "Barker" with --Barket--
At column 5, line 62, please replace "DCAC" with --DCAG--
At column 8, line 3, please replace "8C" with --18C--
At column 20, line 45, please replace "MUX-I" with --MUX-1--
At column 25, line 24, please replace "8x8" with --8X8--
At column 29, line 25, please replace "stages x 6.66" with --stages X 6.66--
At column 29, line 41, please replace "1W3-5" with --IW3-5--
At column 30, line 37, please replace "(IW1 x IW2)" with --(IW1 X IW2)--
At column 30, line 39, please replace "IW1 x IW2" with --IW1 X IW2--
At column 32, line 27, please replace "2 x 6.66ns" with --2 X 6.66ns--
At column 32, line 33, please replace "M x CLK3" with --M X CLK3--
At column 32, line 33, please replace "2 x 6.66" with --2 X 6.66--
At column 32, lines 36-37, please replace "5 x 6.66, (1 x 6.66...2 x 6.66)" with --5 x 6.66, (1 X 6.66...2 X 6.66)--
At column 34, under "Before Scramble", table is missing --X + 11--------(11)--
At column 34, under "After Scramble", table is missing --X+11-------(13)--
At column 36, line 9, please replace "2 x CLK3" with --2 X CLK3--

Signed and Sealed this

Thirtieth Day of January, 2007

JON W. DUDAS
*Director of the United States Patent and Trademark Office*